(12) United States Patent
Lee et al.

(10) Patent No.: US 9,380,135 B2
(45) Date of Patent: Jun. 28, 2016

(54) METHOD AND DEVICE FOR INFORMATION TRANSMISSION IN WIRELESS COMMUNICATION SYSTEM

(75) Inventors: Hyunwoo Lee, Anyang-si (KR); Seunghee Han, Anyang-si (KR); Jinmin Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 171 days.

(21) Appl. No.: 14/117,318

(22) PCT Filed: May 29, 2012

(86) PCT No.: PCT/KR2012/004208
§ 371 (c)(1),
(2), (4) Date: Nov. 12, 2013

(87) PCT Pub. No.: WO2012/169739
PCT Pub. Date: Dec. 13, 2012

(65) Prior Publication Data
US 2014/0177527 A1      Jun. 26, 2014

Related U.S. Application Data

(60) Provisional application No. 61/494,423, filed on Jun. 8, 2011.

(51) Int. Cl.
*H04L 29/06* (2006.01)
*H04L 5/00* (2006.01)
*H04L 1/00* (2006.01)
*H04W 56/00* (2009.01)
*H04L 1/18* (2006.01)

(52) U.S. Cl.
CPC .............. *H04L 69/24* (2013.01); *H04L 1/0067* (2013.01); *H04L 1/0073* (2013.01); *H04L 1/1861* (2013.01); *H04L 5/001* (2013.01); *H04L 5/0053* (2013.01); *H04W 56/0045* (2013.01)

(58) Field of Classification Search
CPC   H04L 1/0067; H04L 1/0069; H04W 56/0045
See application file for complete search history.

(56) References Cited

U.S. PATENT DOCUMENTS

2003/0171121 A1*   9/2003   Kim et al. ................ 455/451
2010/0103902 A1*   4/2010   Kim et al. ................ 370/330
2013/0343314 A1*  12/2013   Tiirola et al. ............ 370/329

FOREIGN PATENT DOCUMENTS

| JP | 2001-160988 A | 6/2001 |
| KR | 10-2001-0107737 A | 12/2001 |
| KR | 20-2009-0028401 A | 3/2009 |
| KR | 10-2010-0102513 A | 9/2010 |

* cited by examiner

*Primary Examiner* — Jeffrey M Rutkowski
*Assistant Examiner* — Thomas D Busch
(74) *Attorney, Agent, or Firm* — Dentons US LLP

(57) ABSTRACT

The present invention relates to a wireless communication system and more specifically relates to a method and device for transmitting information. A wireless communication system can support carrier aggregation (CA). In one aspect of the present invention, a method, in which a terminal transmits information to a base station in a wireless communication system, comprises the steps of: carrying out rate matching for a preset number of symbols in a subframe for transmitting first information on at least one serving cell formed in the terminal; and transmitting the first information from the subframe in which the rate matching has been carried out, to the base station. Therein, the uplink transmission timing of the one or more serving cells are different from one another, and the preset number is determined in accordance with the difference between the uplink transmission timings of the one or more serving cell.

12 Claims, 41 Drawing Sheets

FIG. 5
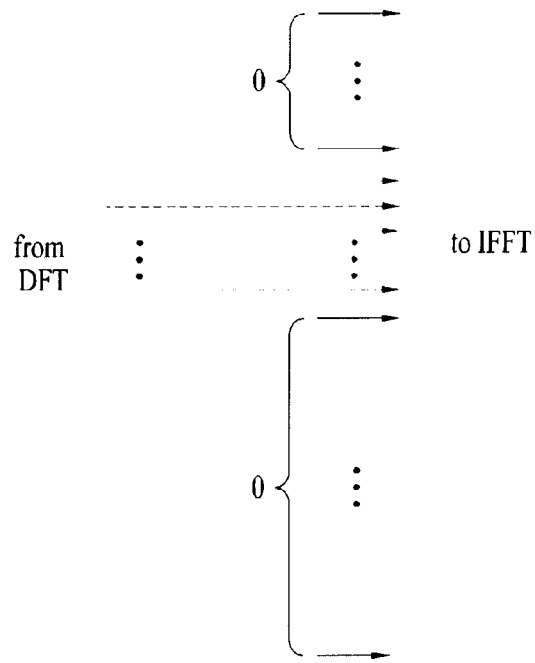
(a)
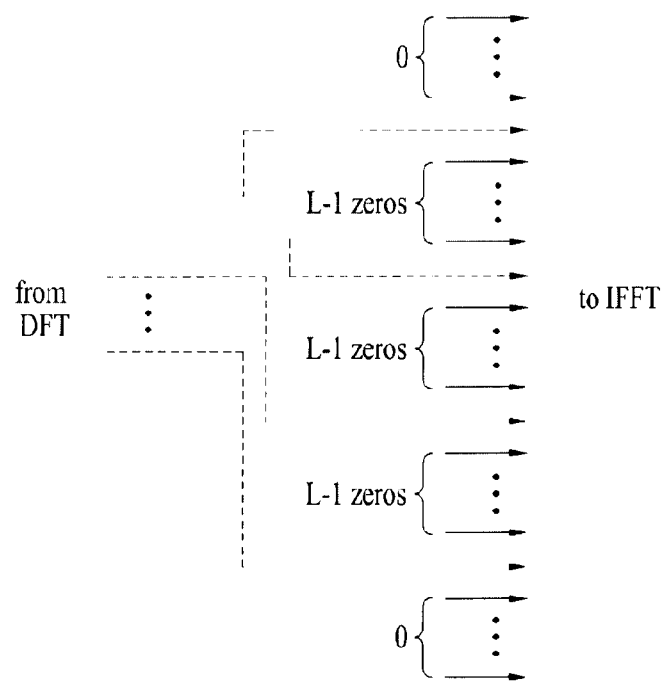
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\triangle_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\overline{n}_{OC}=0$ | $\overline{n}_{OC}=1$ | $\overline{n}_{OC}=2$ | $n_{OC}=0$ | $n_{OC}=1$ | $n_{OC}=2$ |
| $n_{CS}=1$ | $n_{CS}=0$ | n'=0 | | | n'=0 | | |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

$\triangle_{shift}^{PUCCH} \in \{1,2,3\}$ for normal cyclic prefix
$\{1,2,3\}$ for extended cyclic prefix $\delta_{offset}^{PUCCH} \in \{0,1,...,\triangle_{shift}^{PUCCH} - 1\}$ Cell specific cyclic shift offset $n_{OC}$ Orthogonal sequence index for ACK/NACK
$\overline{n}_{OC}$ Orthogonal sequence index for RS
$n_{CS}$ Cyclic shift value of a CAZAC sequence
n' ACK/NACK resource index used for the channelization in a RB

FIG. 33
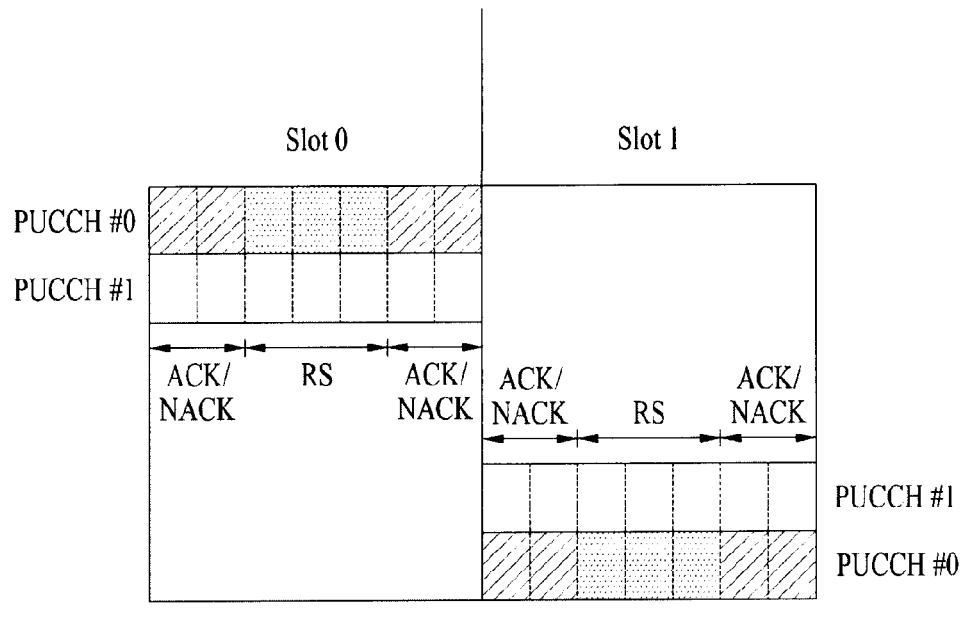
(a)
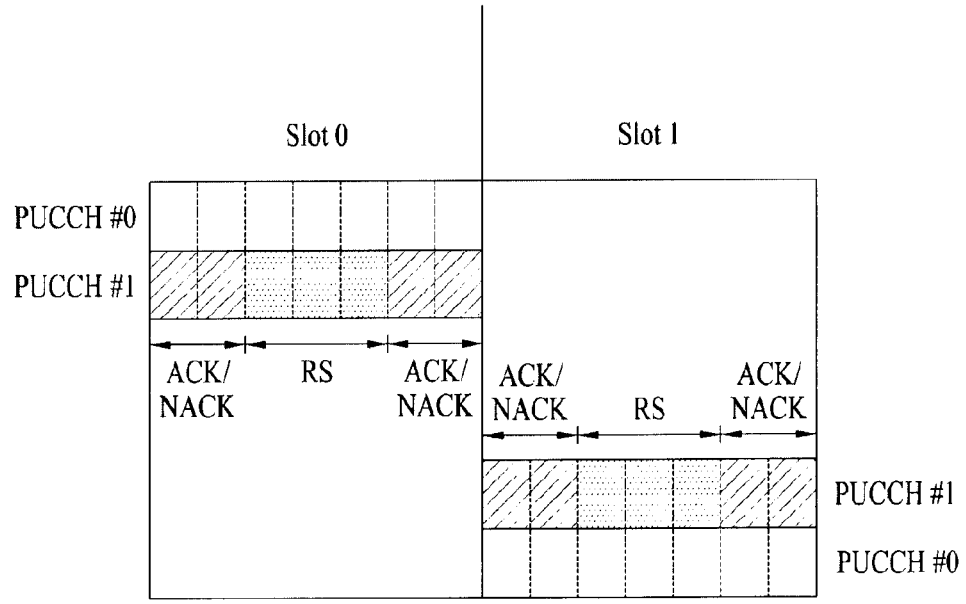
(b)

FIG. 34
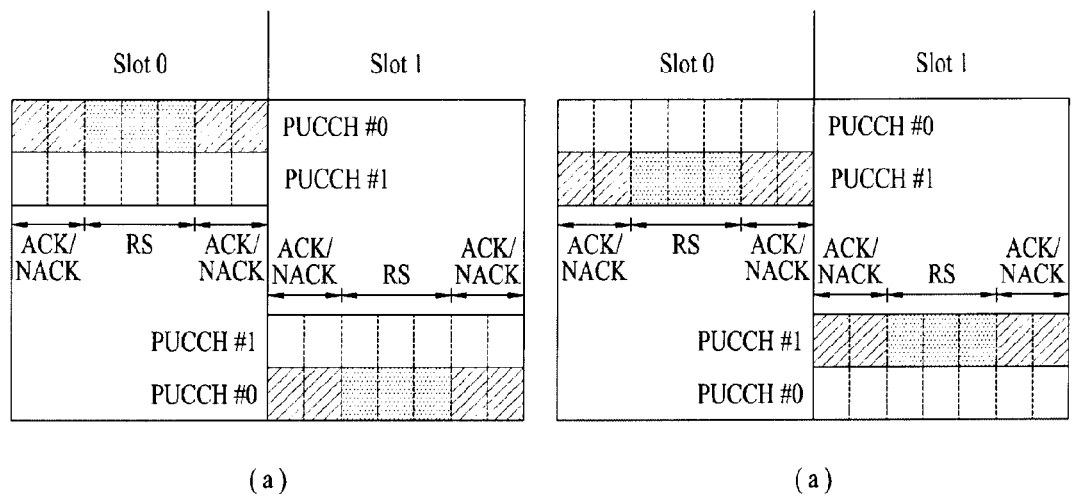
(a)  (a)
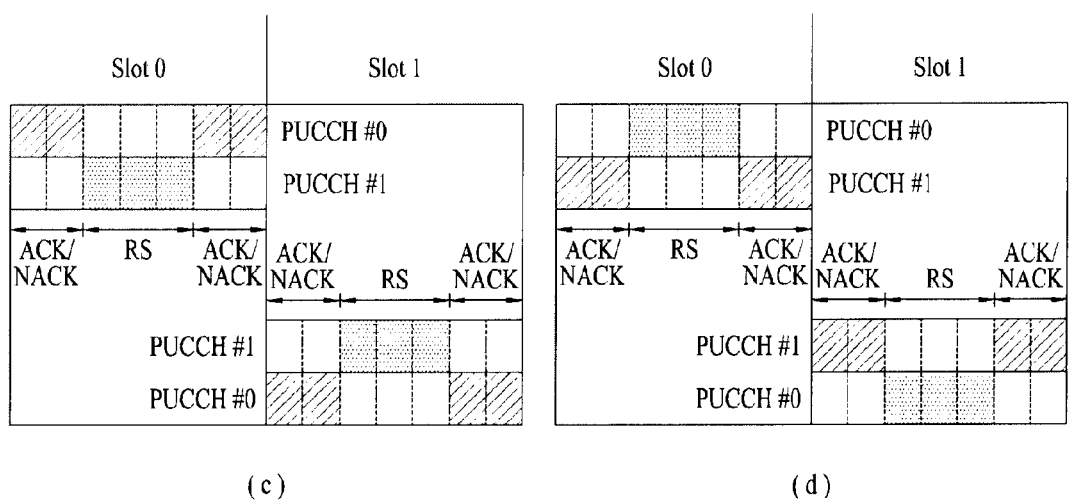
(c)  (d)

METHOD AND DEVICE FOR INFORMATION TRANSMISSION IN WIRELESS COMMUNICATION SYSTEM

This application is a National Stage Entry of International Application No. PCT/KR2012/004208 filed May 29, 2012 and claims priority benefit of U.S. Provisional Application No. 61/494,423 filed Jun. 8, 2011, all of which are incorporated by reference for all purposes as if fully set forth herein.

TECHNICAL FIELD

The present invention relates to a wireless communication system, and more particularly, to a method of transmitting information and an apparatus therefor. The wireless communication system can support carrier aggregation (CA).

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of efficiently transmitting control information in a wireless communication system and apparatus therefor. Another object of the present invention is to provide a channel format, a signal processing, and an apparatus therefor to efficiently transmit control information. The other object of the present invention is to provide a method of efficiently allocating a resource to transmit control information and apparatus therefor.

Technical tasks obtainable from the present invention are not limited to the above-mentioned technical task. And, other unmentioned technical tasks can be clearly understood from the following description by those having ordinary skill in the technical field to which the present invention pertains.

Technical Solution

To achieve these and other technical objects, in an aspect of the present invention, disclosed herein is a method for transmitting information to a base station by a user equipment in a wireless communication system, the method comprising performing rate matching for the predetermined number of symbol within a subframe transmitting first information of at least one serving cell configured for the user equipment; and transmitting the first information to the base station in the subframe in which the rate matching is performed, wherein uplink transmission timing of the at least one serving cell is different from each other and wherein the predetermined number is determined according to a difference of the uplink transmission timing of the at least one serving cell.

To further achieve these and other technical objects, in another aspect of the present invention, disclosed herein is a user equipment for transmitting information to a base station in a wireless communication system, the user equipment comprising a processor configured to perform a rate matching for the predetermined number of symbol within a subframe transmitting first information of at least one serving cell configured for the user equipment; and a transmission module configured to transmit the first information to the base station in the subframe in which the rate matching is performed according to a control of the processor, wherein uplink transmission timing of the at least one serving cell is different from each other, and wherein the predetermined number is determined according to a difference of the uplink transmission timing of the at least one serving cell.

It is to be understood that both the foregoing general description and the following detailed description are exemplary and explanatory and are intended to provide further explanation of the invention as claimed.

Advantageous Effects

According to the present invention, control information can be efficiently transmitted in a wireless communication system. In particular, the present invention can provide a channel format, a method of signal processing to efficiently transmit control information. In more particular, according to the present invention, a resource to transmit control information can be efficiently allocated.

Effects obtainable from the present invention may be non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for examples of mapping an input symbol to a subcarrier in frequency domain while satisfying a single carrier property;

FIG. 17 is a diagram of ACK/NACK channelization for PUCCH format 1a and 1b;

FIG. 33 is a diagram for a transmission structure of ACK/NACK information using a channel selection to which the present invention is applied;

FIG. 34 is a diagram for a transmission structure of ACK/NACK information using an enhanced channel selection to which the present invention is applied;

BEST MODE

Mode for Invention

Figure 1:
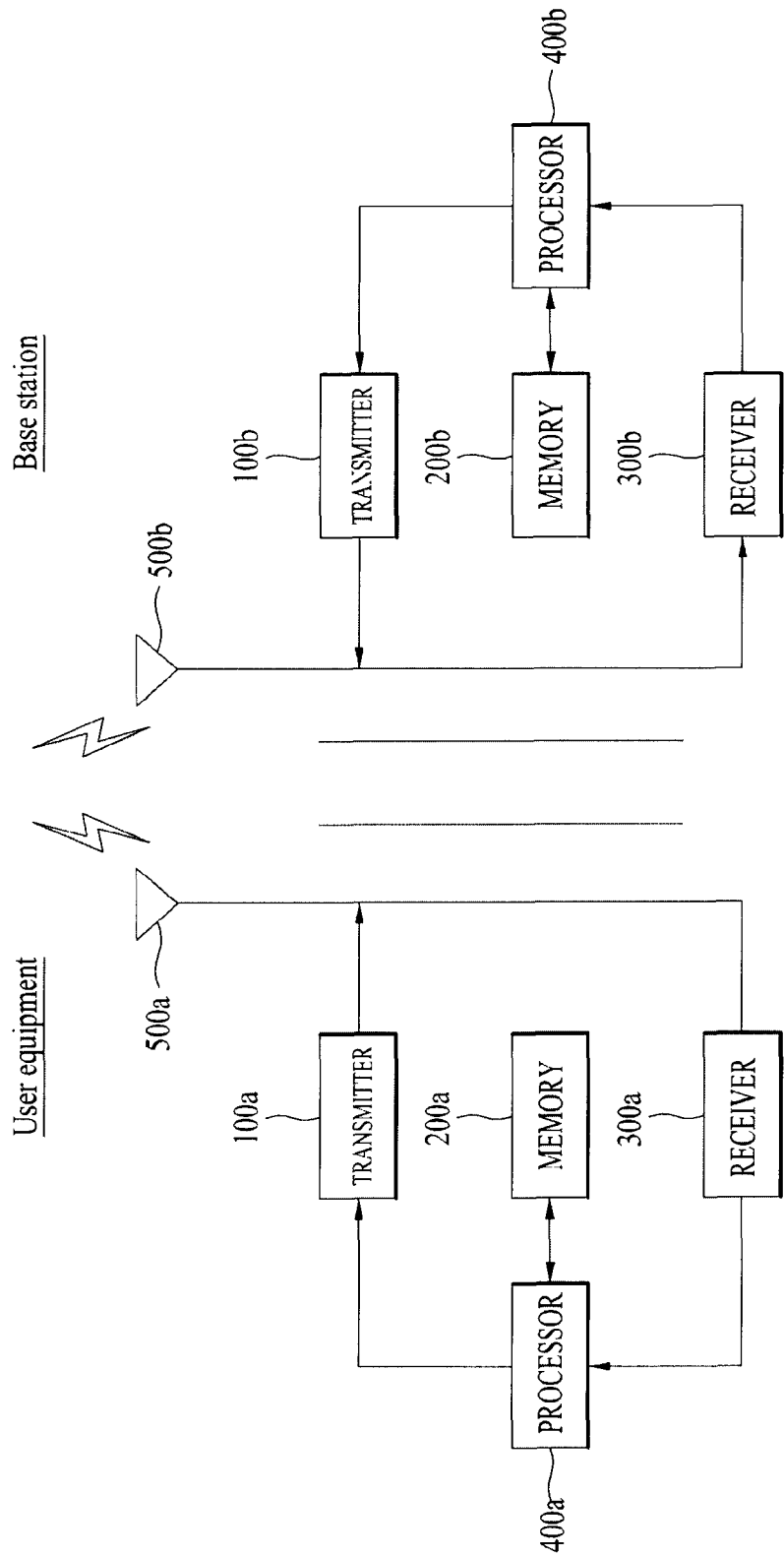
FIG. 1 is a block diagram for configuration of a user equipment and a base station, to which the present invention is applied.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

And, techniques, apparatuses (devices) and systems described in the following description may be applicable to various kinds of wireless multiple access systems. For example, the multiple access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRAN is a part of UMTS (Universal Mobile Telecommunications System). 3GPP (3rd Generation Partnership Project) LTE (long term evolution) is a part of E-UMTS (Evolved UMTS) that uses E-UTRAN. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case that the present invention is applied to 3GPP LTE/LTE-A, by which the present invention is non-limited. For instance, although the detailed description of the present invention may be explained based on a wireless communication system corresponding to 3GPP LTE/LTE-A system, it may be applicable to other random wireless communication systems except items unique to 3GPP LTE/LTE-A.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description, a terminal may be stationary or may have mobility. And, the terminal may be a common name of a device for transceiving various kinds of data and control informations by communicating with a base station. The terminal may be named one of a user equipment (UE), a mobile station (MS), a mobile terminal (MT), a user terminal (UT), a subscriber station (SS), a wireless device, a personal digital assistant (PDA), a wireless modem, a handheld device and the like.

A base station generally means a fixed station communicating with a terminal or other base stations and exchanges various kinds of data and control informations by communicating with a terminal and other base stations. The base station may be named such a terminology as eNB (evolved-NodeB), BTS (Base Transceiver System), AP (Access Point) and the like.

In the present invention, if a specific signal is assigned to one of frame, subframe, slot, carrier and subcarrier, it may mean that a specific signal is transmitted in an interval or timing of frame/subframe/slot via corresponding carrier/subcarrier.

In the present invention, a rank or a transmission rank may mean the number of layers multiplexed with or allocated to one OFDM symbol or one resource element (RE).

In the present invention, PDCCH (physical downlink control channel)/PCFICH (physical control format indicator channel)/PFICH (physical hybrid automatic retransmit request indicator channel)/PDSCH (physical downlink shared channel) mean a set of resource elements carrying ACK/NACK (acknowledgement/Negative ACK)/downlink data for DCI (downlink control information)/CFI (control format indicator)/uplink transmission, respectively.

And, PUCCH (physical uplink control channel)/PUSCH (physical uplink shared channel)/PRACH (physical random access channel) mean a set of resource elements carrying UCI (uplink control information)/uplink data/random access signal, respectively.

In particular, a resource element (RE) allocated to or belongs to PDCCH/PCFICH/PHICH/PDSCH/PUCCH/PUSCH/PRACH is called a PDCCH/PCFICH/PHICH/PDSCH/PUCCH/PUSCH/PRACH RE or a PDCCH/PCFICH/PHICH/PDSCH/PUCCH/PUSCH/PRACH resource, respectively.

Hence, an expression that a user equipment transmits PUCCH/PUSCH/PRACH may be used as a same meaning that the user equipment transmits uplink control information/uplink data/random access signal via the PUCCH/PUSCH/PRACH. And, an expression that a base station transmits PDCCH/PCFICH/PHICH/PDSCH may be used as a same meaning that the base station transmits downlink control information/downlink data and the like via the PDCCH/PCFICH/PHICH/PDSCH.

Meanwhile, if ACK/NACK information is mapped to a specific constellation point, it may mean that the ACK/NACK information is mapped to a specific complex modulation symbol. And, if the ACK/NACK information is mapped to a specific complex modulation symbol, it may mean that the ACK/NACK information is modulated by the specific complex modulation symbol.

FIG. 1 is a block diagram for configuration of a user equipment and a base station, to which the present invention is applied. In particular, a user equipment works as a transmitting device in UL or works as a receiving device in DL. On the contrary, a base station works as a receiving device in UL or works as a transmitting device in DL.

Referring to FIG. 1, a user equipment/base station UE/BS) may include an antenna $500a/500b$ capable of transmitting and receiving information, data, signals and/or messages and the like, a transmitter $100a/100b$ transmitting information, data, signals and/or messages by controlling the antenna $500a/500b$, a receiver $300a/300b$ receiving information, data, signals and/or messages by controlling the antenna $500a/500b$ and a memory $200a/200b$ storing various kinds of informations within a wireless communication system temporarily or permanently. Moreover, the user equipment/base station may further include a processor $400a/400b$ controlling various components by being operatively connected to the components including the transmitter, the receiver, the memory and the like.

The transmitter $100a$, the receiver $300a$, the memory $200a$ and the processor $400a$ in the user equipment may be implemented with separate chips as independent components, respectively. Alternatively, at least two of the transmitter $100a$, the receiver $300a$, the memory $200a$ and the processor $400a$ in the user equipment may be implemented with a single chip. On the other hand, the transmitter $100b$, the receiver $300b$, the memory $200b$ and the processor $400b$ in the base station may be implemented with separate chips as independent components, respectively. Alternatively, at least two of the transmitter $100b$, the receiver $300b$, the memory $200b$ and the processor $400b$ in the base station may be implemented with a single chip. Alternatively, the transmitter and the receiver may be integrated into a single transceiver in the user equipment or the base station.

The antenna $500a/500b$ may play a role in externally transmitting a signal generated from the transmitter $100a/100b$. And, the antenna $500a/500b$ may play a role in receiving a signal from outside and then delivering the received signal to the receiver $300a/300b$. Moreover, the antenna $500a/500b$ may be called an antenna port. In this case, the antenna port may correspond to a single physical antenna or may be configured by a combination of a plurality of physical antennas. In case that MIMO (multi-input multi-output) function of transceiving data and the like using a plurality of antennas is supported by a transceiver, at least two antennas may be connected to the transceiver.

The processor $400a/400b$ may generally control overall operations of various components or modules in the mobile/base station. In particular, the processor $400a/400b$ may be able to perform various control functions to implement the above-described embodiments of the present invention, a MAC (medium access control) frame variable control function according to service characteristics and propagation environment, a power saving mode function of controlling an idle mode operation, a handover function, an authentication and encryption function and the like. And, the processor 400a/400b may be named one of a controller, a microcontroller, a microprocessor, a microcomputer and the like. Moreover, the processor 400a/400b may be implemented by hardware, firmware, software or a combination thereof.

In case of implementing the present invention using hardware, the processor 400a/400b may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing the present invention using firmware or software, the firmware or software may be configured to include modules, procedures, and/or functions for performing the functions or operations of the present invention. And, the firmware or software configured to perform the present invention may be driven by the processor 400a/400b in a manner of being loaded in the processor 400a/400b or being saved in the memory 200a/200b.

The transmitter 100a/100b may perform prescribed coding and modulation on a signal and/or data, which is scheduled by the processor 400a/400b or a scheduler connected to the processor 400a/400b and will be then transmitted externally, and may be then able to deliver the coded and modulated signal and/or data to the antenna 500a/500b. The transmitter 100a/100b and the receiver 300a/300b of the user equipment and the base station may be differently configured depending on a process for processing a transmission signal and a reception signal.

The memory 200a/200b may store programs for processing and control of the processor 400a/400b and may be able to temporarily store input/output information. And, the memory 200a/200b may be utilized as a buffer. Moreover, the memory 200a/200b may include at least one of storage media including a flash type memory, a hard disk type memory, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Figure 2:
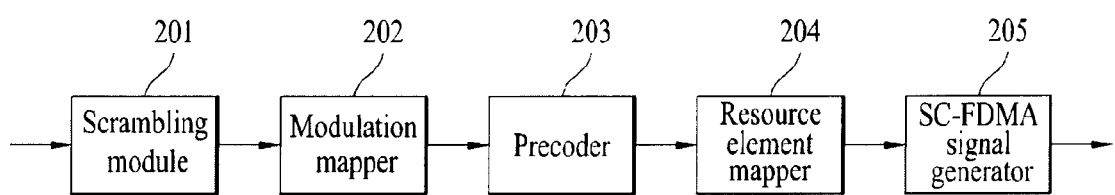
FIG. 2 is a diagram for a signal processing process for a user equipment to transmit an uplink signal.

FIG. 2 is a diagram for a signal processing process for a user equipment to transmit an uplink signal. Referring to FIG. 2, a transmitter 100a in a user equipment can include a scramble module 201, a modulation mapper 202, a precoder 203, a resource element mapper 204 and a SC-FDMA signal generator 205.

First of all, in order to transmit a UL signal, a scramble module 201 may be able to scramble a transmission signal using a scramble signal. The scrambled signal is inputted to a modulation mapper 202 and is then modulated into a complex symbol using a BPSK (binary phase shift keying), QPSK (quadrature phase shift keying) or 16 QAM (quadrature amplitude modulation) scheme in accordance with a type or channel state of the transmission signal. Subsequently, the modulated complex symbol is processed by a precoder 203 and is then inputted to a resource element mapper 204. In this case, the resource element mapper 204 may be able to map the complex symbol to a time-frequency resource element. This processed signal is inputted to an SC-FDMA signal generator 205 and may be then transmitted to a base station via an antenna port.

Figure 3:
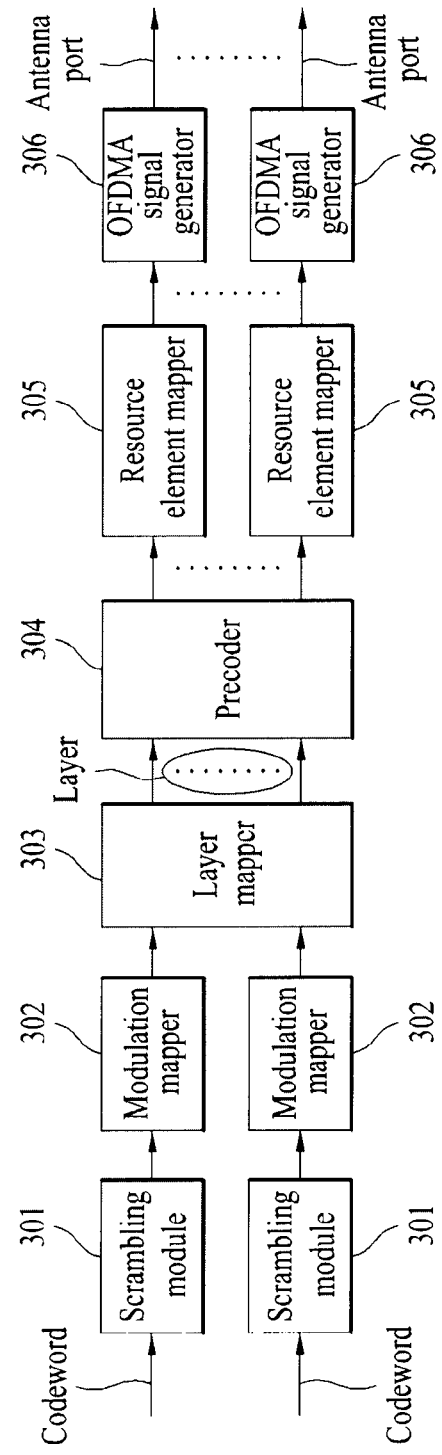
FIG. 3 is a diagram for a signal processing process for a base station to transmit a downlink signal.

FIG. 3 is a diagram for a signal processing process for a base station to transmit a downlink signal. Referring to FIG. 3, a transmitter 100b in a base station can include a scramble module 301, a modulation mapper 302, a layer mapper 303, a precoder 304, a resource element mapper 305, and an OFDM signal generator 306.

Similar to FIG. 2, a signal or a codeword can be modulated to a complex modulation symbol via the scramble module 301 and the modulation mapper 302 to transmit a DL signal or at least one codeword. Subsequently, the complex symbol is mapped to a plurality of layers by a layer mapper 303. Each of a plurality of the layers may be then assigned to each transmission antenna in a manner of being multiplied by a precoding matrix by the precoder 304. A transmission signal per each antenna processed by the above mentioned manner is mapped to a time-frequency resource element by the resource element mapper 305, inputted to the OFDM signal generator 306, and may be then transmitted via an each antenna port.

In a wireless communication system, in case that a user equipment transmits a signal in UL, PAPR (peak-to-average ratio) may cause a problem compared to a case that a base station transmits a signal in DL. Hence, as mentioned earlier with reference to FIG. 2 and FIG. 3, unlike OFDMA scheme used for transmitting a signal in DL, SC-FDMA (single carrier-frequency division multiple access) scheme is used to transmit a signal in UL.

Figure 4:
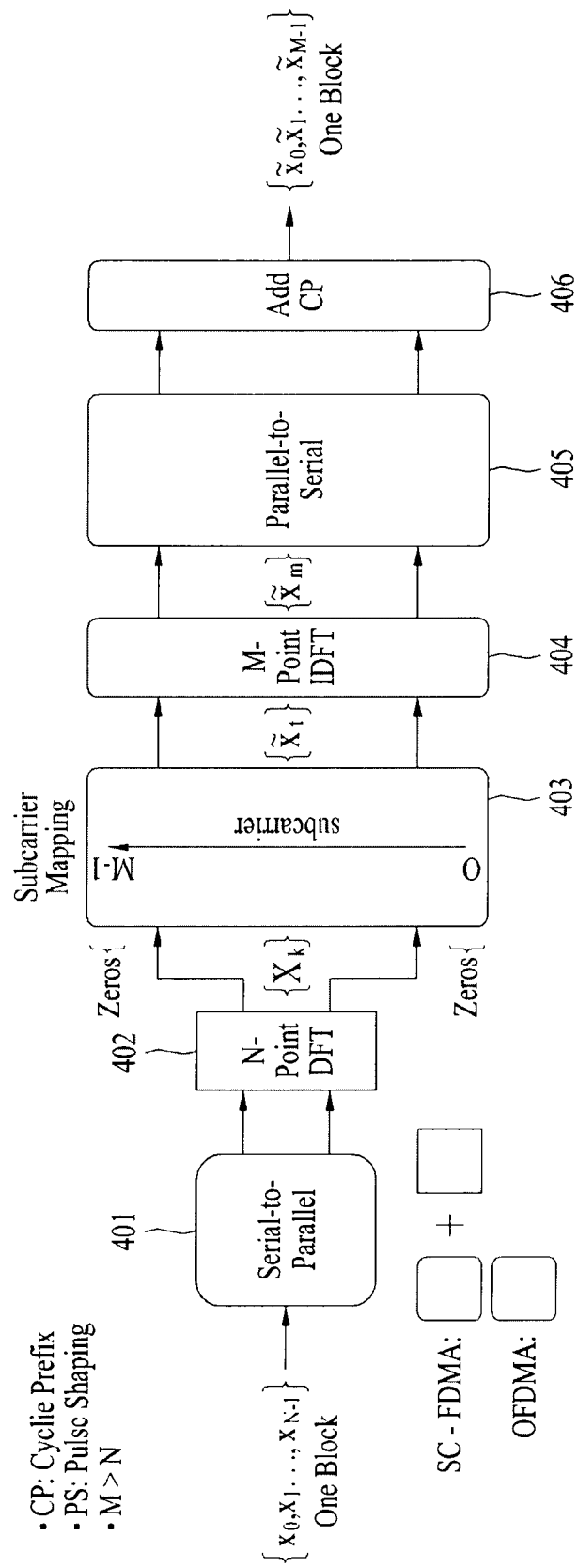
FIG. 4 is a diagram for an SC-FDMA scheme and an OFDMA scheme to which the present invention is applied.

FIG. 4 is a diagram for an SC-FDMA scheme and an OFDMA scheme to which the present invention is applied. 3GPP system adopts OFDMA in DL and adopts SC-FDMA in UL.

Referring to FIG. 4, both a user equipment transmitting a signal in UL and a base station transmitting a signal in DL identically include a serial-to-parallel converter 401, a sub-carrier mapper 403, M-point IDFT module 404, and a CP (cyclic prefix) adding module 406. Yet, the user equipment transmitting a signal using SC-FDMA scheme additionally includes N-point DFT module 402. The N-point DFT module 402 makes a transmission signal have a single carrier property in a manner of offsetting a prescribed part of IDFT processing impact of the M-point IDFT module 404.

The SC-FDMA scheme should satisfy a single carrier characteristic. FIG. 5 is a diagram for examples of mapping an input symbol to a subcarrier in frequency domain while satisfying a single carrier property. According to one of FIG. 5(*a*) and FIG. 5(*b*), if a DFT symbol is assigned to a subcarrier, it may be able to obtain a transmission signal satisfying a single carrier property. FIG. 5(*a*) indicates a localized mapping method and FIG. 5(*b*) indicates a distributed mapping method, respectively.

Figure 6:
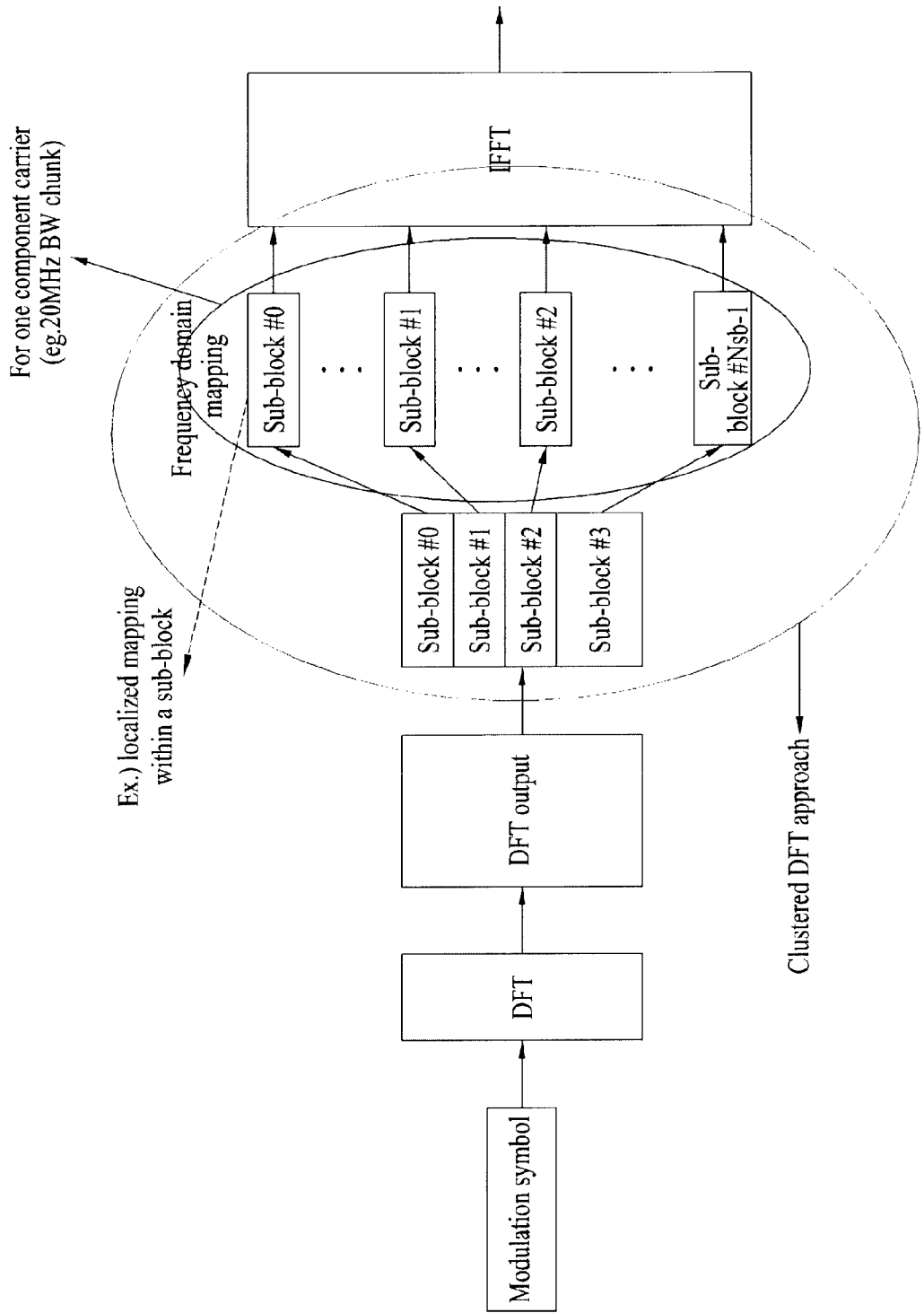
FIG. 6 is a diagram for a signal processing process that samples outputted from a DFT process are mapped to a single carrier in a clustered SC-FDMA.
Figure 7:
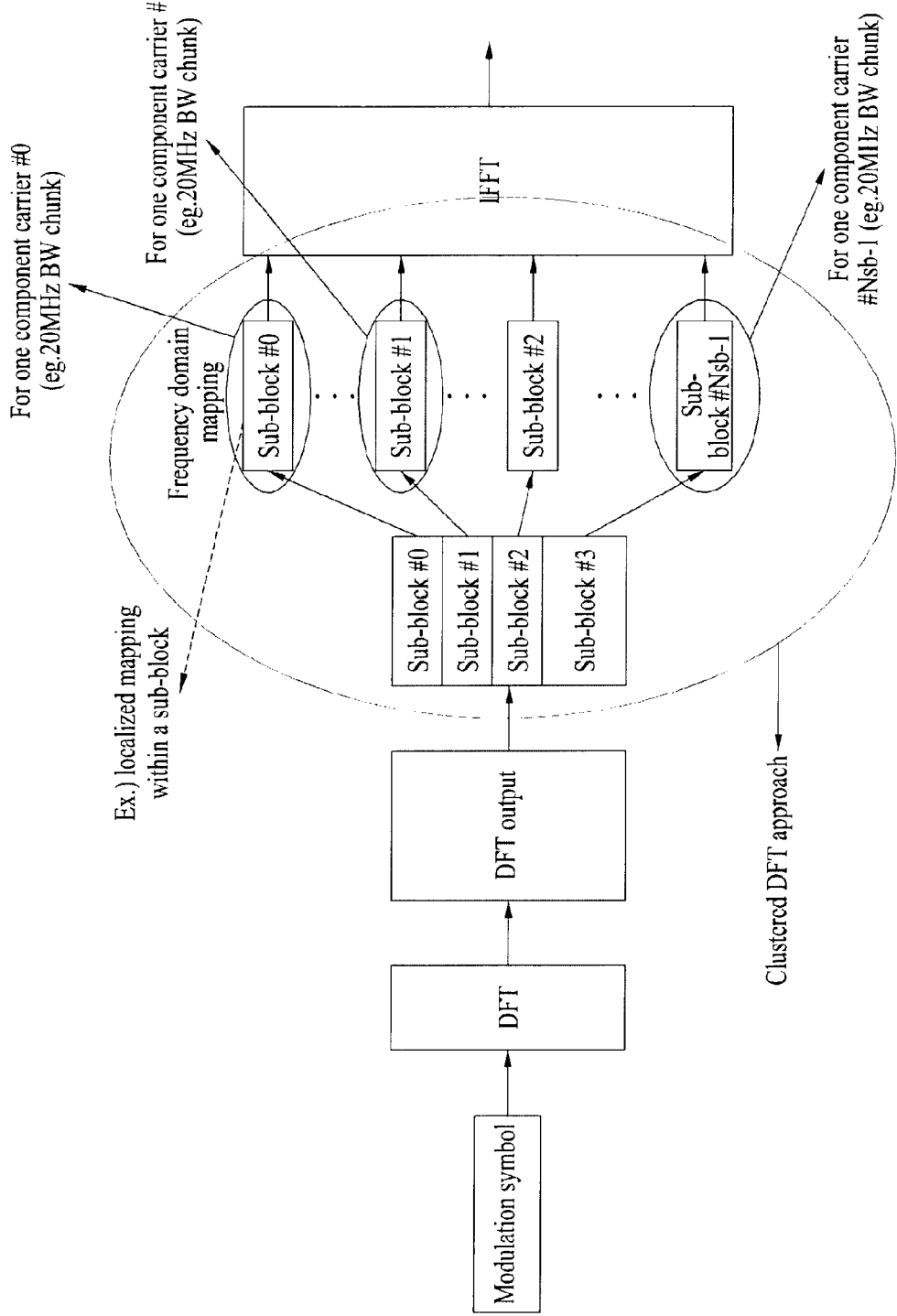
FIG. 7 and FIG. 8 are diagrams for a signal processing process that samples outputted from a DFT process are mapped to multi-carriers in a clustered SC-FDMA.
Figure 8:
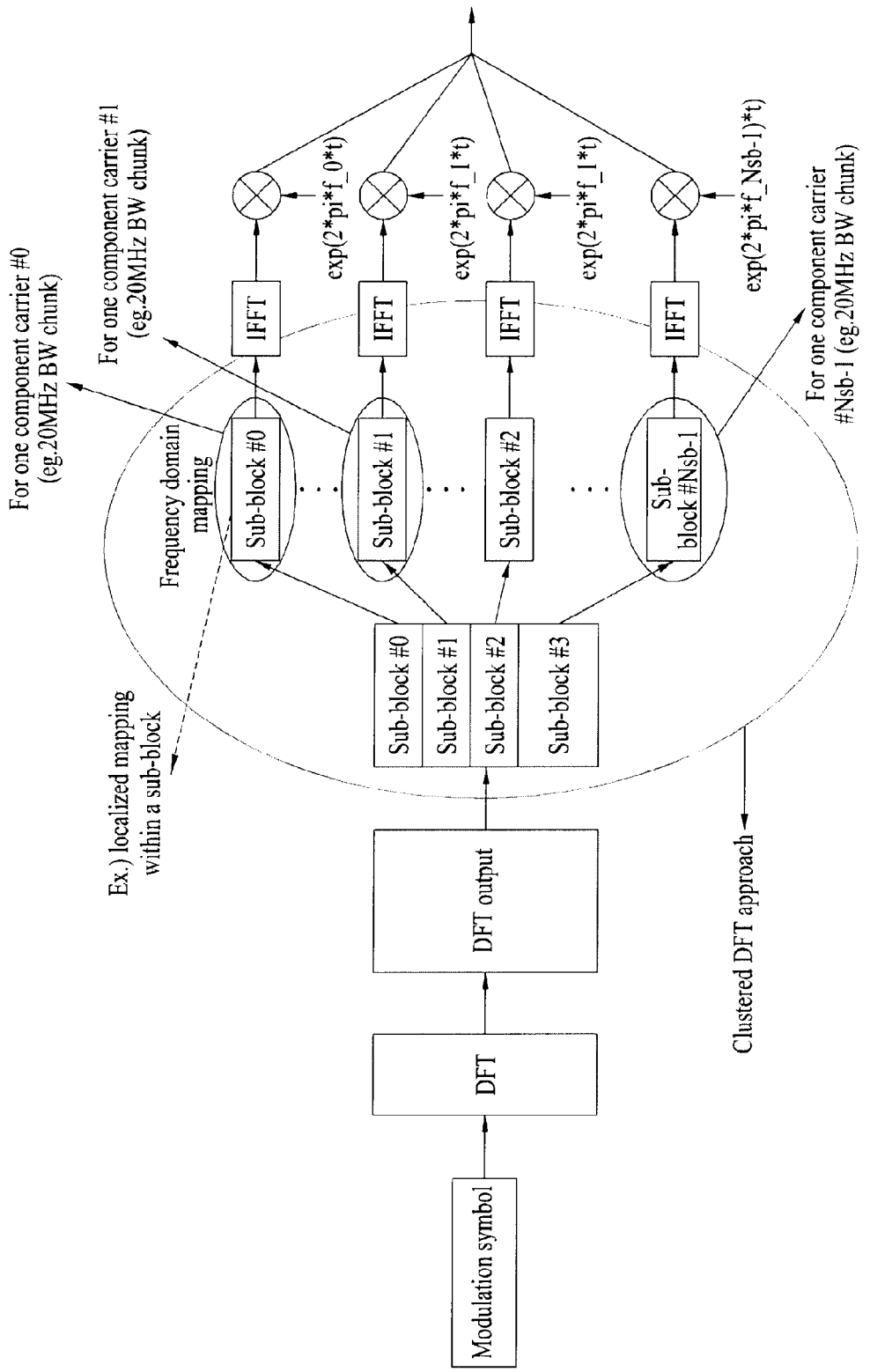

Meanwhile, a clustered DFT-s-OFDM scheme can be selected by a transmitter 100a/100b. The clustered DFT-s-OFDM scheme is a variation of a legacy SC-FDMA scheme. The clustered DFT-s-OFDM scheme divides a signal underwent a precoder into several pieces of sub-blocks and then non-contiguously maps the sub-blocks to a subcarrier. FIG. 6 to FIG. 8 indicates examples that an input symbol is mapped to a single carrier by the clustered DFT-s-OFDM scheme.

FIG. 6 is a diagram for a signal processing process that samples outputted from a DFT process are mapped to a single carrier in a clustered SC-FDMA. FIG. 7 and FIG. 8 are diagrams for a signal processing process that samples outputted from a DFT process are mapped to multi-carriers in a clustered SC-FDMA. FIG. 6 indicates an example to which an intra-carrier clustered SC-FDMA is applied. FIG. 7 and FIG. 8 indicate examples to which an inter-carrier clustered SC-FDMA is applied. FIG. 7 depicts a case that a signal is generated via a single IFFT block in case that subcarrier spacing is aligned between neighboring component carriers when component carriers are contiguously assigned in frequency domain. FIG. 8 depicts a case that a signal is generated via a plurality of IFFT blocks when component carriers are non-contiguously assigned in frequency domain.

Figure 9:
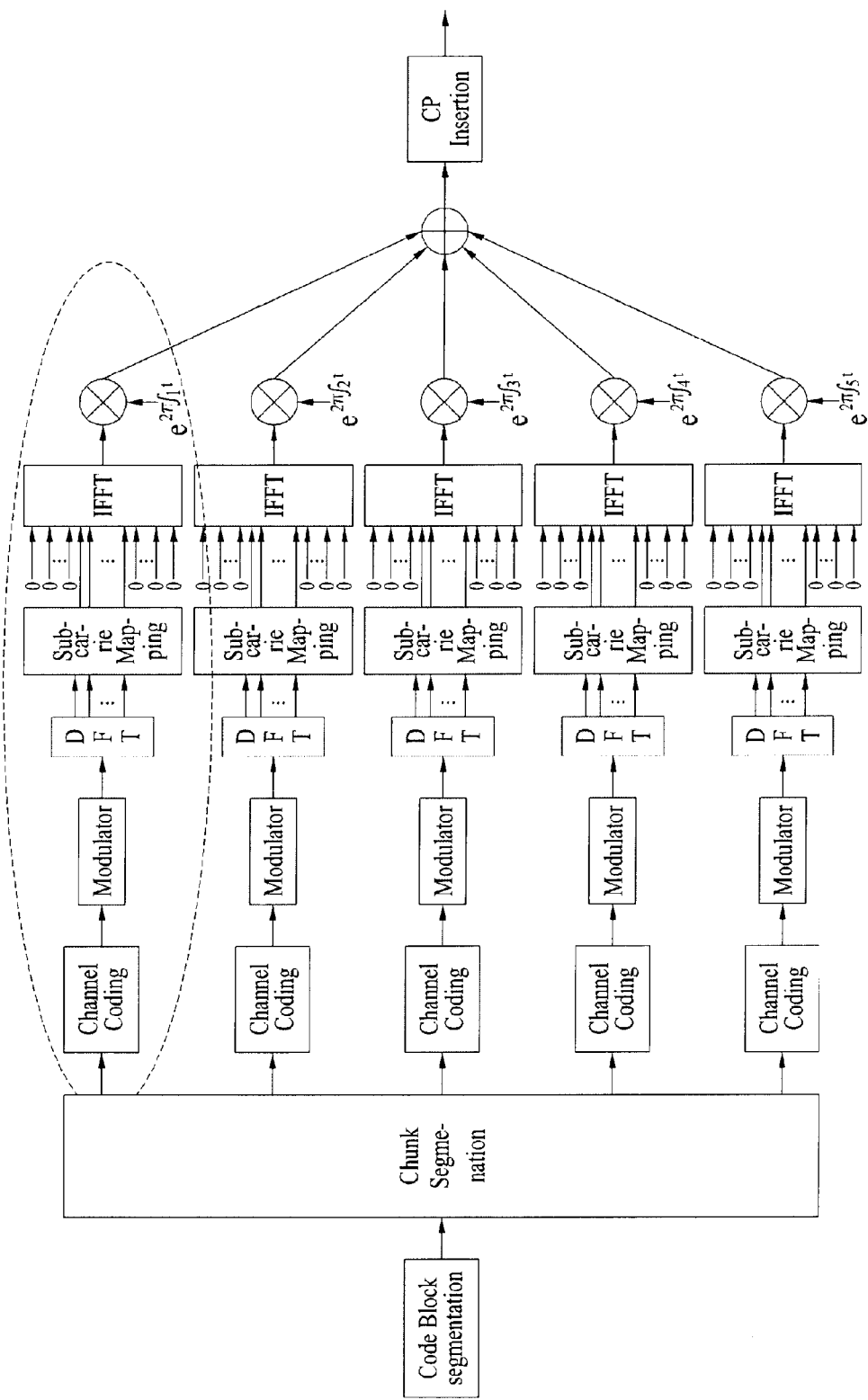
FIG. 9 is a diagram for a signal processing process of a segmented SC-FDMA.

FIG. 9 is a diagram for a signal processing process of a segmented SC-FDMA. As a relation configuration between a DFT and an IFFT becomes 1-to-1 in a manner of applying the number of IFFT identical to the random number of DFT, a segmented SC-FDMA simply extends DFT spread of a legacy SC-FDMA and a frequency subcarrier mapping configuration of the IFFT. Hence, the segmented SC-FDMA may be represented as NxSC-FDMA or NxDFT-s-OFDMA. In the present specification, the NxSC-FDMA or NxDFT-s-OFDMA is commonly named as the segmented SC-FDMA. Referring to FIG. 9, in order to mitigate a condition of a single carrier property, the segmented SC-FDMA performs a DFT process in a group unit in a manner of binding a total time domain modulation symbols into the N (N is an integer greater than 1) number of groups.

Figure 10:
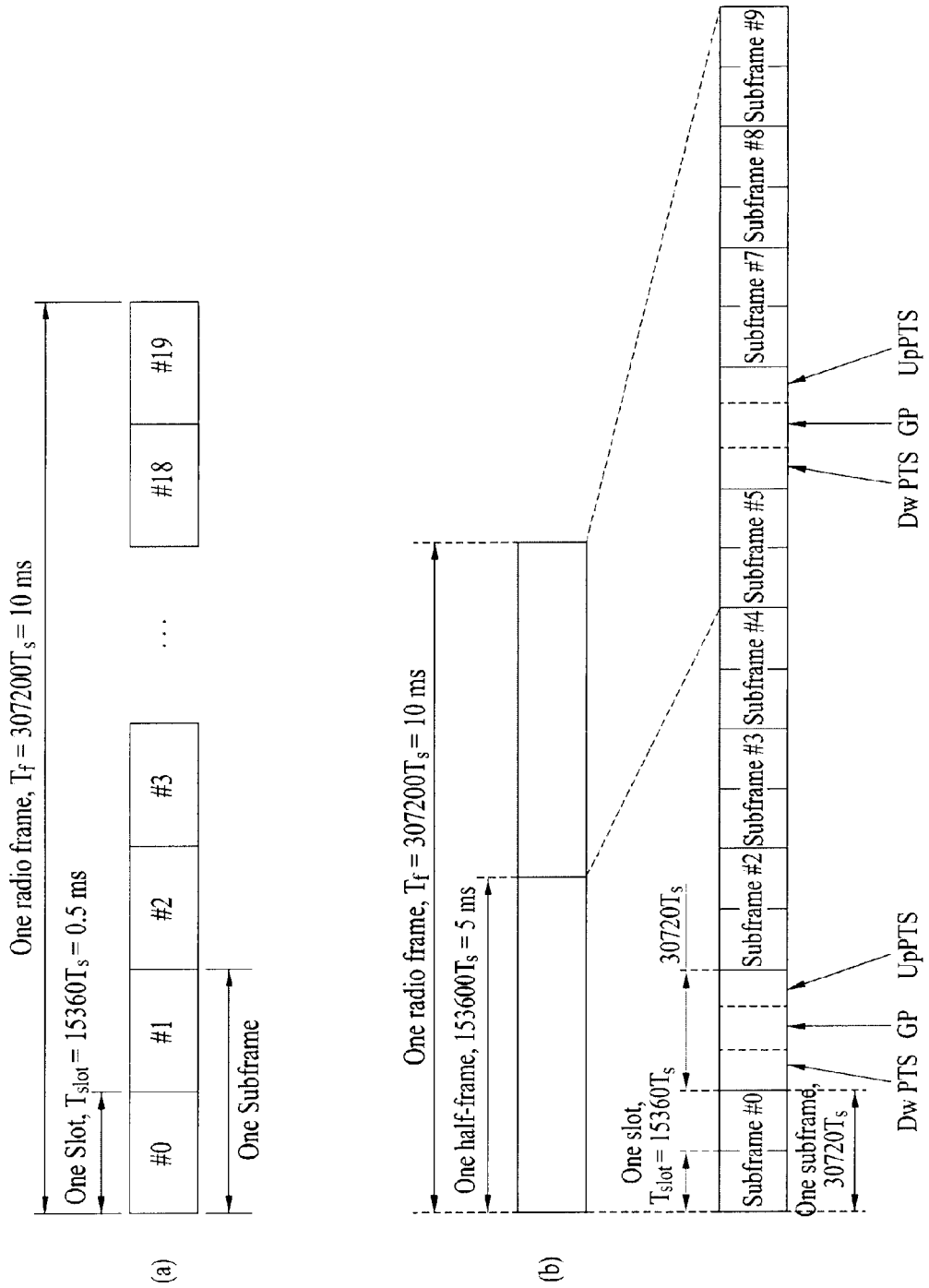
FIG. 10 is a diagram for examples of a radio frame structure used in a wireless communication system.

FIG. 10 is a diagram for examples of a radio frame structure used in a wireless communication system. In particular, FIG. 10 (*a*) exemplifies a radio frame according to a frame structure type 1 (FS-1) of 3GPP LTE/LTE-A. FIG. 10 (*b*) exemplifies a radio frame according to a frame structure type 2 (FS-2) of 3GPP LTE/LTE-A. A frame structure of FIG. 10 (*a*) may be applicable to both a FDD (frequency division duplex) mode and a half FDD (H-FDD) mode. A frame structure of FIG. 10 (*b*) may be applicable to a TDD (time division duplex) mode.

Referring to FIG. 10, a radio frame used in 3GPP LTE/LTE-A has a length of 10 ms (307200 $T_S$) and configured with 10 subframes of an equal length. A respective number can be given to 10 subframes in a radio frame. In this case, $T_S$ indicates a sampling time and may be represented as 'Ts=1/(15 kHz $\times$ 2048). Each subframe has a length of 1 ms and is configured with 2 slots. 20 slots in a radio frame may be sequentially numbered from 0 to 19. Each slot has a length of 0.5 ms. A time taken to transmit one subframe is called a transmission time interval (hereinafter abbreviated TTI). A time resource can be identified by a radio frame number (or radio frame index), a subframe number (or subframe index), a slot number (or slot index), or the like.

A radio frame can be differently configured depending on a duplex mode. For instance, since a DL transmission and an UL transmission are classified by a frequency in a FDD mode, a radio frame includes either a DL subframe or an UL subframe.

On the contrary, since a DL transmission and an UL transmission are classified by time in a TDD mode, a subframe in a frame is divided into a DL subframe and an UL subframe.

Figure 11:
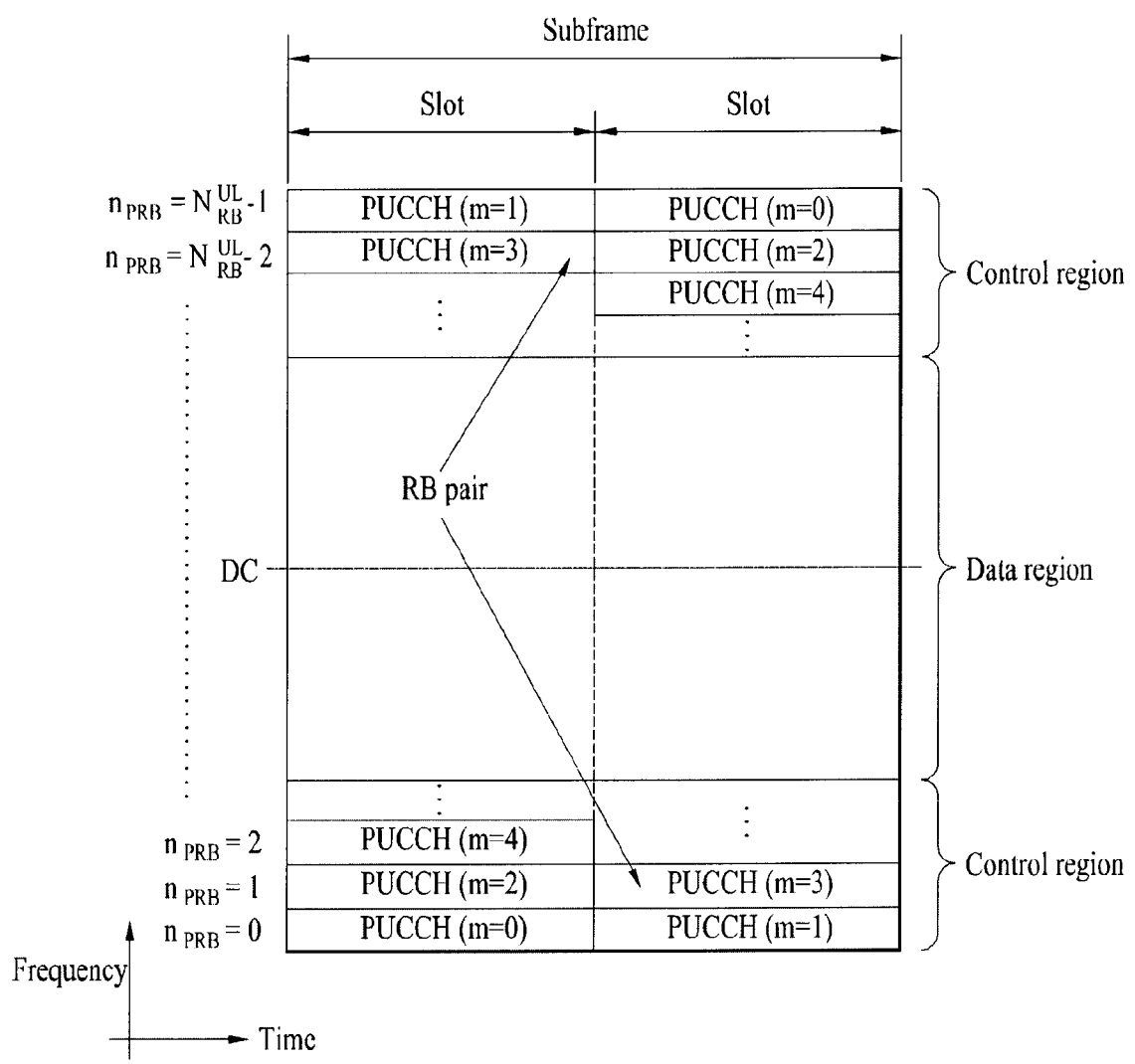
FIG. 11 is a diagram for an uplink subframe structure.

FIG. 11 is a diagram for an uplink subframe structure to which the present invention is applied. Referring to FIG. 11, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data. Yet, according to LTE release 8 or release 9, if a user equipment adopts SC-FDMA scheme, PUCCH and PUSCH cannot be simultaneously transmitted to maintain a single carrier property.

Uplink control information (UCI) transmitted via PUCCH has a different size and usage depending on a PUCCH format. And, a size of UL control information may vary according to a code rate. For instance, PUCCH format can be defined as follows.

(1) PUCCH format 1: used for on-off keying (OOK), scheduling request (SR)

(2) PUCCH format 1a and 1b: used for transmitting ACK/NACK (acknowledgement/Negative acknowledgement) information 1) PUCCH format 1a: 1-bit ACK/NACK information modulated by BPSK 2) PUCCH format 1b: 2-bits ACK/NACK information modulated by QPSK (3) PUCCH format 2: modulated by QPSK and used for transmitting CQI (4) PUCCH format 2a and 2b: used for simultaneously transmitting CQI and ACK/NACK information Table 1 indicates modulation schemes according to a PUCCH format and the number of bits per subframe. Table 2 indicates the number of reference signal (RS) per slot according to a PUCCH format. Table 3 indicates a position of an SC-FDMA symbol of a reference signal (RS) according to a PUCCH format. In the Table 1, PUCCH format 2a and 2b correspond to a case of a normal cyclic prefix (CP).

TABLE 1

| PUCCH format | Modulation scheme | Bit number per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal cyclic prefix | Extended cyclic prefix |
| --- | --- | --- |
| 1, 1a, 1b | 3 | 2 |
| 2 | 2 | 1 |
| 2a, 2b | 2 | N/A |

TABLE 3

| | SC-FDMA symbol position of reference signal | |
| --- | --- | --- |
| PUCCH format | Normal cyclic prefix | Extended cyclic prefix |
| 1, 1a, 1b | 2, 3, 4 | 2, 3 |
| 2, 2a, 2b | 1, 5 | 3 |

In an UL subframe, subcarriers far from a DC (direct current) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency $f_0$ in a frequency up converting process performed by OFDMA/SC-FDMA signal generator.

PUCCH for one user equipment is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier in two slots. Since PUCCH for a user equipment is assigned to the RB pair in a subframe irrespective of whether a frequency hopping is applied, an identical PUCCH is transmitted from each of the slots in the subframe via an RB, i.e., totally, the identical PUCCH is transmitted twice in the subframe.

In the following description, an RB pair in a subframe used for transmitting PUCCH is named as a PUCCH region. And, the PUCCH region and a code used in the PUCCH region are named as a PUCCH resource. In particular, PUCCH resources different from each other have PUCCH regions different from each other, respectively. Or, the PUCCH resources different from each other may have codes different from each other in an identical PUCCH region. For clarity, PUCCH transmitting ACK/NACK information is named as ACK/NACK PUCCH, PUCCH transmitting CQI/PMI/RI information is named as CSI (channel state information) PUCCH, and PUCCH transmitting SR information is named as SR PUCCH.

A base station explicitly or implicitly allocates a PUCCH resource required for a user equipment to transmit UL control information to the user equipment.

Such UL control information (UCI) as ACK/NACK (acknowledgement/negative ACK) information, CQI (channel quality indicator) information, PMI (precoding matrix indicator) information, RI (rank information), and SR (scheduling request) information and the like can be transmitted in a control region of an UL subframe.

In a wireless communication system, a user equipment and a base station transmit and receive a signal, data, and the like to/from each other. When the base station transmits data to the user equipment, the user equipment decodes the received data. If the user equipment succeeds in decoding the data, the user equipment transmits ACK to the base station. If the user equipment fails in decoding the data, the user equipment transmits NACK to the base station. In case of an opposite case, in particular, in case that the user equipment transmits data to the base station, the aforementioned is identically applied as well. In a 3GPP LTE system, the user equipment receives PDSCH and the like from the base station and transmits ACK/NACK for the PDSCH to the base station through an implicit PUCCH, which is determined by PDCCH carrying scheduling information for the PDSCH. In this case, if the user equipment cannot receive data, it may be considered as a DTX (discontinuous transmission) state, may be processed as a case that there is no received data according to a predetermined rule, or may be identically processed as NACK (although data is received, decoding is not successful).

Figure 12:
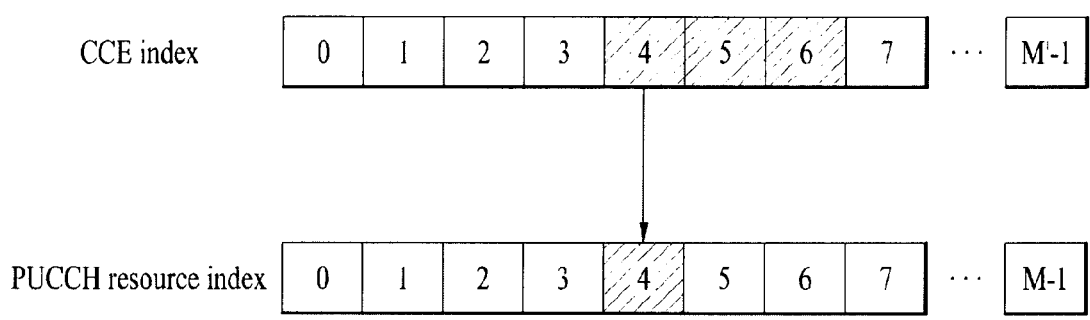
FIG. 12 is a diagram for a structure determining PUCCH for ACK/NACK transmission.

FIG. 12 is a diagram for a structure configured to determine PUCCH for ACK/NACK transmission to which the present invention is applied.

A PUCCH resource used for transmitting ACK/NACK information is not allocated to a user equipment in advance. Instead, a plurality of user equipments in a cell uses a plurality of PUCCH resources in a manner of dividing on every timing point of transmission. Specifically, the PUCCH resource used by the user equipment to transmit ACK/NACK information is implicitly determined based on PDCCH carrying scheduling information for PDSCH via which a corresponding downlink data is transmitted. In a downlink subframe, a whole region to which PDCCH is transmitted is configured with a plurality of CCEs (control channel elements) and PDCCH transmitted to the user equipment is configured with at least one CCE. The CCE includes a plurality of (e.g., 9) REGs (resource element groups). One REG consists of 4 REs (resource elements) adjacent to each other except a reference signal (RS). The user equipment transmits ACK/NACK information via an implicit PUCCH resource induced or calculated by a function of a specific CCE index (e.g., first or lowest CCE index) among indexes of CCEs configuring a received PDCCH.

Referring to FIG. 12, a lowest CCE index of PDCCH corresponds to a PUCCH resource index used for transmitting ACK/NACK. As depicted in FIG. 12, if it is assumed that scheduling information for PDSCH is transmitted to the user equipment via the PDCCH configured with CCE index 4~6, the user equipment transmits ACK/NACK to the base station via such a PUCCH resource corresponding to PUCCH induced or calculated by a CCE index 4, which is the lowest CCE among the CCEs configuring the PDCCH, as the PUCCH resource corresponding to CCE index 4.

FIG. 12 shows an example that there exist maximum M' number of CCEs in a downlink subframe and maximum M number of PUCCH resources in an uplink subframe. Although M' and M may be identical to each other, M' value can be designed to be different from the M value. And, it is also possible to make CCE mapping and PUCCH resource mapping overlap each other. For instance, PUCCH resource index can be determined as follows.

$$n^{(1)}_{PUCCH} = n_{CCE} + N^{(1)}_{PUCCH}$$ [Formula 1]

$n^{(1)}_{PUCCH}$ indicates a PUCCH resource index to transmit ACK/NACK information and $N^{(1)}_{PUCCH}$ indicates a signal value delivered from an upper layer. $n_{CCE}$ indicates a smallest value among CCE indexes used to transmit PDCCH.

Figure 13:
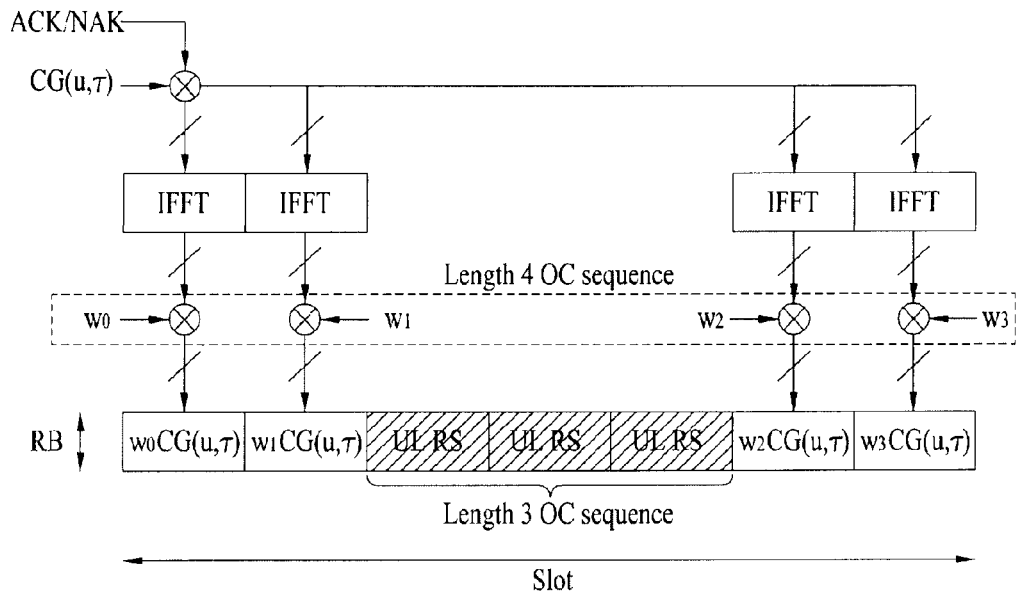
FIG. 13 and FIG. 14 are diagrams for slot level structures of a PUCCH format 1a and 1b for ACK/NACK transmission.
Figure 14:
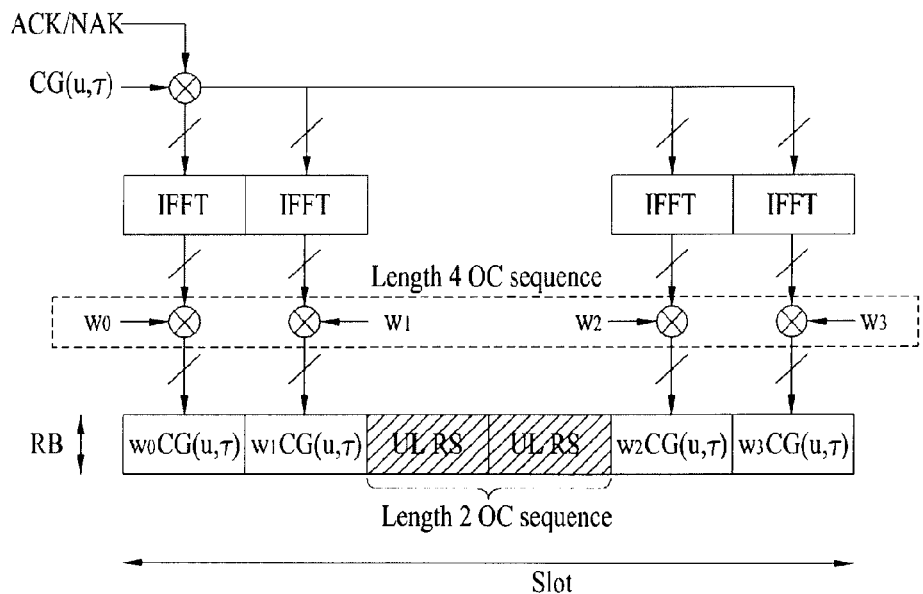

FIG. 13 and FIG. 14 are diagrams for slot level structures of a PUCCH format 1a and 1b used for transmitting ACK/NACK.

FIG. 13 indicates a PUCCH format 1a and 1b in case of a normal cyclic prefix. FIG. 14 indicates a PUCCH format 1a and 1b in case of an extended cyclic prefix. According to the PUCCH format 1a and 1b, uplink control information of an identical content is repeated in a subframe by a slot unit. An ACK/NACK signal is transmitted from a user equipment via different resources, which are configured with cyclic shifts (CS) (frequency domain code) different from each other of CG-CAZAC (computer-generated constant amplitude zero auto correlation) sequence and an orthogonal cover code (orthogonal cover) (OC or OCC) (time domain spreading code). For instance, the OC includes a Walsh/DFT orthogonal code. If the number of CSs correspond to 6 and the number of OCs correspond to 3, total of 18 user equipments can be multiplexed in an identical PRB (physical resource block) on the basis of a single antenna. Orthogonal sequence w0, w1, w2, and w3 can be applied in a random time domain (after FFT modulation) or in a random frequency domain (before FFT modulation). A slot level structure of PUCCH format 1 to transmit SR (scheduling request) information is identical to the PUCCH format 1a and 1b. There exists a difference only in a modulating method.

In order to transmit SR information and ACK/NACK for a semi-persistent scheduling, a PUCCH resource consisted of a CS, an OC, a PRB (physical resource block) and a RS (reference signal) can be allocated to a user equipment via an RRC (radio resource control) signaling. As mentioned earlier in FIG. 12, for a dynamic ACK/NACK (or ACK/NACK for a non-persistent scheduling) feedback and ACK/NACK feedback for PDCCH indicating SPS cancellation, the PUCCH resource can be implicitly allocated to a user equipment using a lowest CCE index of PDCCH corresponding to PDSCH or PDCCH indicating SPS cancellation.

Figure 15:
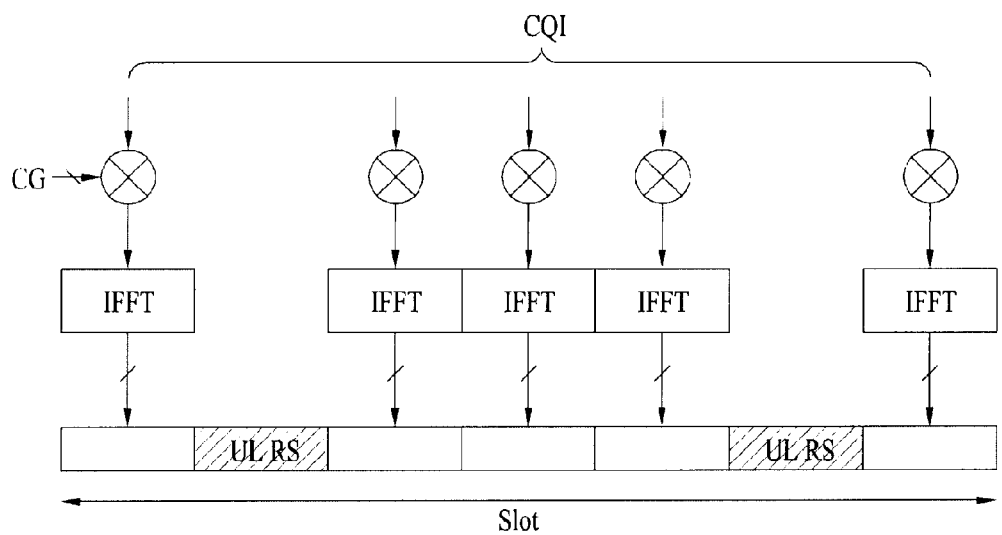
FIG. 15 is a diagram for PUCCH format 2, 2a, and 2b in case of a normal cyclic prefix.
Figure 16:
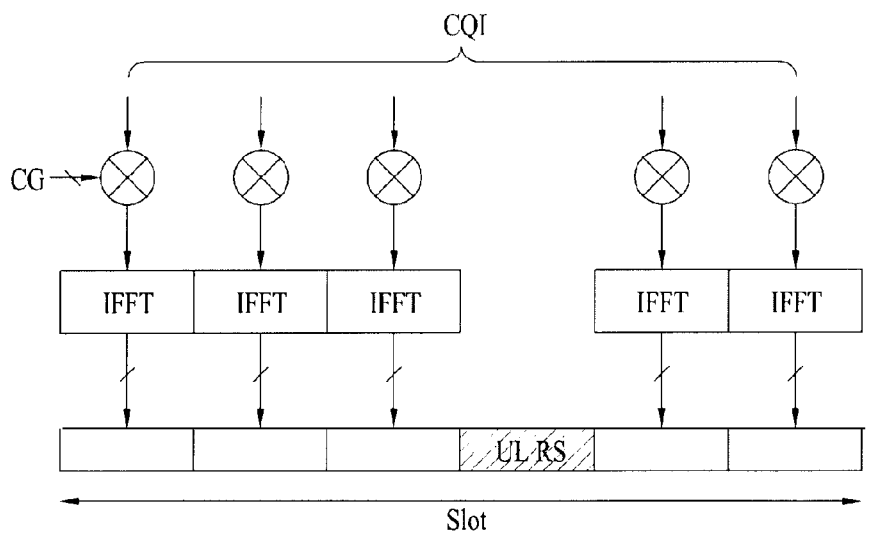
FIG. 16 is a diagram for PUCCH format 2, 2a, and 2b in case of an extended cyclic prefix.

FIG. 15 is a diagram for PUCCH format 2, 2a, and 2b in case of a normal cyclic prefix. FIG. 16 is a diagram for PUCCH format 2, 2a, and 2b in case of an extended cyclic prefix. Referring to FIG. 15 and FIG. 16, in case of a normal CP, one subframe includes 10 QPSK data symbols besides an RS symbol. Each of the QPSK symbols is spread by CS in frequency domain and then mapped to a corresponding SC- FDMA symbol. SC-FDMA symbol level CS hopping can be applied to randomize inter-cell interference. RS can be multiplexed by CDM using a cyclic shift. For instance, if the available number of CS corresponds to 12 or 6, 12 or 6 user equipments can be multiplexed in an identical PRB. In summary, a plurality of user equipments can be multiplexed by CS+OC+PRB and CS+PRB in the PUCCH format 1/1a/1b and PUCCH format 2/2a/2b, respectively.

Table 4 and Table 5 show orthogonal sequence (OC) of length 4 and orthogonal sequence of length 3 used for the PUCCH format 1/1a/1b.

TABLE 4

| Sequence index | Orthogonal sequence |
|---|---|
| 0 | [+1 +1 +1 +1] |
| 1 | [+1 −1 +1 −1] |
| 2 | [+1 −1 −1 +1] |

TABLE 5

| Sequence index | Orthogonal sequence |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 shows orthogonal sequence (OC) for a reference signal used for the PUCCH format 1/1a/1b.

TABLE 6

| Sequence index | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 is a diagram of ACK/NACK channelization for PUCCH format 1a and 1b. FIG. 17 shows a case that $\Delta_{shift}^{PUCCH}=2$.

Figure 18:
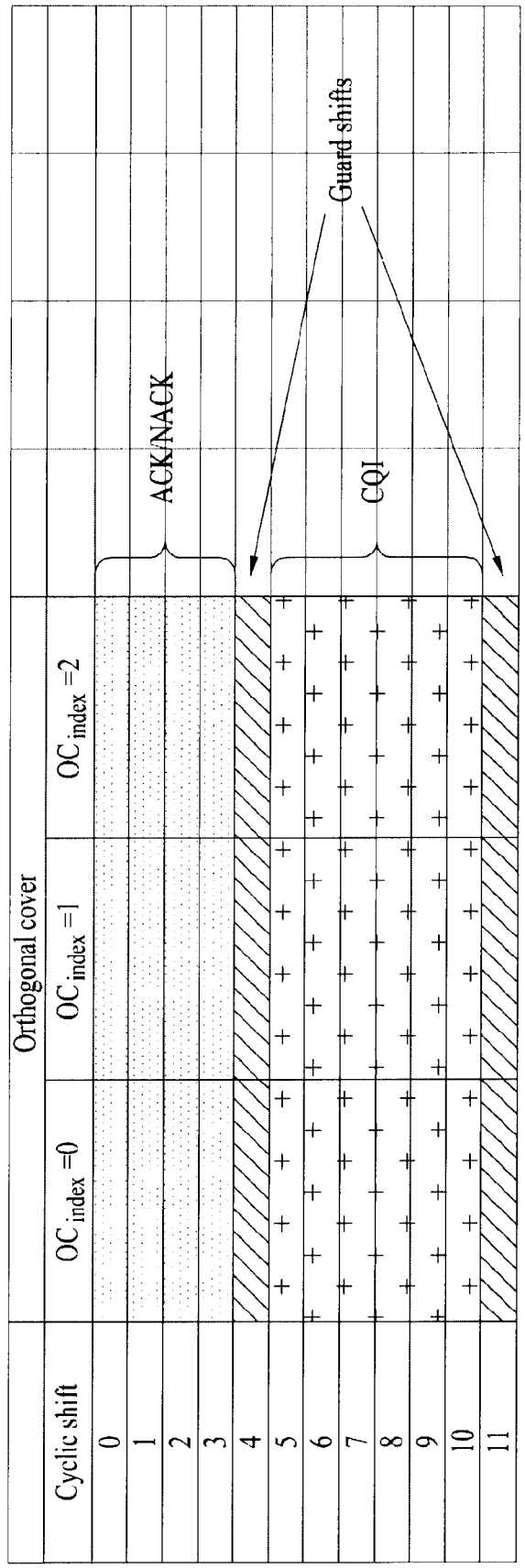
FIG. 18 is a diagram of channelization for a structure mixed by PUCCH format 1/1a/1b and format 2/2a/2b in an identical PRB.

FIG. 18 is a diagram of channelization for a structure mixed by PUCCH format 1/1a/1b and format 2/2a/2b in an identical PRB.

Remapping of cyclic shift hopping (CS) hopping and an orthogonal cover (OC) can be applied as follows.

(1) symbol-based cell-specific CS hopping to randomize inter-cell interference (2) Slot level CS/OC remapping 1) For inter-cell interference randomization 2) slot-based approach for mapping between ACK/NACK channel and resource (k)

Meanwhile, a resource ($n_r$) for the PUCCH format 1/1a/1b includes combination in the following.

(1) CS (=identical to DFT orthogonal code in a symbol level) ($n_{CS}$)

(2) OC (orthogonal cover in a slot level)

(3) Frequency RB (resource block) ($n_{rb}$)

If index indicating CS, OC, and RB corresponds to $n_{CS}$, $n_{OC}$, and $n_{rb}$, respectively, a representative index $n_r$ includes $n_{CS}$, $n_{OC}$, and $n_{rb}$. The $n_r$ satisfies '$n_r=(n_{CS}, n_{OC}, n_{rb})$'.

A combination of CQI, PMI, RI, and CQI with ACK/NACK can be delivered via PUCCH format 2/2a/2b. Reed Muller (RM) channel coding may be applied.

For instance, a channel coding for an UL CQI in an LTE system is described as follows. A bit stream $a_0, a_1, a_2, a_3, \ldots, a_{A-1}$ is channel coded using (20, A) RM code. Table 7 shows a basic sequence for the (20, A) code. $a_0$ and $a_{A-1}$ indicate MSB (most significant bit) and LSB (least significant bit), respectively. In case of an extended cyclic prefix, maximum transmission bit corresponds to 11-bits except a case that CQI and ACK/NACK are simultaneously transmitted. After the bit is coded to 20-bits using the RM code, QPSK modulation can be applied. Prior to the QPSK modulation, the coded bit can be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

A channel coding bit $b_0, b_1, b_2, b_3, \ldots, b_{B-1}$ can be generated by Formula 2.

$$b_i = \sum_{n=0}^{A-1} (a_n \cdot M_{i,n}) \bmod 2 \quad \text{[Formula 2]}$$

In this case, i satisfies 'i=0, 1, 2, ..., B−1'.

Table 8 indicates an UCI (uplink control information) field used for a wideband report (single antenna port, transmit diversity) or open loop spatial multiplexing PDSCH CQI feedback.

TABLE 8

| field | bandwidth |
|---|---|
| wideband CQI | 4 |

Table 9 indicates uplink control information (UCI) field used for wideband CQI and PMI feedback and the field reports closed loop spatial multiplexing PDSCH transmission.

TABLE 9

| | bandwidth | | | |
|---|---|---|---|---|
| | 2 antenna ports | | 4 antenna ports | |
| field | rank = 1 | rank = 2 | rank = 1 | rank > 1 |
| wideband CQI | 4 | 4 | 4 | 4 |
| Spatial discretization CQI | 0 | 3 | 0 | 3 |
| PMI (Precoding Matrix Index) | 2 | 1 | 4 | 4 |

Table 10 indicates uplink control information (UCI) field used for RI feedback for a wideband report.

TABLE 10

| | Bit widths | | |
|---|---|---|---|
| field | 2 antenna ports | 4 antenna ports | |
| field | 2 antenna ports | Maximum 2 layers | Maximum 4 layers |
| RI (Rank Indication) | 1 | 1 | 2 |

Figure 19:
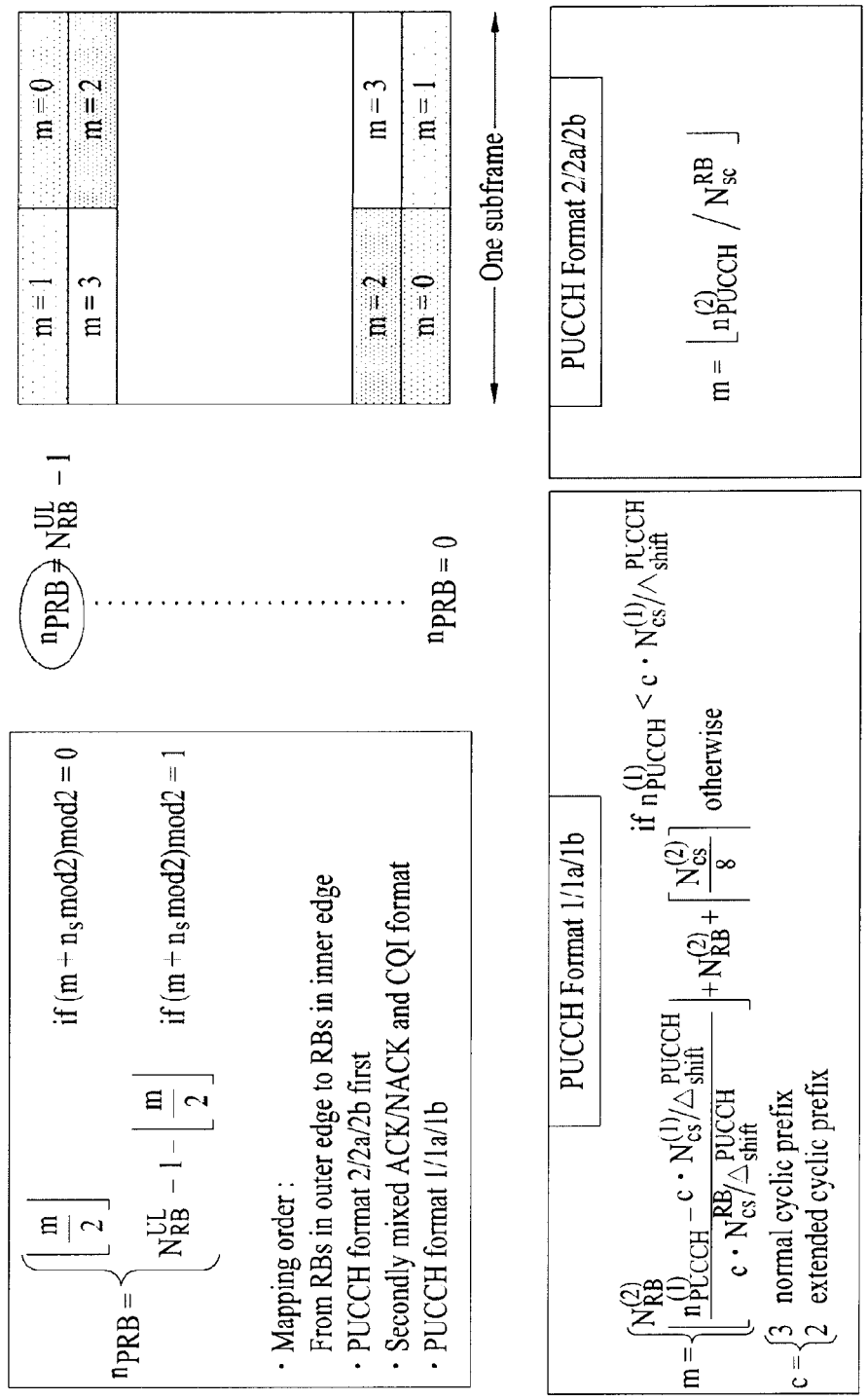
FIG. 19 is a diagram for physical resource block (PRB) allocation.

FIG. 19 is a diagram for physical resource block (PRB) allocation. As depicted in FIG. 19, a PRB can be used for transmission of PUCCH in slot $n_s$.

A multi-carrier system or a carrier aggregation system is a system using a plurality of carriers having a smaller bandwidth compared to a target bandwidth in a manner of aggregating a plurality of the carriers. When a plurality of the carriers having a smaller bandwidth compared to the target bandwidth are aggregated, the bandwidth of the aggregated carriers may be limited to a bandwidth used by a legacy system to have backward compatibility. For instance, a legacy LTE system supports 1.4 MHz, 3 MHz, 5 MHz, 10 MHz, 15 MHz, and 20 MHz. And, LTE-A (LTE-advanced) system, which is enhanced from a LTE system, can support a bandwidth greater than 20 MHz by using the bandwidths supported by the LTE only. Or, a carrier aggregation can be supported in a manner of defining a new bandwidth irrespective of the bandwidth used by the legacy system. The terminology of multi-carrier is a terminology capable of being used in a manner of being mixed with carrier aggregation or bandwidth aggregation. The carrier aggregation may be a common name for a contiguous carrier aggregation and a non-contiguous carrier aggregation. And, the carrier aggregation may be a common name for intra-band carrier aggregation and an inter-band carrier aggregation.

Figure 20:
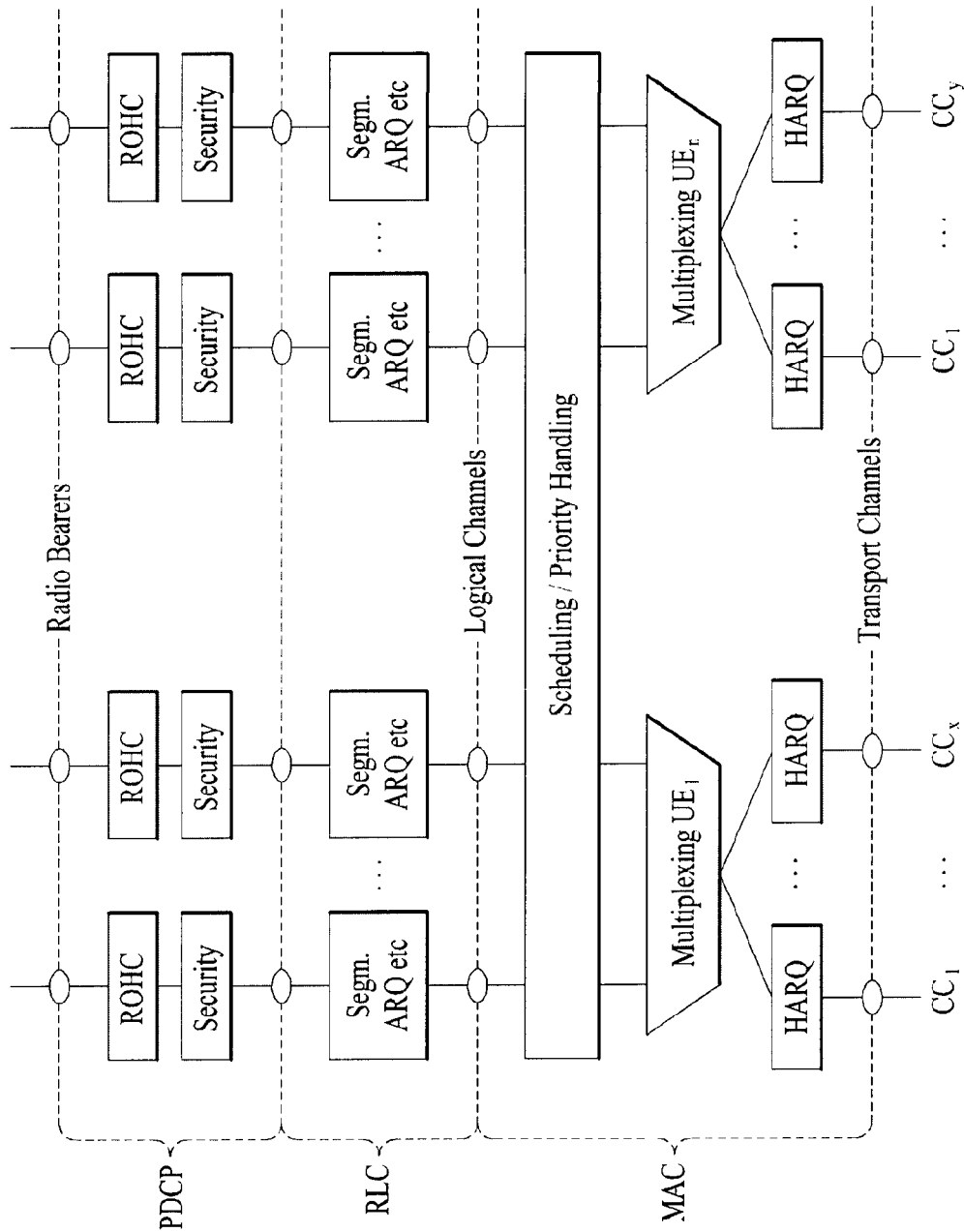
FIG. 20 is a diagram for a concept that a base station manages downlink component carriers (DL CCs)
Figure 21:
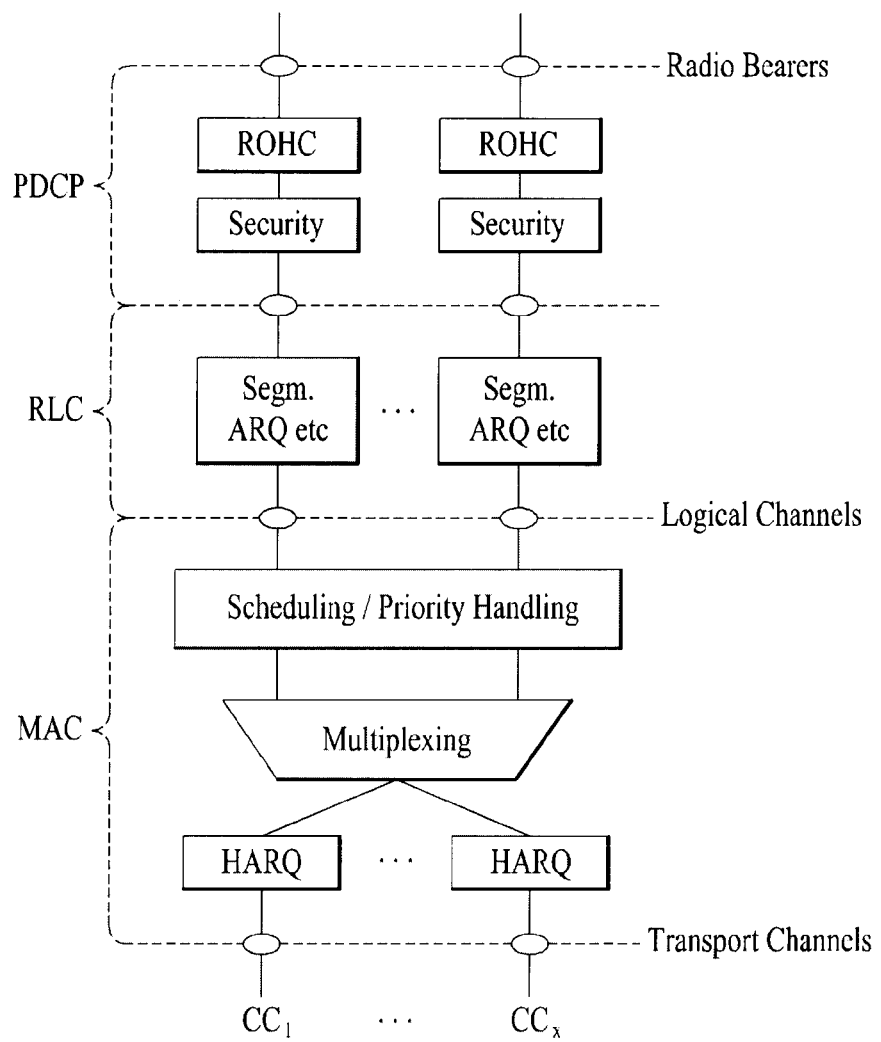
FIG. 21 is a diagram for a concept that a user equipment manages uplink component carriers (UL CCs)

FIG. 20 is a diagram for a concept that a base station manages downlink component carriers (DL CCs) and FIG. 21 is a diagram for a concept that a user equipment manages uplink component carriers (UL CCs). For clarity, an upper layer is explained in the following description in a manner that the upper layer is simplified into MAC in FIG. 19 and FIG. 20.

Figure 22:
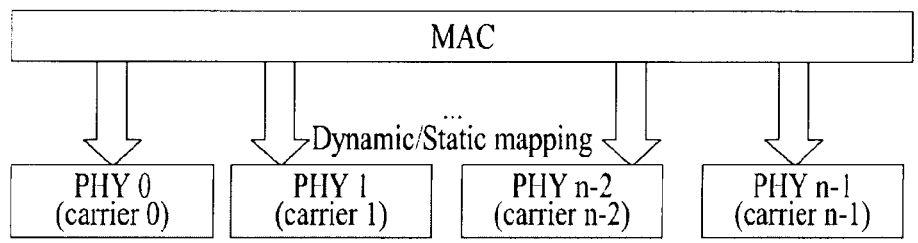
FIG. 22 is a diagram for a concept that one MAC manages multi-carriers in a base station.
Figure 23:
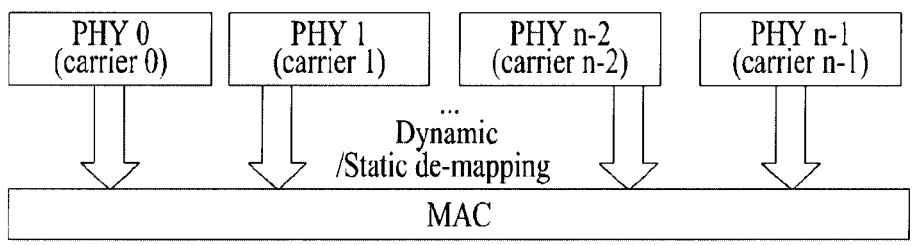
FIG. 23 is a diagram for a concept that one MAC manages multi-carriers in a user equipment.

FIG. 22 is a diagram for a concept that one MAC manages multi-carriers in a base station. FIG. 23 is a diagram for a concept that one MAC manages multi-carriers in a user equipment.

Referring to FIG. 22 and FIG. 23, one MAC manages and operates at least one frequency carrier and then performs transmission and reception. Since the frequency carriers managed by the one MAC are not necessary to be contiguous to each other, it is more flexible in terms of managing a resource. In FIG. 22 and FIG. 23, for clarity, assume that one PHY means one component carrier. In this case, one PHY is not necessary to be an independent RF (radio frequency) device. Although one independent RF device means one PHY in general, this is not a mandatory. One RF device may include a plurality of PHYs.

Figure 24:
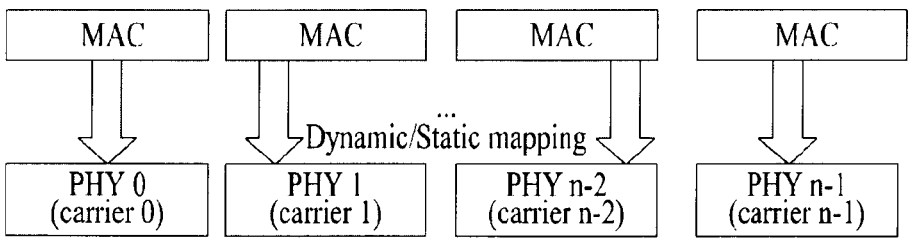
FIG. 24 is a diagram for a concept that pluralities of MACs manage multi-carriers in a base station.
Figure 25:
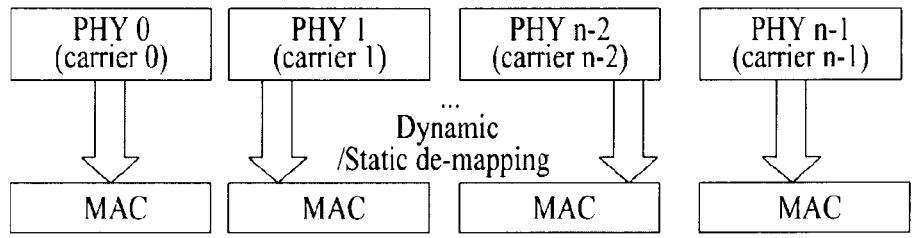
FIG. 25 is a diagram for a concept that pluralities of MACs manage multi-carriers in a user equipment.
Figure 26:
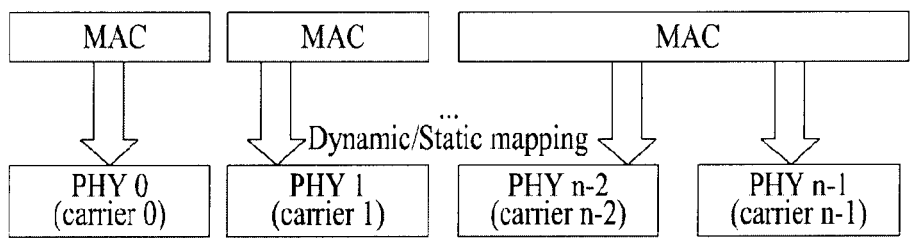
FIG. 26 is a diagram for a different concept that pluralities of MACs manage multi-carriers in a base station.
Figure 27:
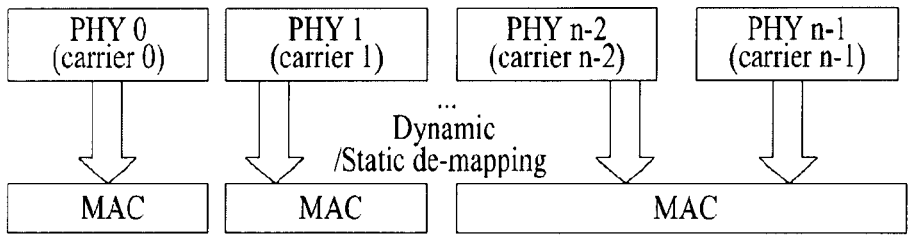
FIG. 27 is a diagram for a different concept that pluralities of MACs manage multi-carriers in a user equipment.

FIG. 24 is a diagram for a concept that pluralities of MACs manage multi-carriers in a base station. FIG. 25 is a diagram for a concept that pluralities of MACs manage multi-carriers in a user equipment. FIG. 26 is a diagram for a different concept that pluralities of MACs manage multi-carriers in a base station. FIG. 27 is a diagram for a different concept that pluralities of MACs manage multi-carriers in a user equipment.

Besides the structures shown in FIG. 22 and FIG. 23, a plurality of carriers can be controlled not by one MAC but by a plurality of MACs as depicted in FIG. 24 to FIG. 27.

As depicted in FIG. 24 and FIG. 25, each of the carriers can be controlled by each of a plurality of MACs by one-to-one. Or, as depicted in FIG. 26 and FIG. 27, each of the MACs controls each of the carriers by one-to-one for a part of the carriers and one or more remaining carriers can be controlled by one MAC.

The aforementioned system is a system including a plurality of carriers from 1 to N. Each of the carriers can be used in a manner of being contiguous or non-contiguous to each other. This may be applicable to both uplink and downlink without distinction. A TDD system is configured to manage N numbers of multiple carriers including DL/UL transmission in each of the carriers and a FDD system is configured to use a plurality of carriers for UL and DL, respectively. In case of the FDD system, The FDD system can also support asymmetrical carrier aggregation where the number of aggregated carriers and/or a bandwidth of the aggregated carriers aggregated are different from each other in UL and DL.

When the number of component carriers aggregated in UL and the number of the component carriers aggregated in DL are identical to each other, it is able to configure all component carriers to be compatible with a legacy system. Yet, a component carrier not considering compatibility is also included in the scope of the present invention.

Figure 28:
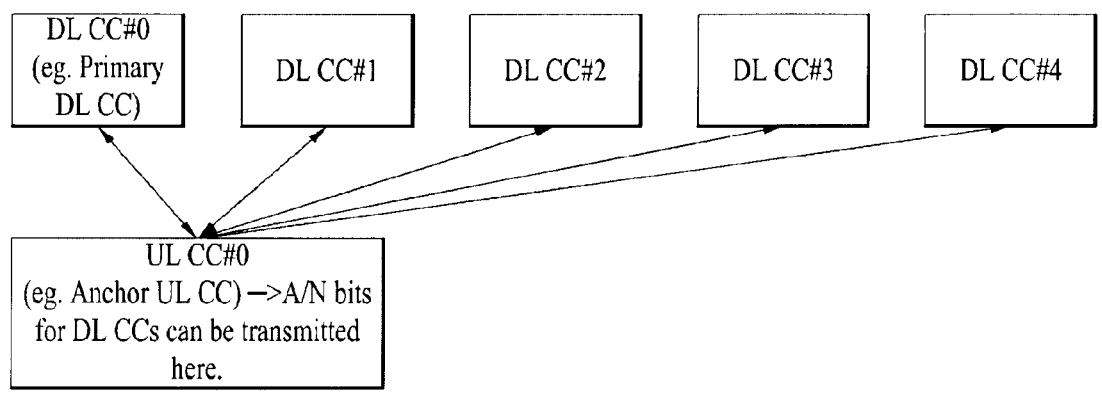
FIG. 28 is a diagram for asymmetrical carrier aggregation that 5 downlink component carriers (DL CCs) are linked to one uplink component carrier (UL CC)

FIG. 28 is a diagram for an example of asymmetrical carrier aggregation configured with 5 downlink component carriers (DL CCs) and one uplink component carrier (UL CC). The exemplified asymmetrical carrier aggregation may be configured in terms of UL control information (UCI) transmission. A specific UCI (e.g. ACK/NACK response) on a plurality of DL CCs is transmitted in a manner of being collected in one UL CC. And, in case that a plurality of UL CCs are configured, a specific UCI (e.g., ACK/NACK response on DL CCs) is transmitted on a predetermined UL CC (e.g., a primary CC, a primary cell, or a PCell). For clarity, if it is assumed that each DL CC can carry maximum 2 codewords and the number of ACK/NACK for each CC is dependent on the maximum number of codeword configured for the each CC, (for instance, if the maximum number of codeword of a specific CC configured by a base station corresponds to 2, although a specific PDCCH uses one codeword in the CC, ACK/NACK is made by 2 corresponding to the maximum number of codeword in the CC) at least 2 bits per each CC are necessary for UL ACK/NACK bit. In this case, ACK/NACK bit of at least 10 bits is required to transmit ACK/NACK for the data received on 5 DL CCs on a single UL CC. If DTX (discontinuous transmission) state is also necessary to be separately distinguished according to DL CC, at least 12 bits ($=5^6=3125=11.61$ bits) are required to transmit ACK/NACK. Since a legacy PUCCH format 1a and 1b can transmit ACK/NACK as many as 2 bits, this structure cannot transmit increased ACK/NACK information. Although carrier aggregation is exemplified as a reason for increasing the amount of uplink control information, this sort of situation may occur due to the increase of the number of antennas, TDD system, existence of a backhaul subframe in a relay system, and the like. Similar to the ACK/NACK, if control information related to a plurality of DL CCs is transmitted on a single UL CC, the amount of control information to be transmitted also increases. For instance, in case of transmitting CQI/PMI/RI on a plurality of DL CCs, UCI payload may increase. Meanwhile, although the present invention exemplifies ACK/NACK information for a codeword, there exist a transport block corresponding to the codeword and it is apparent that the ACK/NACK can be applied as the ACK/NACK for the transport block.

An UL anchor CC (UL PCC (primary CC), also called UL primary CC) depicted in FIG. 28 is a CC on which PUCCH resource or UCI is transmitted. The UL anchor CC can be cell-specifically or UE-specifically determined. For instance, a user equipment can determine a CC attempting a first random access as a primary CC. In this case, feedback for DTX state can be explicitly performed or the feedback for DTX state may be performed to share a state identical to NACK.

LTE-A uses a concept of a cell to manage a radio resource. A cell can be defined by a combination of a DL resource and a UL resource. In this case, the UL resource is not an essential element. Hence, a cell can consist of the DL resource only or both the DL resource and the UL resource. If carrier aggregation is supported, a linkage between a carrier frequency of a DL resource (or DL CC) and a carrier frequency of a UL resource (or UL CC) can be indicated by system information. A cell operating on a primary frequency resource (or PCC) is called a primary cell (PCell) and a cell operating on a secondary frequency resource (or SCC) may be called a secondary cell (SCell). The PCell may correspond to the cell used by a UE to perform an initial connection establishment or a connection re-establishment. The PCell may correspond to the cell indicated in a handover process. According to LTE-A release 10, only one PCell can exist when carrier aggregation is performed. The SCell is configurable after an RRC connection has been established. And, the SCell may be usable to provide an additional radio resource. Both the PCell and the SCell can be commonly called a serving cell. Hence, if a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell exists. And, one PCell and at least one SCell are included in the whole of serving cells. For carrier aggregation, after an initial security activating process has started, a network may be able to configure at least one SCell for the UE supporting the carrier aggregation in addition to the PCell configured in the early stage of a connection establishment process. Hence, a PCC corresponds to a PCell, a primary (radio) resource, or a primary frequency resource. These terminologies can be used in a manner of being mixed with each other. Similarly, an SCC corresponds to a SCell, a secondary (radio) resource, or a secondary frequency resource. These terminologies can be used in a manner of being mixed with each other.

In the following description, a method of efficiently transmitting increased UL control information is described with reference to drawings. Specifically, a new PUCCH format, a signal processing process, a resource allocating method and the like to transmit increased UL control information are proposed. The new PUCCH format proposed by the present invention is called a CA (carrier aggregation) PUCCH format or a PUCCH format 3 since a legacy LTE release 8/9 has defined up to format 2. A technical idea of the PUCCH format proposed by the present invention can be easily applied to a random physical channel (e.g., PUSCH) as well using an identical or similar scheme. For instance, embodiment of the present invention can be applied to a periodic PUSCH structure periodically transmitting control information or a non-periodic PUSCH structure non-periodically transmitting control information.

Following drawings and embodiment correspond to UCI/RS symbol structure of a subframe/slot level applied to the PUCCH format 3. The embodiment is explained centering on a case that UCI/RS symbol structure of PUCCH format 1/1a/1b (normal CP) of a legacy LTE is used. Yet, the depicted UCI/RS symbol structure of a subframe/slot level defined by the PUCCH format 3 is just an example. Hence, the present invention may be non-limited to a specific structure. In the PUCCH format 3 according to the present invention, the number of UCI/RS symbols, a position of UCI/RS symbols, and the like can be freely modified in accordance with a system design. For instance, the PUCCH format 3 according to embodiment of the present invention can be defined using an RS symbol structure of PUCCH format 2/2a/2b of a legacy LTE.

The PUCCH format 3 according to embodiment of the present invention can be used to transmit UL control information of a random type/size. For instance, the PUCCH format 3 according to embodiment of the present invention can transmit such information as HARQ ACK/NACK, CQI, PMI, RI, SR, and the like. This sort of information may have a payload of a random size. For clarity, drawings and embodiment are explained centering on a case that the PUCCH format 3 according to the present invention transmits the ACK/NACK information.

FIG. 29 to FIG. 32 is diagram for an example of a structure of PUCCH format 3 to which the present invention is applied and a signal processing process therefor. In particular, FIG. 29 to FIG. 32 is a diagram for an example of a structure of a DFT-based PUCCH format. According to the DFT-based PUCCH structure, PUCCH is transmitted in a manner that DFT precoding is performed and time domain OC (orthogonal cover) is applied with SC-FDMA level. In the following description, the DFT-based PUCCH format is commonly called the PUCCH format 3.

Figure 29:
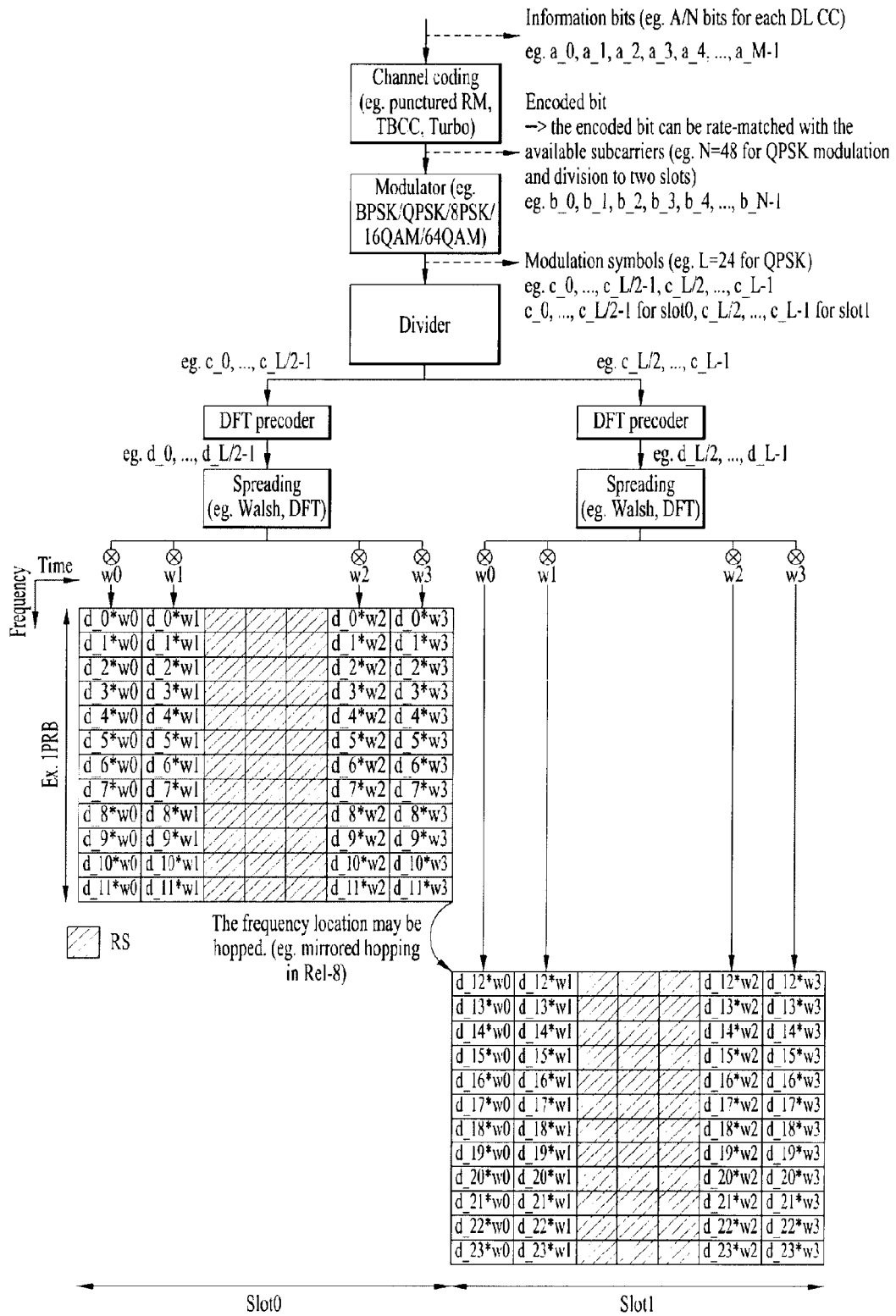
FIG. 29 to FIG. 32 is diagram for a structure of a PUCCH format 3 to which the present invention is applied and a signal processing process therefor.

FIG. 29 is a diagram for an example of a structure of the PUCCH format 3 using an orthogonal code (OC) where an SF corresponds to 4. Referring to FIG. 29, a channel coding block performs a channel coding on transmission bit $a\_0$, $a\_1, \ldots, a\_M-1$ (e.g., multiple ACK/NACK bits) and then generates a coding bit (encoded bit, coded bit, or coding bit) (or codeword) $b\_0, b\_1, \ldots, b\_N-1$. M indicates a size of the transmission bit and N indicates a size of the coding bit. The transmission bit includes UL control information (UCI), for instance, multiple ACK/NACK for a plurality of data (or PDSCH) received via a plurality of DL CCs are included in the transmission bit. In this case, the transmission bit $a\_0$, $a\_1, \ldots, a\_M-1$ is joint-coded irrespective of a type/number/size of the UCI consisting of the transmission bit. For instance, if the transmission bit includes multiple ACK/NACK on a plurality of DL CCs, a channel coding is not performed according to a DL CC and an individual ACK/NACK bit. Instead, the channel coding is performed for a whole of bit information. By doing so, a single codeword can be generated. Although it is not limited to this, the channel coding includes simple repetition, simplex coding, RM (Reed Muller) coding, punctured RM coding, TBCC (tail-biting convolutional coding), LDPC (low-density parity-check), or turbo coding. Although it is not depicted, the coding bit can be rate-matched in consideration of a modulation order and an amount of resource. A rate matching function is included as a part of a channel coding block or can be performed by a separate function block. For instance, the channel coding block obtains a single codeword by performing RM coding on a plurality of control information (32, 0) and may be then able to perform a circular buffer rate matching for the codeword.

A modulator modulates the coding bits $b\_0, b\_1, \ldots, b\_N-1$ and then generates modulation symbols $c\_0, c\_1, \ldots, c\_L-1$. L indicates a size of the modulation symbols. A modulation scheme is performed in a manner of modifying a size and phase of a transmission signal. For instance, the modulation scheme includes n-PSK (phase shift keying), n-QAM (quadrature amplitude modulation) (n is an integer equal to or greater than 2). Specifically, the modulation scheme may include BPSK (Binary PSK), QPSK (Quadrature PSK), 8-PSK, QAM, 16-QAM, 64-QAM, and the like.

A divider divides the modulation symbols $c\_0, c\_1, \ldots, c\_L-1$ into each slot. An order/pattern/scheme for dividing the modulation symbols into each slot is not specially limited. For instance, the divider can sequentially divide the modulation symbols into each slot from the front (localized scheme). In this case, as depicted in the drawing, the modulation symbols $c\_0, c\_1, \ldots, c\_L/2-1$ are divided into a slot 0 and the modulation symbols $c\_L/2, c\_L/2+1, \ldots, c\_L-1$ can be divided into a slot 1. When the modulation symbols are divided into each slot, interleaving (or permutation) can be performed for the modulation symbols. For instance, a modulation symbol of an even number is divided into the slot 0 and a modulation symbol of an odd number can be divided into the slot 1. An order of the modulation process and an order of the dividing process may be reversed.

A DFT precoder performs DFT precoding (e.g. 12-point DFT) on the modulation symbols divided into each slot to generate a single carrier waveform. Referring to FIG. 29, the modulation symbols $c\_0, c\_1, \ldots, c\_L/2-1$ divided into the slot 0 are DFT-precoded to DFT symbols $d\_0, d\_1, \ldots, D\_L/2-1$ and the modulation symbols $c\_L/2, c\_L/2+1, \ldots, c\_L-1$ divided into the slot 1 are DFT-precoded to DFT symbols $d\_L/2, d\_L/2+1, \ldots, d\_L-1$. The DFT precoding can be replaced by a different corresponding linear operation (e.g., Walsh precoding).

A spreading block spreads a DFT-performed signal in an SC-FDMA symbol level (time domain). The time domain spread of the SC-FDMA symbol level is performed using a spreading code (sequence). The spreading code includes a quasi-orthogonal code and an orthogonal code. The quasi-orthogonal code includes a PN (pseudo noise) code, by which the present invention may be non-limited. The orthogonal code includes a Walsh code and a DFT code, by which the present invention may be non-limited. For clarity, the present specification is explained centering on the orthogonal code as a representative example of the spreading code. Yet, this is just an example. The orthogonal code can be replaced by the quasi-orthogonal code. A maximum value of a spreading code size (or a spreading factor (SF)) is limited by the number of SC-FDMA symbols used for transmitting control information. As an example, in case that 4 SC-FDMA symbols are used to transmit the control information in a slot, orthogonal codes (w0, w1, w2, and w3) of length 4 can be used according to a slot. The SF may mean the extent of spreading and may be related to a multiplexing order of a user equipment or a multiplexing order of an antenna. The SF may vary (1, 2, 3, 4, . . . etc.) depending on a system requirement, may be defined in advance between a user equipment and a base station, or may be informed to a user equipment via a downlink control information (DCI) or an RRC signaling. As an example, in case that one of SC-FDMA symbols used for control information is punctured in order to transmit an SRS, a spreading code where an SF is reduced (e.g., SF=3 instead of SF=4) can be applied to the control information of the corresponding slot.

A signal generated by passing through the above process is mapped to a subcarrier within a PRB, undergoes an IFFT, and then is converted to a time domain signal. A CP is added to the time domain signal and a generated SC-FDMA symbol is transmitted by RF unit.

Each of the aforementioned processes is explained in more detail in a manner of assuming a case that ACK/NACK for 5 DL CCs is transmitted. If each DL CC is able to transmit 2 PDSCHs, ACK/NACK bit for the each DL CC may correspond to 12 bits if DTX state is included. If QPSK modulation and time spreading where SF=4 are assumed, a coding block size (after a rate-matching) may correspond to 48 bits. A coding bit is modulated to 24 QPSK symbols and generated QPSK symbols are divided into each slot in groups of 12. The 12 QPSK symbols in each slot are converted to 12 DFT symbols via a 12-point DFT calculation. The 12 DFT symbols in each slot are mapped to 4 SC-FDMA symbols in time domain in a manner of being spread using a spreading code where SF=4. Since 12 bits are transmitted via [2 bits*12 subcarriers*8 SC-FDMA symbols], a coding rate may correspond to 0.0625 (=12/192). And, if an SF corresponds to 4, maximum 4 user equipments per one PRB can be multiplexed.

Figure 30:
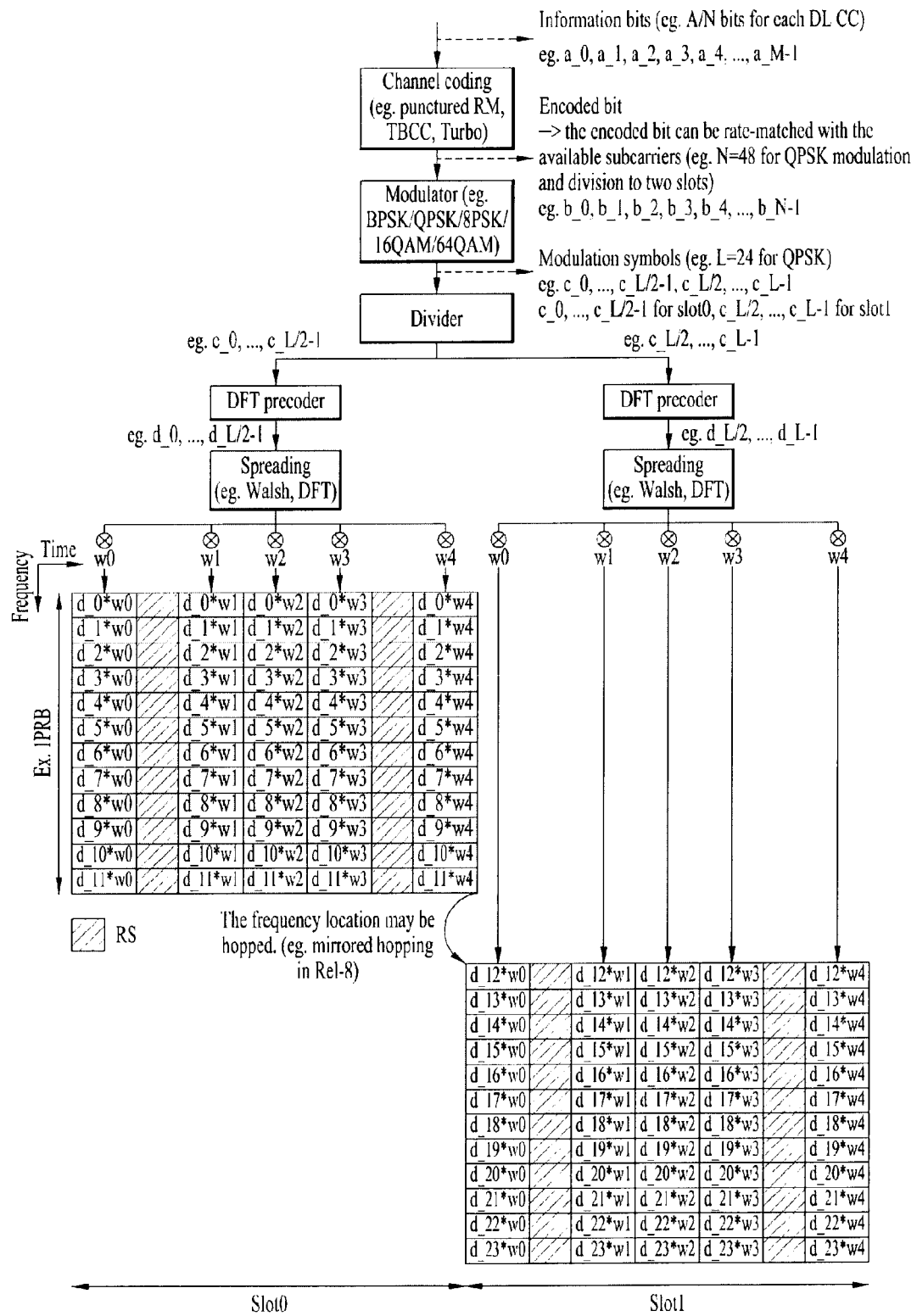

FIG. 30 is a diagram for an example of a PUCCH format 3 structure using an orthogonal code (OC) where SF=5.

A basic signal processing process in FIG. 30 is identical to the content explained with reference to FIG. 29. Yet, the number/position of UL control information (UCI) SC-FDMA symbols and that of RS SC-FDMA symbols are differentiated compared to FIG. 29. In this case, a spreading block may be applied in advance in the front end of a DFT precoder.

In FIG. 30, an RS may succeed a structure of an LTE system. For instance, a cyclic shift can be applied to a basic sequence. Multiplexing capacity of a data part becomes 5 due to a condition where SF=5. Yet, the multiplexing capacity of an RS part is determined according to $\Delta_{shift}^{PUCCH}$ which corresponds to a cyclic shift space. For instance, $12/\Delta_{shift}^{PUCCH}$ is given as the multiplexing capacity. In this case, in case of $\Delta_{shift}^{PUCCH}=1, \Delta_{shift}^{PUCCH}=2, \Delta_{shift}^{PUCCH}=3$, the multiplexing capacity becomes 12, 6, and 4, respectively. In FIG. 30, the multiplexing capacity of the data part becomes 5 due to a condition where SF=5. On the other hand, the multiplexing capacity of the RS part becomes 4 in case of $\Delta_{shift}^{PUCCH}$. Hence, the total multiplexing capacity may be limited to 4, which corresponds to a smaller value among the two multiplexing capacities.

Figure 31:
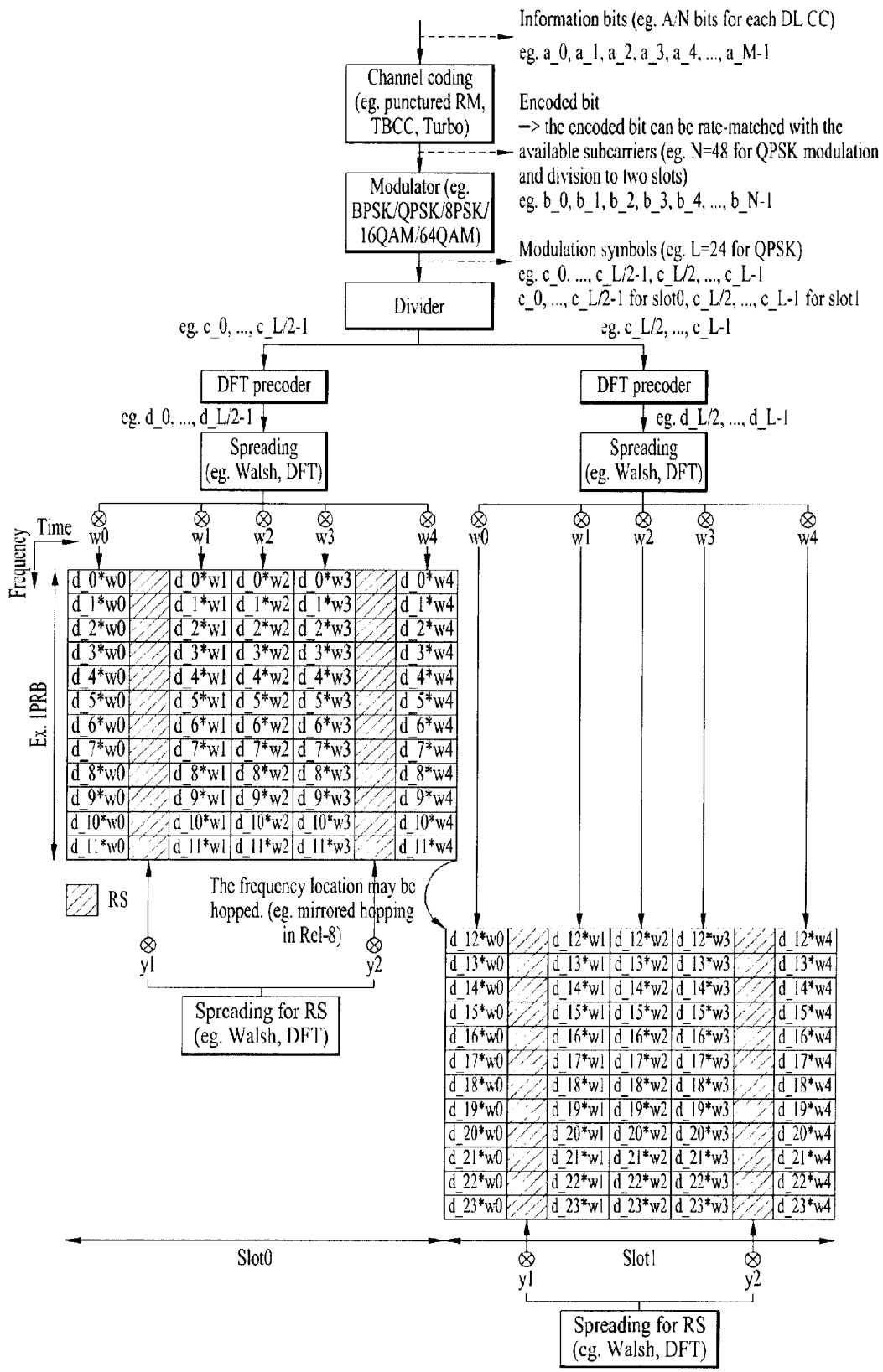

FIG. 31 is a diagram for an example of a PUCCH format 3 structure where a multiplexing capacity may increase in a slot level.

The SC-FDMA symbol level spreading described earlier in FIG. 29 and FIG. 30 can be applied to an RS to increase the total multiplexing capacity. Referring to FIG. 31, if a Walsh cover (or DFT code cover) is applied in a slot, the multiplexing capacity increases as much as twice. By doing so, the multiplexing capacity also becomes 8 even in case of $\Delta_{shift}^{PUCCH}$. Hence, the multiplexing capacity of a data part is not degraded. In FIG. 31, [y1 y2]=[1 1], [y1 y2]=[1 -1], or a form of linear conversion (e.g., [j j] [j -j], [1 j] [1 -j] and the like) can be used as an orthogonal cover code for the RS.

Figure 32:
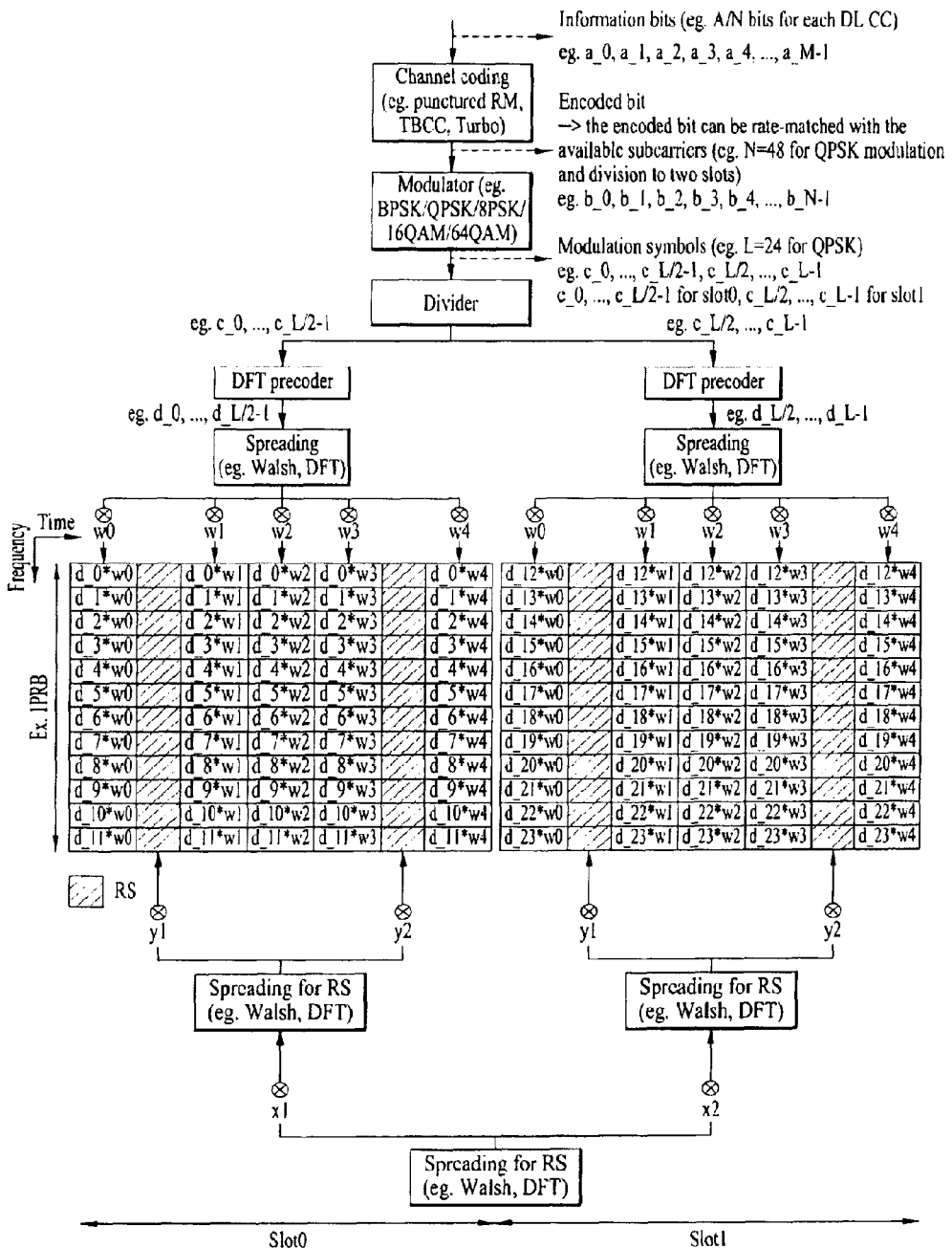

FIG. 32 is a diagram for an example of a PUCCH format 3 structure where a multiplexing capacity may increase in a subframe level.

If a frequency hopping is not applied in a slot level, a multiplexing capacity can be increased as much as twice by applying a Walsh cover in a slot unit. As mentioned earlier, [x1 x2]=[1 1] or [1 -1] can be used as an orthogonal cover code. A conversion form of the [x1 x2]=[1 1] or [1 -1] can be used as well.

For reference, the PUCCH format 3 processing process is not limited to the orders depicted in FIG. 29 to FIG. 30.

FIG. 33 is a diagram for a transmission structure of ACK/NACK information using a channel selection to which the present invention is applied. Referring to FIG. 33, two PUCCH resources or PUCCH channels (PUCCH resource #0 and #1 or PUCCH channel #0 and #1) can be configured for a PUCCH format 1b to transmit ACK/NACK information of 2 bits.

In case that ACK/NACK information of 3 bits is transmitted, 2 bits among the ACK/NACK information of 3 bits can be represented by the PUCCH format 1b and a remaining 1 bit can be represented in a manner that which PUCCH resource is selected among the 2 PUCCH resources. For instance, since 1 bit (two cases) can be represented by selecting one of cases including a case that ACK/NACK information is transmitted using a PUCCH resource #0 and a case that ACK/NACK information is transmitted using a PUCCH resource #1, the ACK/NACK information of the total 3 bits can be represented.

Table 11 indicates an example that ACK/NACK information of 3 bits is transmitted using a channel selection. In this case, assume that two PUCCH resource are configured.

TABLE 11

| ACK/NACK | Ch1 | | Ch2 | |
|---|---|---|---|---|
| | RS | Data | RS | Data |
| N, N, N | 1 | 1 | 0 | 0 |
| N, N, A | 1 | -j | 0 | 0 |

TABLE 11-continued

| ACK/NACK | Ch1 | | Ch2 | |
|---|---|---|---|---|
| | RS | Data | RS | Data |
| N, A, N | 1 | j | 0 | 0 |
| N, A, A | 1 | -1 | 0 | 0 |
| A, N, N | 0 | 0 | 1 | 1 |
| A, N, A | 0 | 0 | 1 | -j |
| A, A, N | 0 | 0 | 1 | j |
| A, A, A | 0 | 0 | 1 | -1 |

In Table 11, 'A' means ACK information and 'N' means NACK information or NACK/DTX information. '1, -1, j, and -j' mean 4 complex modulation symbols where b(0) and b(1), which correspond to transmission information of 2 bits transmitted in a PUCCH format, underwent QPSK modulation. The b (0) and b (1) correspond to binary transmission bits transmitted using a selected PUCCH resource. For instance, the binary transmission bit b (0) and b (1) can be transmitted via a PUCCH resource in a manner of being mapped to a complex modulation symbol according to Table 12.

TABLE 12

| modulation | Binary transmission bit b(0), b(1) | Complex modulation symbol |
|---|---|---|
| QPSK | 0, 0 | 1 |
| | 0, 1 | -j |
| | 1, 0 | j |
| | 1, 1 | -1 |

FIG. 34 is a diagram for a transmission structure of ACK/NACK information using an enhanced channel selection to which the present invention is applied. For clarity, PUCCH #0 and PUCCH #1 are depicted in time/frequency domain different from each other in FIG. 34. Yet, the PUCCH #0 and the PUCCH #1 can be configured to use codes different from each other in an identical time/frequency domain. Referring to FIG. 34, two PUCCH resources (PUCCH resource #0 and #1) can be configured for a PUCCH format 1a to transmit ACK/NACK information of one bit.

In case that ACK/NACK information of 3 bits is transmitted, 1 bit among the ACK/NACK information of 3 bits can be represented by the PUCCH format 1b and another 1 bit can be represented in a manner that which PUCCH resource (PUCCH resource #0 and #1) is selected to transmit the ACK/NACK information. And, the other 1 bit can be differently represented according to whether a reference signal for a prescribed resource is transmitted. In this case, although it is preferable to transmit the reference signal in time/frequency domain of firstly selected PUCCH resources (PUCCH resource #0 and #1), it may also be able to transmit the reference signal in time/frequency domain of an original PUCCH resource of the reference signal.

In particular, in case that the ACK/NACK information is transmitted via the PUCCH resource #0 and a reference signal for a resource corresponding to the PUCCH resource #0 is transmitted and in case that the ACK/NACK information is transmitted via the PUCCH resource #1 and a reference signal for a resource corresponding to the PUCCH resource #1 is transmitted, since 2 bits (4 cases) can be represented by selecting a case among the cases including a case that the ACK/NACK information is transmitted via the PUCCH resource #0 and a reference signal for a resource corresponding to the PUCCH resource #1 is transmitted and a case that the ACK/NACK information is transmitted via the PUCCH resource #0 and a reference signal for a resource corresponding to the PUCCH resource #1 is transmitted, the ACK/NACK information of the total 3 bits can be represented.

Table 13 indicates an example that the ACK/NACK information of 3 bits is delivered using an enhanced channel selection. In this case, assume a case that two PUCCH resources are configured to transmit the ACK/NACK information.

TABLE 13

| ACK/NACK | Ch1 | | Ch2 | |
| --- | --- | --- | --- | --- |
|  | RS | Data | RS | Data |
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Unlike Table 12 using a channel selection, Table 13 using an enhanced channel selection may have a meaning in that a symbol mapped to a PUCCH resource can be implemented by BPSK modulation. Yet, unlike an example of Table 13, it is also possible to implement a complex symbol by QPSK modulation using PUCCH format 1b. In this case, the number of bits capable of being transmitted by an identical PUCCH resource may increase.

FIG. 33 to FIG. 34 is explained with reference to an example that 2 PUCCH resources are configured to transmit ACK/NACK information of 3 bits. Yet, the number of transmission bits of the ACK/NACK information and the number of PUCCH resources may be variously configured. Moreover, it is apparent that the identical principle can be applied to a case that different UL control information is transmitted instead of the ACK/NACK information or a case that different UL control information is transmitted together with the ACK/NACK information as well.

Table 14 indicates an example that two PUCCH resources are configured and six ACK/NACK states are transmitted using a channel selection.

TABLE 14

| HARQ-ACK(0), HARQ-ACK(1) | $n^{(1)}_{PUCCH}$ | b(0), b(1) |
| --- | --- | --- |
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 15 indicates an example that three PUCCH resources are configured and 11 ACK/NACK states are transmitted using a channel selection.

TABLE 15

| HARQ-ACK(0), HARQ-ACK(1), HARQ-ACK(2) | $n^{(1)}_{PUCCH}$ | b(0), b(1) |
| --- | --- | --- |
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |

TABLE 15-continued

| HARQ-ACK(0), HARQ-ACK(1), HARQ-ACK(2) | $n^{(1)}_{PUCCH}$ | b(0), b(1) |
| --- | --- | --- |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 16 indicates an example that four PUCCH resources are configured and 20 ACK/NACK states are transmitted using a channel selection.

TABLE 16

| HARQ-ACK(0), HARQ-ACK(1), HARQ-ACK(2), HARQ-ACK(3) | $n^{(1)}_{PUCCH}$ | b(0), b(1) |
| --- | --- | --- |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

Meanwhile, a user equipment collects (e.g., multiplexing, bundling, and the like) responses for cases where a plurality of ACK/NACK feedbacks received from PCell DL CC and SCell(s) DL CC are required and then transmits the responses in UL CC in the PCell using a single PUCCH.

A case that HARQ ACK/NACK feedback is required for a DL CC may include 3 types as follows.

First of all, the HARQ ACK/NACK feedback may be required for a case of Table 17 in the following.

TABLE 17

For a PDSCH(s) transmission indicated by the detection of a corresponding PDCCH(s) in subframe(s) n − k, where k ∈ K and K is a set of M elements $\{k_0, k_1, \ldots k_{M-1}\}$ depending on the subframe n and the UL-DL configuration.

Table 17 means PDSCH(s) requiring a general A/N feedback. The PDSCH may exist in both a DL PCell and Scells. For clarity, the aforementioned case is called 'PDSCH with PDCCH' in the following description.

Subsequently, the HARQ ACK/NACK feedback may be required for a case of Table 18 in the following.

TABLE 18

For a PDCCH(s) indicating downlink SPS release in subframe(s) n − k, where k ∈ K and K is a set of M elements $\{k_0, k_1, \ldots k_{M-1}\}$ depending on the subframe n and the UL-DL configuration.

Table 18 means A/N feedback for PDCCH(s) indicating SPS release. In this case, only one 'PDSCH without corresponding PDCCH' can exist in a single subframe through at least one DL cell. While the A/N feedback for PCDDH(s) indicating DL SPS release is performed, A/N feedback for PDCCH(s) indicating DL SPS activation may not be performed. And, the above-mentioned PDCCH may exist in a DL PCell only. For clarity, the aforementioned case is called 'DL SPS release' in the following description.

Subsequently, the HARQ ACK/NACK feedback may be required for a case of Table 19 in the following.

TABLE 19

For a PDSCH(s) transmission where there is not a corresponding PDCCH detected in subframe(s) n − k, where k ∈ K and K is a set of M elements {$k_0, k_1, \ldots k_{M-1}$} depending on the subframe n and the UL-DL configuration.

Table 19 corresponds to PDSCH(s) without PDCCH(s). Table 19 means A/N feedback for SPS (semi-persistent scheduling). In this case, only one 'PDSCH without corresponding PDCCH' can exist in a single subframe through at least one DL cell. And, the above-mentioned PDSCH may exist in a DL PCell only. For clarity, the aforementioned case is called 'DL SPS' in the following description.

Yet, the HARQ ACK/NACK feedback event explained with reference to Table 17 to Table 19 is just an example. The HARQ ACK/NACK feedback event may be performed in case that a different event occurs as well.

Meanwhile, in the Table 17 to the Table 19, 'M' indicates the number of elements of a set k. And, definition of a l' corresponding to HARQ-ACK transmission timing for a DL reception can be represented as Table 20 in the following according to a position (n) of a subframe and TDD UL-DL configuration.

subframe, the ACK/NACK feedback for a DL subframe, which corresponds to a fourth previous subframe of the sixth UL subframe, is performed.

Figure 35:
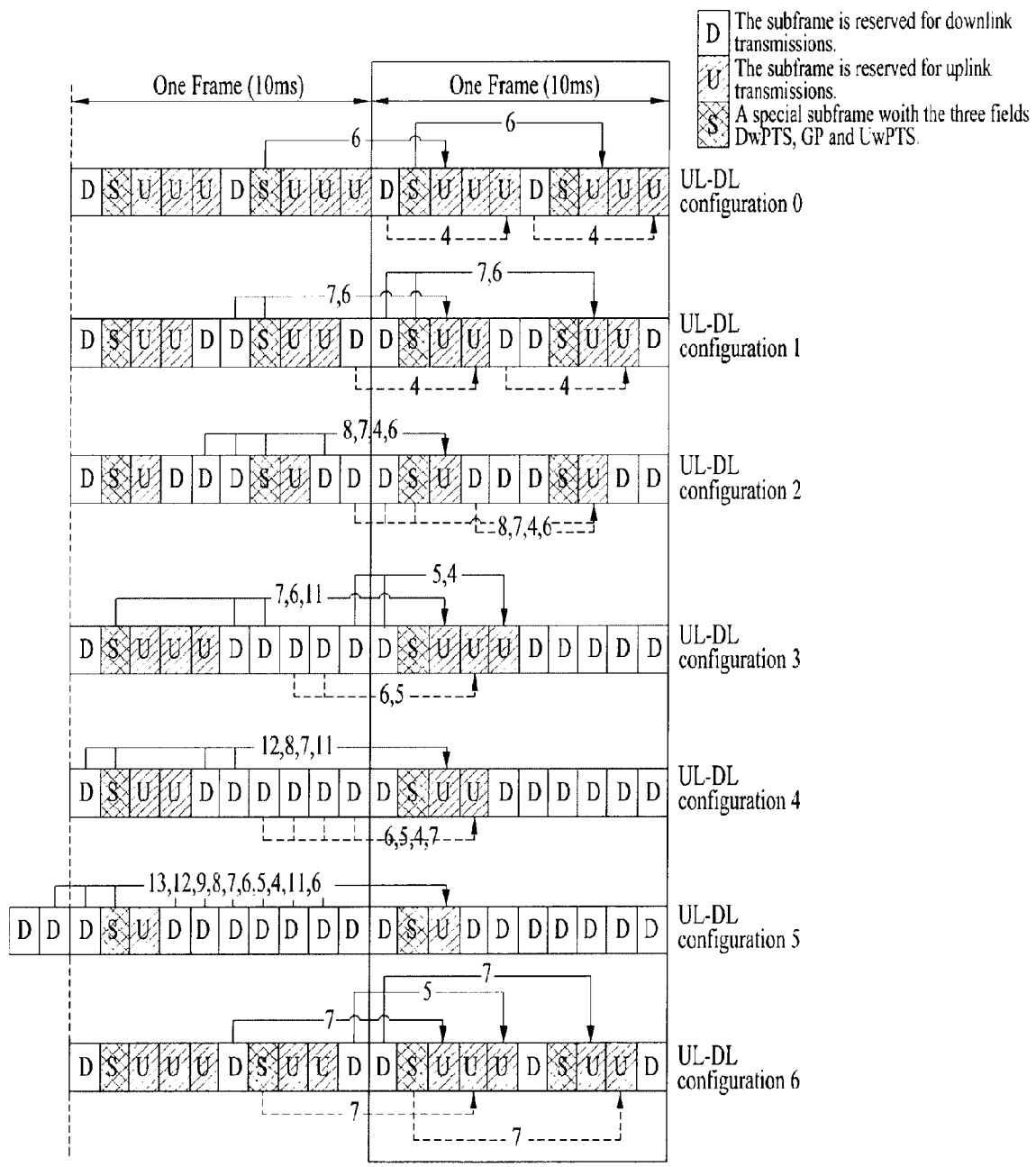
FIG. 35 is a diagram for an example of ACK/NACK feedback in TDD in relation to the present invention.

As a different example, in case of a UL-DL configuration 1 indicated in the second top of FIG. 35, 4 UL subframes exist in a frame. In a first UL subframe of a second frame, feedback is performed in a manner of collecting (multiplexing or bundling) ACK/NACKs for a DL subframe of a previous frame and a subframe, which correspond to a seventh and sixth previous subframe of the first UL subframe of the second frame, respectively. And, in a second UL subframe, the ACK/NACK feedback for a DL subframe (of a previous frame), which corresponds to a fourth previous subframe of the second UL subframe, is performed. And, in a third UL subframe, feedback is performed in a manner of collecting (multiplexing or bundling) ACK/NACKs for a DL subframe and a special subframe, which correspond to a seventh and sixth previous subframe of the third UL subframe, respectively. And, in a fourth UL subframe, the ACK/NACK feedback for a DL subframe (of a previous frame), which corresponds to a fourth previous subframe of the fourth UL subframe, is performed. For clarity, explanations about operations in different UL-DL configurations are omitted. Yet, identical comprehension of the aforementioned examples in the UL-DL configuration 0 and 1 is applied to the operations of different configurations as well.

In particular, a position of DL subframe of which the ACK/NACK feedback is performed in each of the UL subframes vary depending on a TDD UL-DL configuration and a position of a UL subframe in a TDD.

And, in case of FDD, 'M' is always 1 and 'k' always satisfies {$k_0$}={4}.

TABLE 20

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 37:
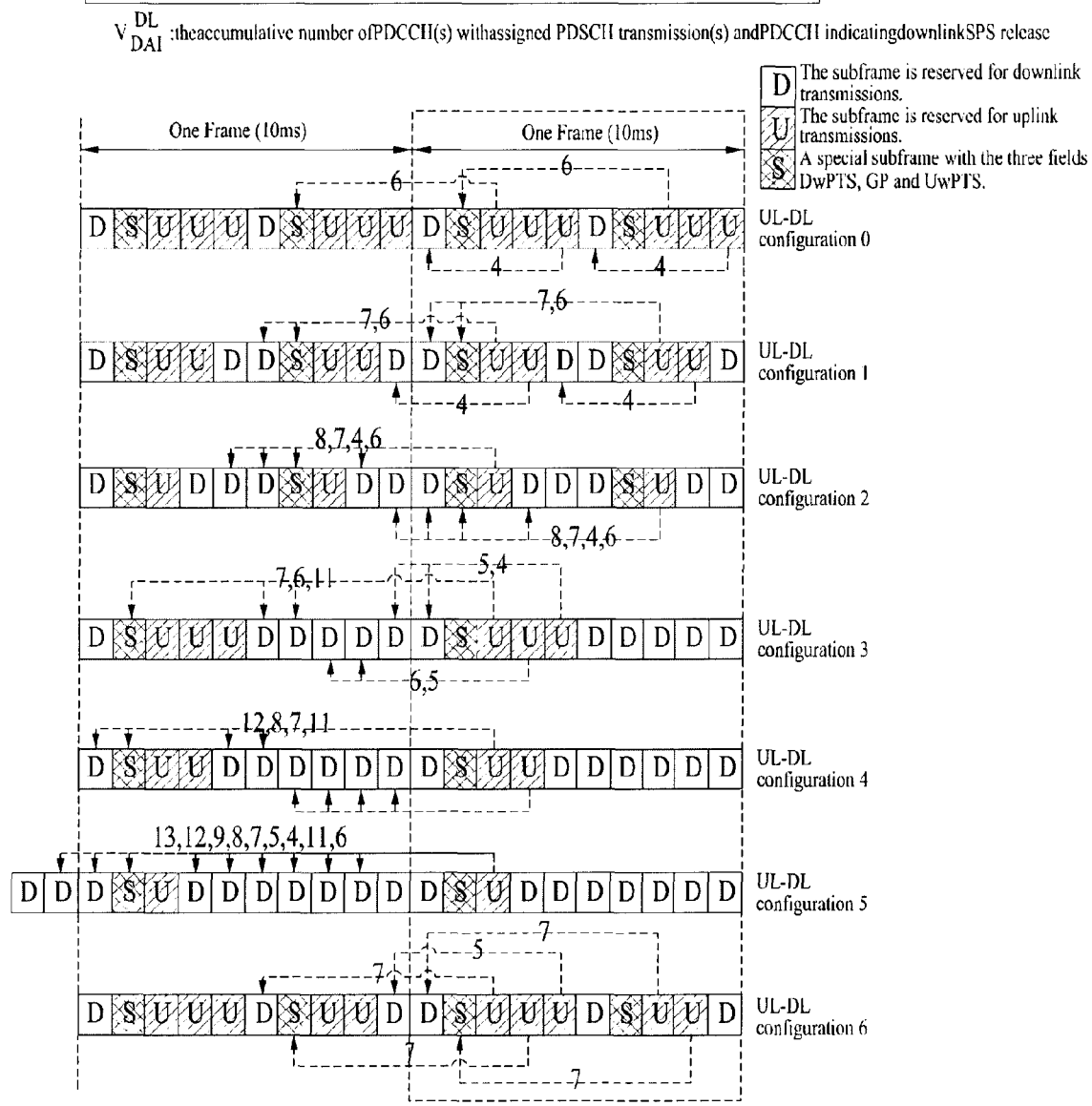
FIG. 37 is a diagram of PDSCH or PDCCH in a subframe n-k corresponding to (included) PUCCH transmission in a subframe n for DCI format 1, 1A, 1B, 1D, 2, 2A, 2B, and 2C.

And, the Table 20 can be represented as FIG. 35 or FIG. 37.

When ACK/NACK feedback is performed in UL subframes of a second frame among two frames, FIG. 35 and FIG. 37 indicate that Table 20 shows previous ACK/NACK feedback for DL subframes.

For instance, in case of a UL-DL configuration 0 indicated in the very top of FIG. 35, 6 UL subframes exist in a frame. And, ACK/NACK feedback for a special subframe (of a previous frame), which corresponds to a sixth previous subframe of a first UL subframe of a second frame, is performed in the first UL subframe of the second frame. And, the ACK/NACK feedback is not performed in a second UL subframe. And, in a third UL subframe, the ACK/NACK feedback for a DL subframe, which corresponds to fourth previous subframe of the third UL subframe, is performed. And, in a fourth UL subframe, the ACK/NACK feedback for a special subframe, which corresponds to a sixth previous subframe of the fourth UL subframe, is performed. And, in a fifth UL subframe, the ACK/NACK feedback is not performed. And, in a sixth UL Meanwhile, a cross-scheduling from a PCell to SCell(s) can be supported but a cross-scheduling from the SCell(s) to the PCell may not be supported.

In this case, if there exist cell(s) cross-scheduled from a different cell, additional PDSCH assignment may not be performed in the cell(s). in particular, scheduling of a specific cell can be performed by the specific cell.

Meanwhile, a cross scheduling indicates that a control channel transmitted on a primary component carrier (primary CC) schedules a data channel transmitted on the primary component carrier or a different component carrier using a carrier indicator field (CIF).

Figure 36:
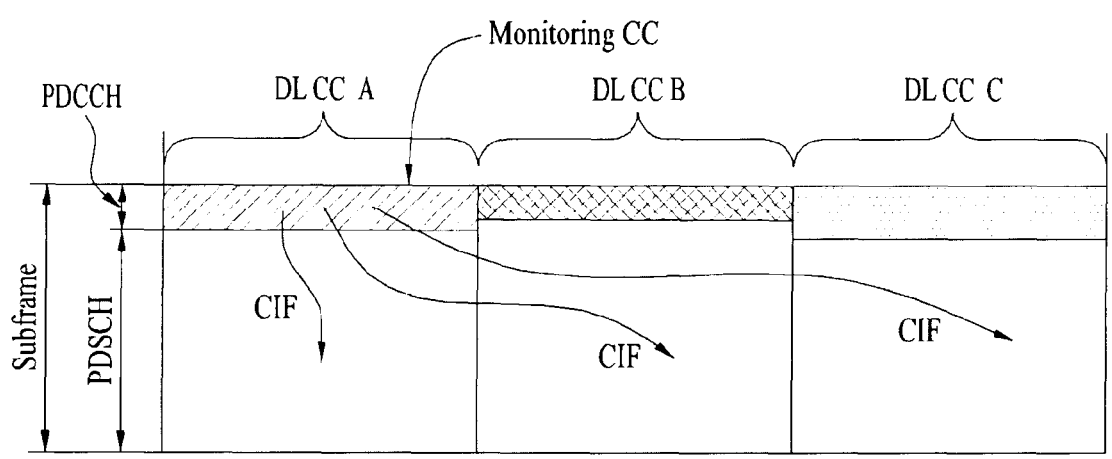
FIG. 36 is a diagram for an example to which a cross carrier scheduling scheme is applied in relation to the present invention.

FIG. 36 is a diagram for an example to which a cross carrier scheduling scheme is applied. In particular, in FIG. 36, the number of cells (or component carriers) assigned to a relay node correspond to 3. As mentioned earlier in the foregoing description, FIG. 36 shows a cross carrier scheduling scheme using a CIF. In this case, assume a DL cell (or component carrier) #A corresponds to a primary DL component carrier (i.e., primary cell (PCell) and a remaining component carrier

B and a component carrier #C correspond to secondary component carriers (i.e., secondary cell (SCell)).

For clarity, assume that a UE is configured to perform a communication via two component carriers (CCs) in the following description.

And, one of the component carriers is called a primary CC (PCC or PCell) and the other is called a secondary CC (SCC or SCell).

And, assume that the UE receives various control signals such as PDCCH and the like and data transmission and reception of the SCell is cross carrier scheduled by a control signal of the PCell.

For clarity, following description is explained under an assumption of a FDD system where there exist a CC #1 (DL PCell, LTE-A frequency band), a CC #3 (UL PCell, LTE-A frequency band), and a CC #2 (SCell, unlicensed band).

Regarding a CA environment, an intra-band CA is firstly considered in general. A band used in the intra-band and an inter-band means an operating band. The operating band can be defined as follows.

In particular, the operating band means a frequency range operating within E-UTRA in a manner of being paired or unpaired. The operating band may be defined as a specific set according to a technical requirement.

For instance, an actual operating band used in LTE can be defined as Table 21 as follows.

a carrier frequency of a plurality of the UL component carriers are positioned at an identical (operating) band.

Hence, a plurality of the component carriers can be designed under an assumption that they have a propagation characteristic similar to each other via the intra-band CA. In this case, the propagation characteristic includes such various characteristics as propagation/path delay, propagation/path loss, fading channel impact, and the like capable of being affected by a different impact according to a frequency (or a center frequency).

Meanwhile, a UE catches uplink transmission timing for a primary cell UL CC.

Along with the aforementioned assumption (e.g., similar propagation/path delay between CCs), uplink transmission timing of a secondary cell is used as identical to uplink transmission timing of a primary cell. Yet, transmission timing of a PRACH (physical random access channel) may be different from that of the primary cell.

By doing so, a UL subframe boundary between cells in a UE can be identically matched with each other. Hence, the UE can perform a communication in a CA environment with a single radio frequency (RF) stage only.

Yet, due to a problem of assigning a frequency to a mobile communication provider for a mobile communication (remaining frequency assignment, reuse of a frequency used for

TABLE 21

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note
[1]Band 6 is not applicable.

And, the intra-band CA means a plurality of DL component carriers and/or UL component carriers positioned at adjacent to each other on a frequency.

In other word, the intra-band CA means that a carrier frequency of a plurality of the DL component carriers and/or a different usage, and the like), at least one cell may not be adjacent to a different cell(s) in a frequency in the CA environment.

For instance, if there exist 2 cells constructing a CA environment, a carrier frequency of one cell may correspond to 800 MHz (UL/DL) and a carrier frequency of another cell may corresponds to 2.5 GHz (UL/DL).

As a different example, a carrier frequency of one cell may correspond to 800 MHz (UL/DL) and a carrier frequency of another cell may correspond to 2.6 GHz (UL/DL).

As a further different example, a carrier frequency of one cell may correspond to 700 MHz (UL/DL) and a carrier frequency of another cell may correspond to 1.7 GHz in UL and 2.1 GHz in DL (TDD). In this case, the carrier frequency may mean a carrier frequency between DL CCs or the carrier frequency between UL CCs.

As mentioned in the foregoing description, an environment apart from a frequency domain may be called an inter-band CA.

In other word, the inter-band CA may mean that a carrier frequency of a plurality of DL component carriers and/or a carrier frequency of a plurality of UL component carriers are positioned at bands different from each other.

In the aforementioned inter-band CA environment, the assumption that propagation characteristic between cells is similar to each other cannot be maintained anymore.

In particular, it is not able to assume that (UL) subframe boundary between cells is identically matched with each other anymore in the inter-band CA environment. Hence, uplink transmission timings different from each other between cells are necessary. In order for a UE to perform a communication in the inter-band CA environment, the UE may use a plurality of RF (radio frequency) stages.

Meanwhile, PDSCH (corresponding PDCCH may or may be not included) corresponding to transmission time ($n^{th}$ subframe) of PUCCH or detection time of PDCCH indicating DL SPS release can be defined as follows.

First of all, in a FDD environment, HARQ-ACK response(s) for PDSCH or PDCCH indicating DL SPS release in a subframe n−4 is transmitted via PUCCH in a subframe n.

Secondly, in a TDD environment, HARQ response(s) for PDSCH and/or PDCCH indicating DL SPS release in a subframe n−k is transmitted via PUCCH in a subframe n. In this case, the k value can be differently configured according to a position of a subframe in the TDD UL/DL configuration and may have at least one value in a specific subframe as a set K (K={$k_0, k_1, \ldots, k_{m-1}$}). In other word, one PUCCH may include PDCCH indicating at least one DL SPS release and/or HARQ-ACK response(s) for PUSCH. The set K can be configured as Table 20.

In this case, DAI (UL-DL configuration 1-6) value in DCI format 1/1a/1B/1D/2/2A/2B/2C of PDCCH may mean the accumulated number of PDCCH(s) indicating PDCCH(s) in an assigned PDSCH transmission in a subframe n-k and PDCCH indicating a DL SPS release in each serving cell.

FIG. 37 is a diagram of PDSCH or PDCCH in a subframe n-k corresponding to (included) PUCCH transmission in a subframe n for DCI format 1, 1A, 1B, 1D, 2, 2A, 2B, and 2C. In particular, the k value can be differently configured according to a position of a subframe in the TDD UL/DL configuration and may have at least one value in a specific subframe as a set K (K={$k_0, k_1, \ldots, k_{m-1}$}). In other word, one PUCCH may include PDCCH indicating at least one DL SPS release and/or HARQ-ACK response(s) for PUSCH. The set K can be configured as Table 20.

Meanwhile, detection time for a DCI format 0 or a DCI format 4 (0 or 4) corresponding to transmission time ($n^{th}$ subframe) of PUSCH can be defined as follows.

In TDD, DCI format 0 or DCI format 4 in a subframe n-k' indicates PUSCH assignment in a subframe n.

In this case, DAI, $V_{DAI}^{UL}$ (UL-DL configuration 1-6) means the total numbers of subframes including DCI format 0 or DCI format 4 PDSCH transmission and PDCCH indicating a downlink SPS release in a subframe n-k'.

Table 22 summarizes contents on UL, which is related to an index k' for TDD.

TABLE 22

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

Figure 38:
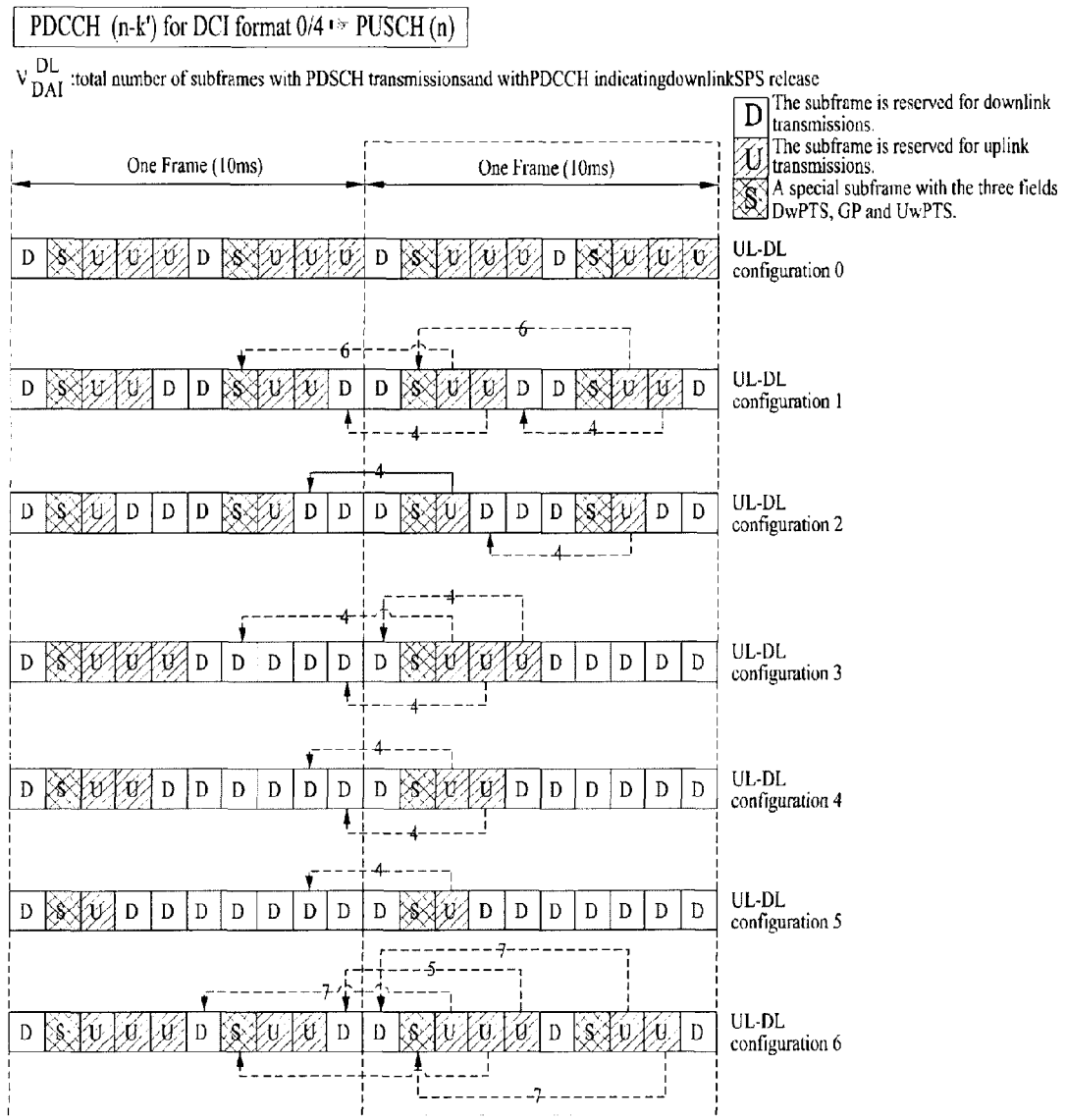
FIG. 38 is an example for a PDCCH subframe n-k' transmitting a DCI format 0/4, which assigns PUSCH in a subframe n.

FIG. 38 is an example for a PDCCH subframe n-k' transmitting a DCI format 0/4, which assigns PUSCH in a subframe n.

Meanwhile, PUSCH transmission time corresponding to detection time ($n^{th}$ subframe) of PDCCH or PHICH can be defined as follows.

First of all, in case of FDD and a normal HARQ operation environment, PDCCH using a DCI format 0/4 and/or PHICH transmission in a subframe n indicates PUSCH in a subframe n+4.

Secondly, in case of FDD and a subframe bundling operation environment, PDCCH using a DCI format 0 in a subframe n and/or PHICH transmission in a subframe n−5 indicates a first PUSCH in a subframe n+4.

And, in case of TDD, a normal HARQ operation environment, and UL/DL configuration 1-6 environment, PDCCH using a DCI format and/or PHICH transmission in a subframe n indicates PUSCH in a subframe n+k.

And, in case of TDD, a normal HARQ operation environment, and UL/DL configuration 0, in relation to PDCCH using a DCI format and/or PHICH transmission in a subframe n, (1) if MSB of a UL index is set to 1 in the PDCCH using uplink DCI format or if PHICH is received in a subframe 0 or 5 of a resource corresponding to $I_{PHICH}=0$, it indicates PUSCH in a subframe n+k. (2) If LSB of a UL index in a DCI format 0/4 is set to 1, if PHICH is received in a subframe 0 or 5 of a resource corresponding to $I_{PHICH}=0$, or if PHICH is received in a subframe 1 or 6, it indicates PUSCH in a subframe n+7. (3) If both MSB and LSB of a UL index in PDCCH using an uplink DCI format are set within a subframe n, it indicates PUSCH in a subframe n+k and a subframe n+7.

Meanwhile, in case of TDD, subframe bundling operation environment, and UL/DL configuration 1-6, PDCCH using a DCI format 0 in a subframe n and/or PHICH transmission in a subframe n−1 indicates first PUSCH in a subframe n+k.

And, in case of TDD, subframe bundling operation environment, and UL/DL configuration 0, in relation to PDCCH using a DCI format 0 and/or PHICH transmission in a subframe n−1, (1) if MSB of a UL index in a DCI format 0 is set to 1 or if $I_{PHICH}$ corresponds to 0, it may indicate first PUSCH in a subframe n+k. (2) In case of TDD, subframe bundling operation environment, and TDD UL/DL configuration 0, If LSB of a UL index within PDCCH using a DCI format 0 in a subframe n is set to 1 or $I_{PHICH}$ corresponds to 0, it indicates PUSCH in a subframe n+7.

Table 23 is a table summarizing k value in TDD configuration 0-6.

TABLE 23

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

And, Table 24 is a table summarizing k value in TDD configuration 0, 1 and 6.

TABLE 24

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | 3 | | | 2 | | | 3 |
| 6 | 5 | 5 | | | | 6 | 6 | | | 8 |

Figure 39:
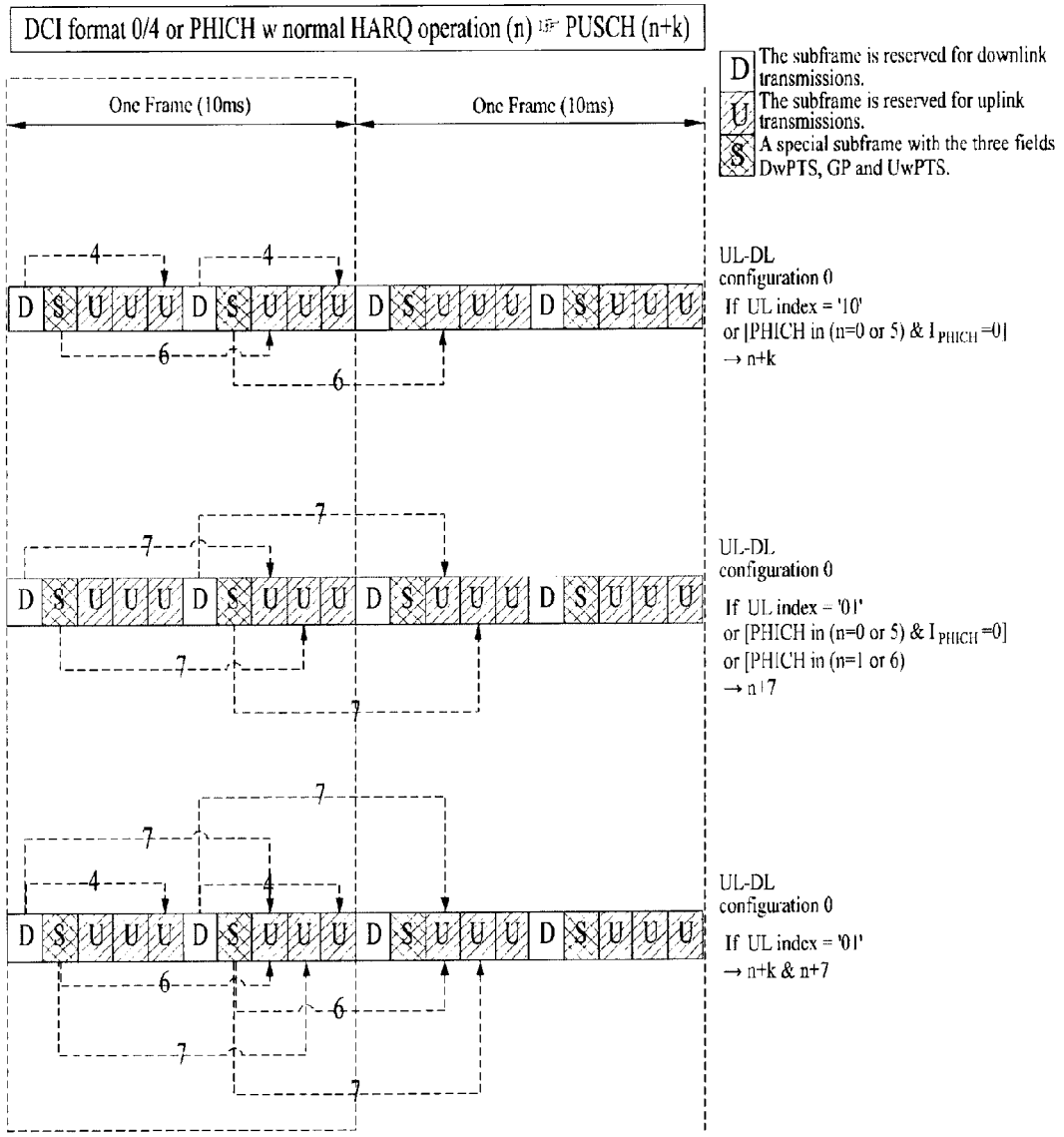
FIG. 39 is a diagram for an example of a subframe n+k to which PUSCH is assigned when PHICH performing DCI format 0/4 or a general HARQ operation is transmitted in a subframe n.

FIG. 39 is a diagram for an example of a subframe n+k to which PUSCH is assigned when PHICH performing DCI format 0/4 or a general HARQ operation is transmitted in a subframe n.

Figure 40:
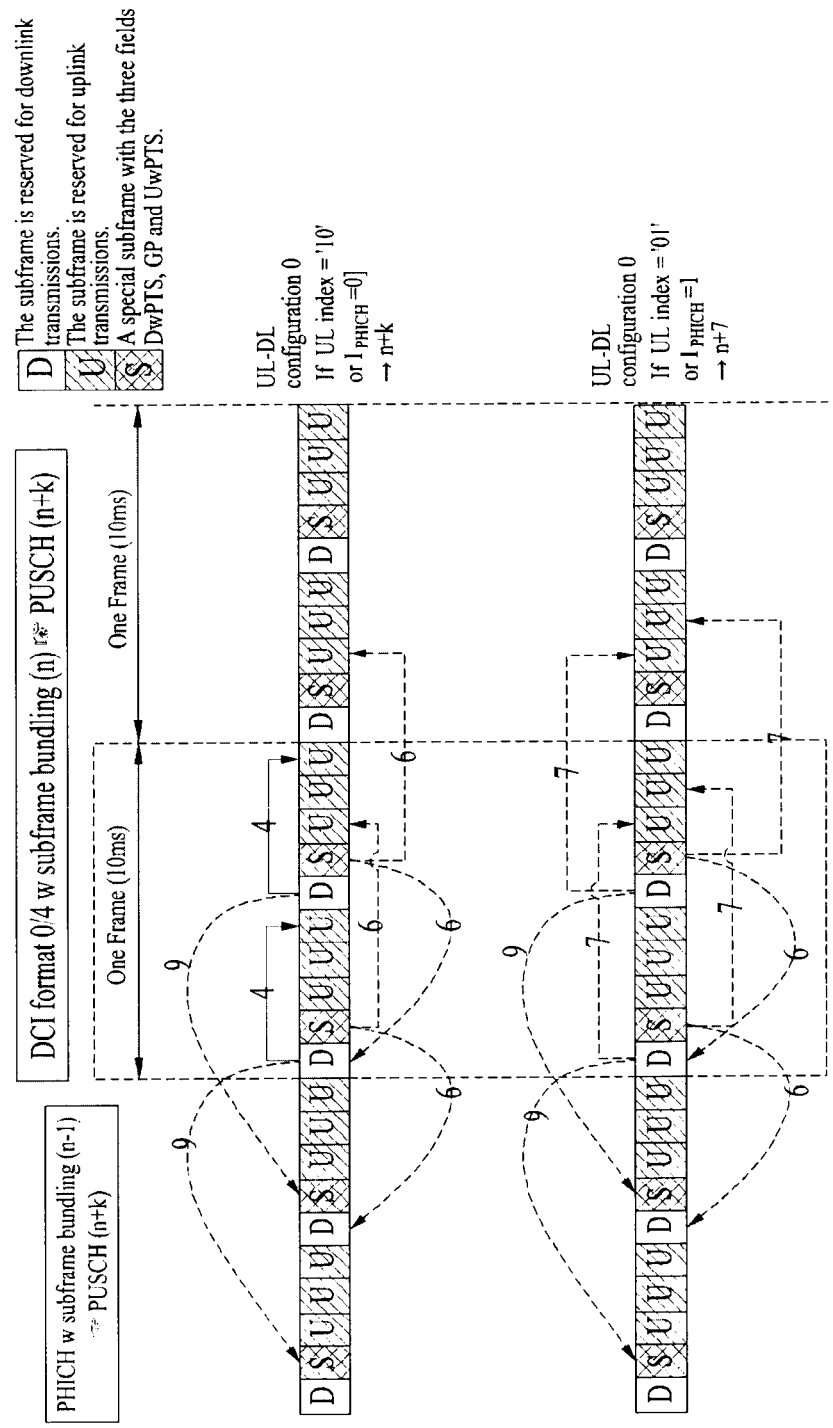
FIG. 40 is a diagram for an example of corresponding PUSCH transmitted in a subframe n+k when PHICH using a subframe bundling is transmitted in a subframe n−1 and an example of corresponding PUSCH transmitted in a subframe n+k when DCI format 0/4 using a subframe bundling is transmitted in a subframe n in a TDD UL/DL configuration 0.

FIG. 40 is a diagram for an example of corresponding PUSCH transmitted in a subframe n+k when PHICH using a subframe bundling is transmitted in a subframe n−1 and an example of corresponding PUSCH transmitted in a subframe n+k when DCI format 0/4 using a subframe bundling is transmitted in a subframe n in a TDD UL/DL configuration 0.

Figure 41:
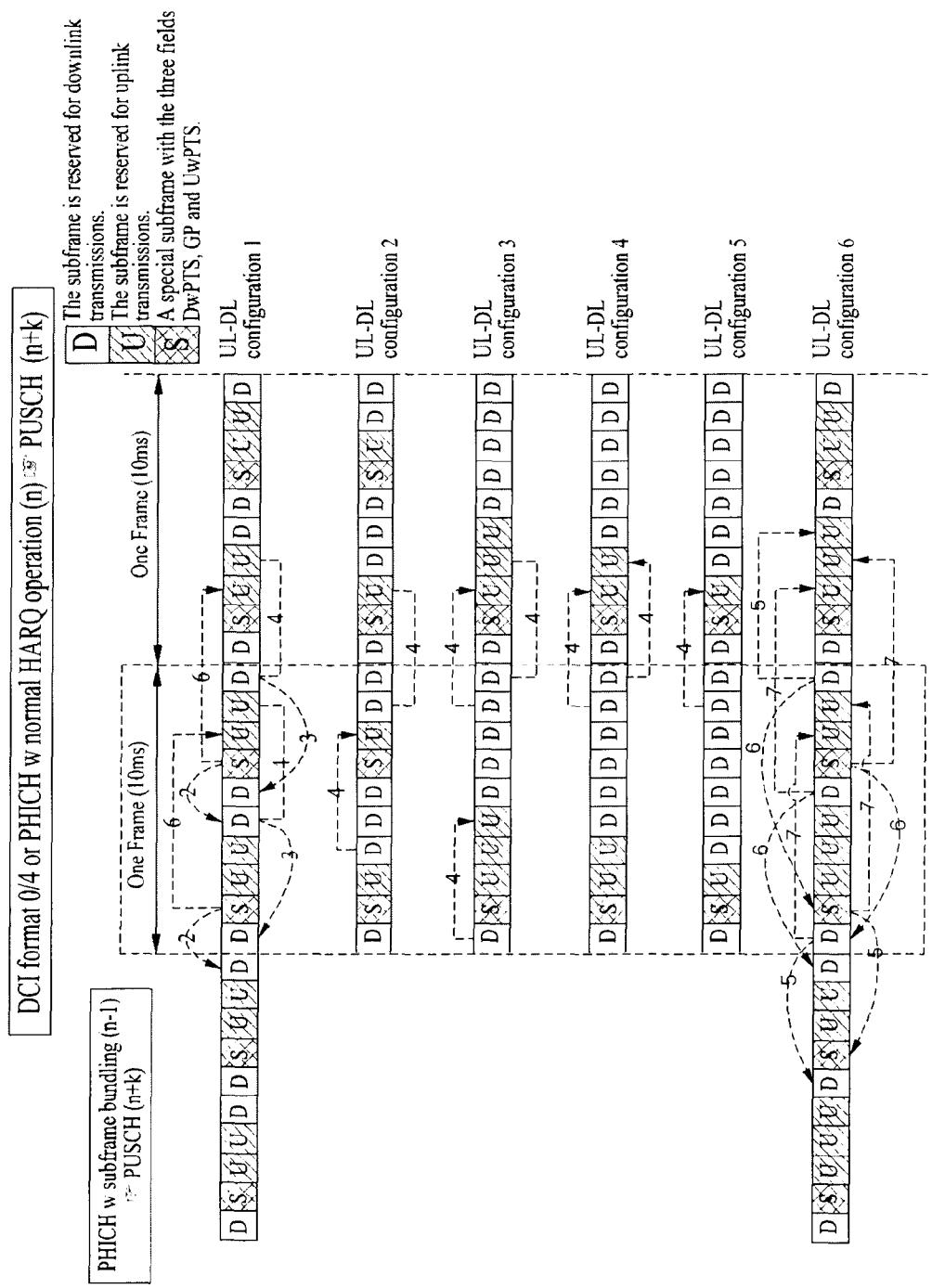
FIG. 41 is a diagram for an example of corresponding PUSCH transmitted in a subframe n+k when PHICH using a subframe bundling is transmitted in a subframe n−1 and an example of corresponding PUSCH transmitted in a subframe n+k when DCI format 0/4 using a subframe bundling is transmitted in a subframe n in a TDD UL/DL configuration 1~6.

FIG. 41 is a diagram for an example of corresponding PUSCH transmitted in a subframe n+k when PHICH using a subframe bundling is transmitted in a subframe n−1 and an example of corresponding PUSCH transmitted in a subframe n+k when DCI format 0/4 using a subframe bundling is transmitted in a subframe n in a TDD UL/DL configuration 1~6.

Meanwhile, PHICH reception time corresponding to transmission time ($n^{th}$ subframe) of PUSCH can be defined as follows.

In particular, in a FDD environment, HARQ-ACK response for PUSCH in a subframe n is transmitted via PHICH in a subframe n+4.

Subsequently, in a TDD environment, HARQ-ACK response for PUSCH in a subframe n is transmitted via PHICH in a subframe n+$k_{PHICH}$.

Table 25 indicates an example of $k_{PHICH}$ in TDD.

TABLE 25

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | | 4 | 7 | 6 |
| 1 | | | | 4 | 6 | | | | 4 | 6 | |
| 2 | | | 6 | | | | | 6 | | | |
| 3 | | | | 6 | 6 | 6 | | | | | |
| 4 | | | | 6 | 6 | | | | | | |
| 5 | | | | 6 | | | | | | | |
| 6 | | | | 4 | 6 | 6 | | | 4 | 7 | |

Figure 42:
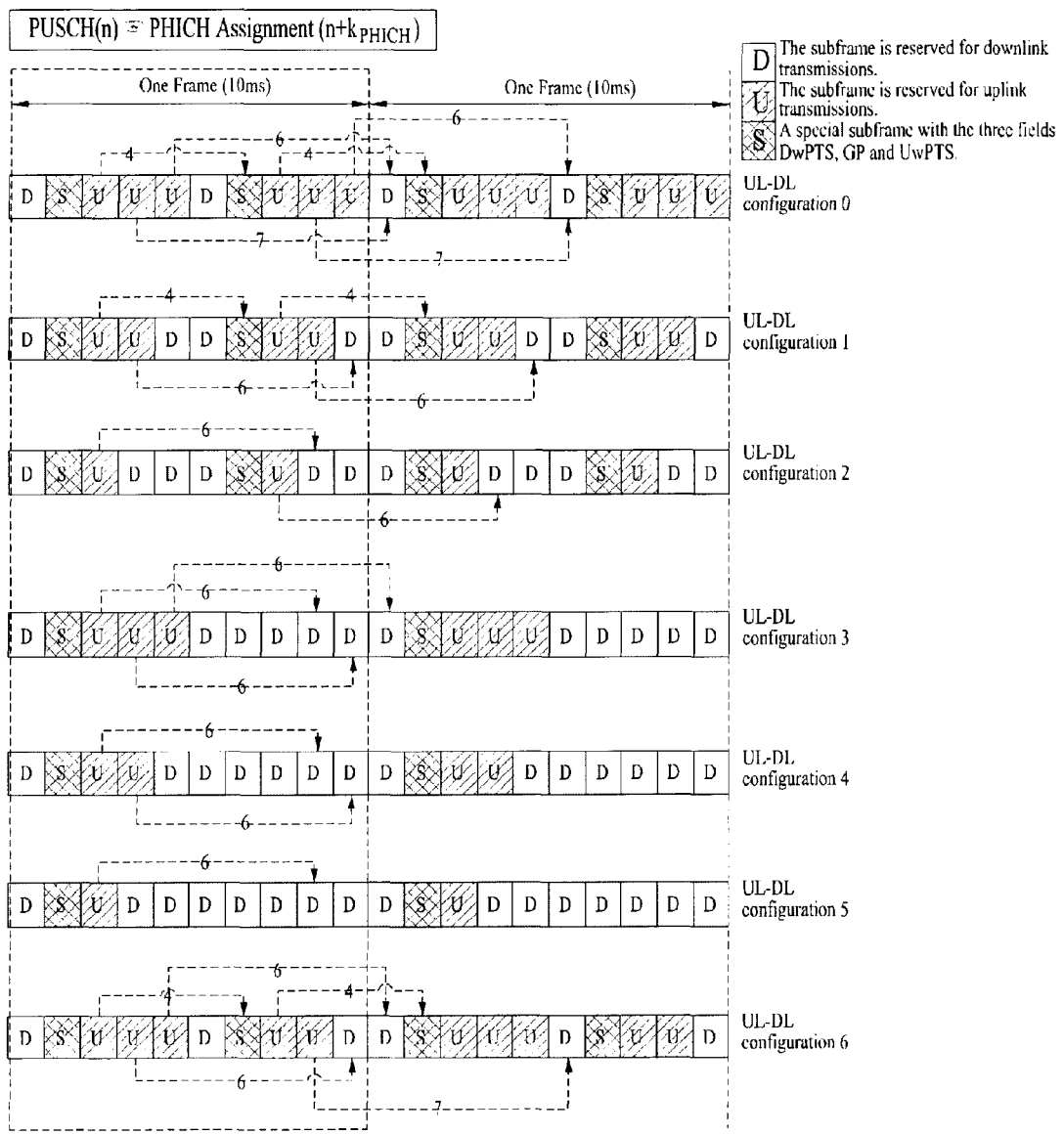
FIG. 42 is a diagram for an example that a HARQ-ACK response for PUSCH in a subframe n is transmitted via PHICH in a subframe $n+k_{PHICH}$.

FIG. 42 is a diagram for an example that a HARQ-ACK response for PUSCH in a subframe n is transmitted via PHICH in a subframe n+$k_{PHICH}$.

Meanwhile, reception time ($n^{th}$ subframe) of PHICH and transmission time of PUSCH corresponding to the response can be defined as follows.

First of all, in a FDD environment, HARQ-ACK response for PUSCH in a subframe i−4 is received via PHICH in a subframe i.

Secondly, in case of TDD and UL/DL configuration 1-6, HARQ-ACK response for PUSCH in a subframe i-k is received via PHICH in a subframe i.

And, in case of TDD and UL/DL configuration 0, HARQ-ACK response for PUSCH in a subframe i-k is received via PHICH in a subframe i. In this case, The HARQ-ACK response for PUSCH in the subframe i-k may be received via PHICH in a resource corresponding to $I_{PHICH}=0$ in the subframe i and HARQ-ACK response for PUSCH in a subframe 1-6 may be received via PHICH in a resource corresponding to $I_{PHICH}=1$ in the subframe i.

Table 26 indicates an example of k applied to TDD configuration 0-6.
[Table 26]
Table 26 indicates an example of k applied to TDD configuration 0-6.

TABLE 26

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Figure 43:
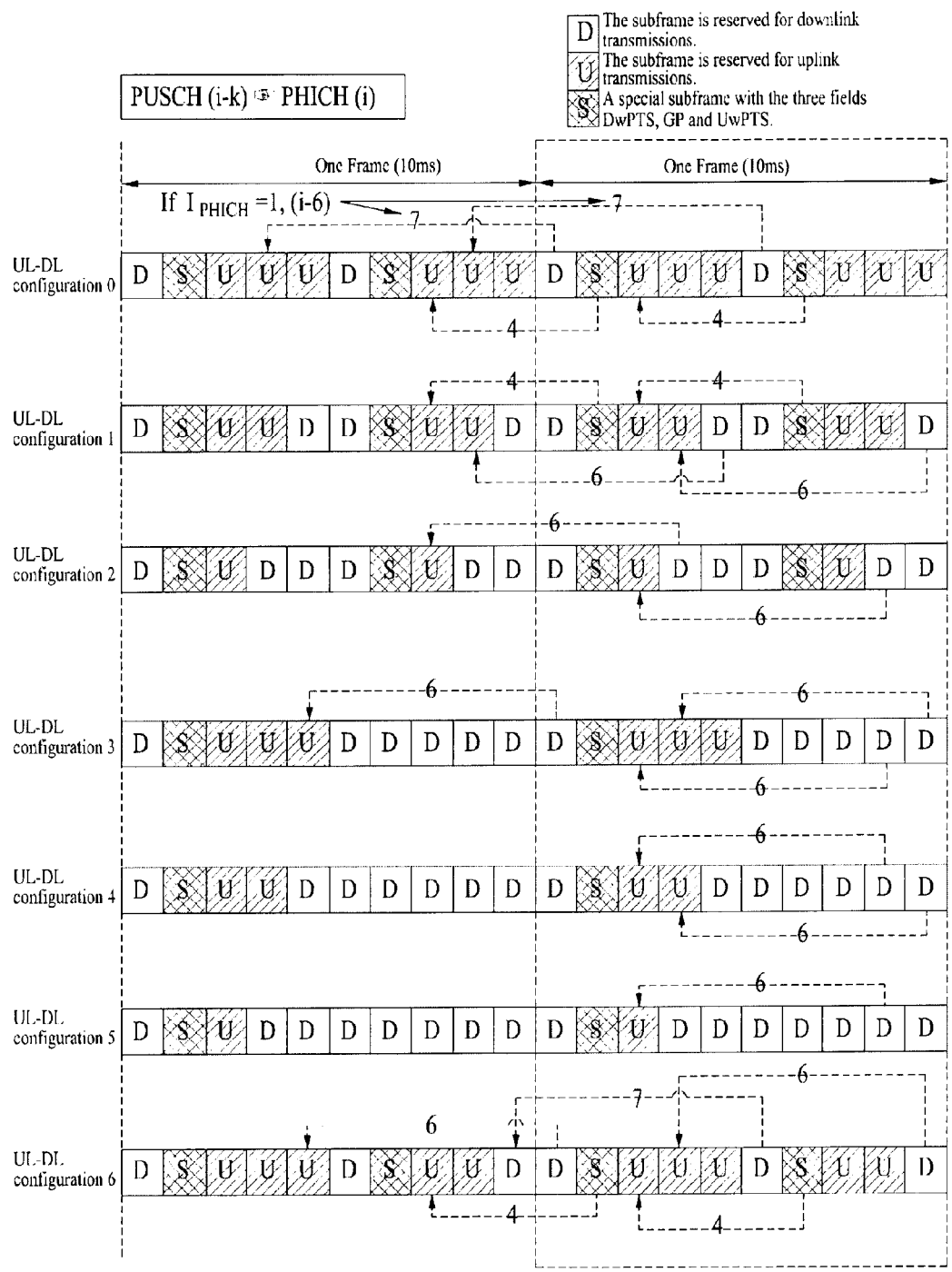
FIG. 43 is a diagram for an example that a HARQ-ACK response received via PHICH in a subframe i corresponds to PUSCH in a subframe i-k.

FIG. 43 is a diagram for an example that a HARQ-ACK response received via PHICH in a subframe i corresponds to PUSCH in a subframe i-k.

The present invention described in the following relates to a wireless communication system, and more particularly, to a method of efficiently supporting multiple uplink transmission timing in a CA environment.

In LTE-release 10, carrier aggregation of maximum 5 configured serving cells (hereinafter abbreviated cells) is supported.

In this case, a cell attempted an initial access via PRACH is configured as a PCell and remaining different cell(s) may be configured as SCell. And, uplink transmission timing of the PCell can be applied to all cells. In particular, a scheme of using a single uplink transmission timing is applied.

Yet, in case that an operating band between cells is significantly different, a channel state is different from each other between cells, or the like, it is not able to assume an identical uplink transmission timing anymore. In particular, this sort of situation occasionally occurs in case of an inter-band CA.

Hence, since it is necessary to have a method of efficiently supporting a plurality of uplink transmitting timings between cells to which carrier aggregation is applied, the present invention intends to provide a solution for the aforementioned problem.

Figure 44:
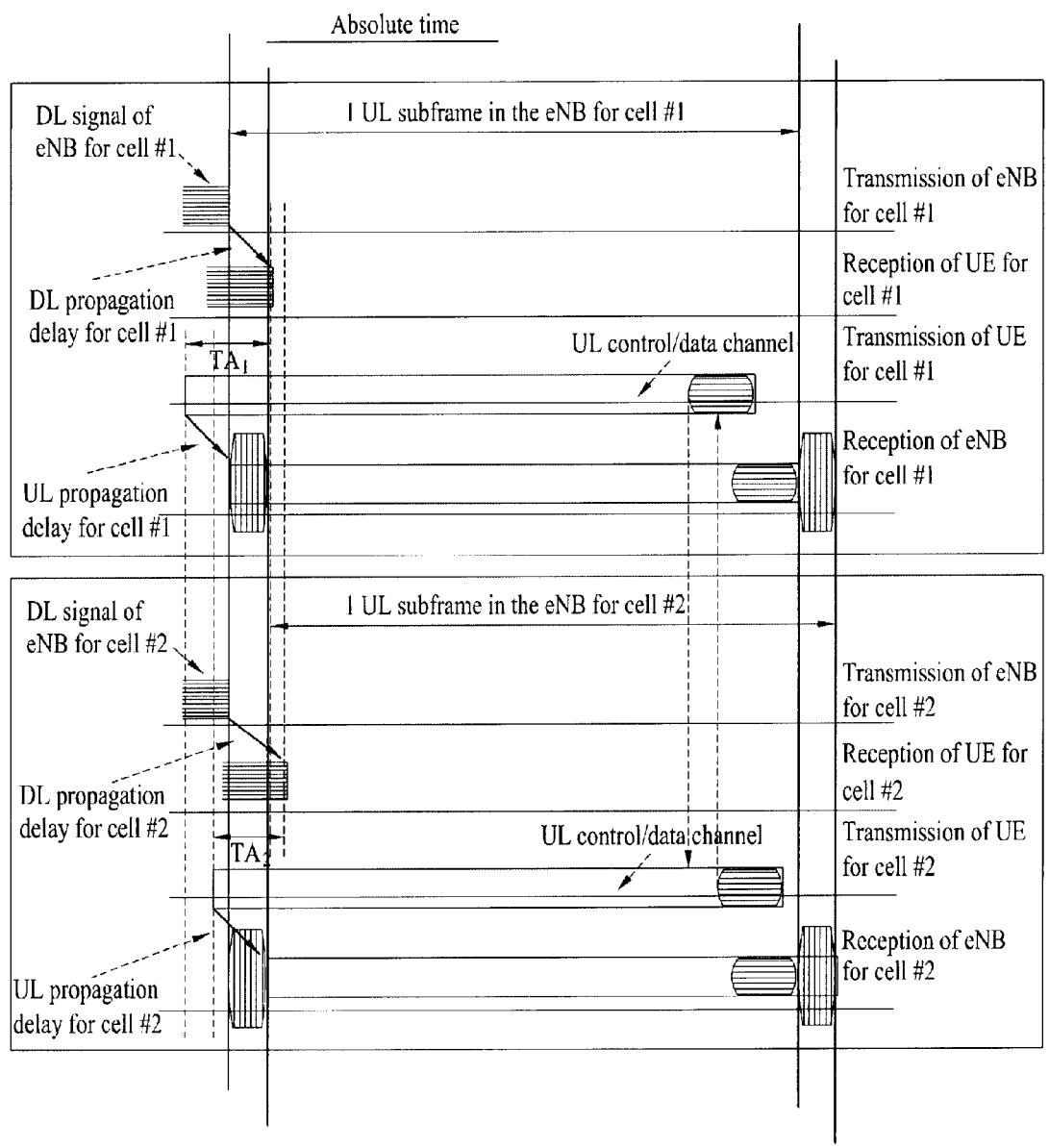
FIG. 44 is a diagram for a detailed example that transmission timings are different from each other between cells in relation to the present invention.

FIG. 44 is a diagram for a detailed example that transmission timings are different from each other between cells in relation to the present invention.

Referring to FIG. 44, a cell #2 has a longer propagation delay compared to a cell #1.

For clarity, FIG. 44 shows longer propagation delay for both DL and DL. Yet, DL propagation delay may be not necessarily proportional to UL propagation delay.

In this case, each cell performs UL transmission with time advanced ($TA_1$, $TA_2$) values different from each other for UL transmission.

In case that a UE transmits signals in contiguous subframes for two or more cells having uplink transmission timings different from each other, processing in subframe unit may become difficult.

In FIG. 44, assume that a UE transmits a signal of a cell #2 in a specific subframe and then transmits a signal of a cell #1 in a next contiguous subframe.

Like the parts of vertical lines depicted in FIG. 44, when the UE transmits the signal of the cell #2 in the specific subframe, the signal of the cell #1 is already generated in the next contiguous subframe. Hence, simultaneous transmission should be performed for a certain period.

In particular, like the parts of horizontal lines depicted in FIG. 44, in case that one cell transmits data/control channel of PUSCH, PUCCH, and the like and the other cell having different uplink transmission timing transmits an SRS (sounding reference signal) in one subframe, simultaneous transmission should be performed for a certain period.

This sort of performance of the UE not only fails in securing sufficient time for processing delay and the like for HARQ operation but also makes signals of each of the cells interfere each other at an RF stage.

And, it makes PARR (peak-to-peak average power ration) or CM (cubic matrix) of a transmission signal increases and may cause deterioration of an effective cell coverage.

Hence, due to the aforementioned reason, simultaneous transmission is not permitted in LTE (release 8/9/10).

For instance, regarding SRS transmission, if a trigger type 0 and a trigger type 1 are simultaneously transmitted in an identical subframe, a UE performs SRS transmission of the trigger type 1 only.

And, if SRS transmission and PUSCH transmission simultaneously occur in an identical symbol, a UE does not transmit an SRS.

And, if one SC-FDMA symbol exists in UpPTS of a serving cell configured by TDD, it can be used to transmit an SRS. If two SC-FDMA symbols exist, all of the two SC-FDMA symbols can be used to transmit an SRS and may be allocated to an identical UE.

And, if SRS transmission and PUCCH format 2/2a/2b transmission simultaneously occur in an identical subframe, a UE does not perform SRS transmission.

And, if SRS transmission in UpPTS and PRACH region for a preamble format 4 overlap each other or if the SRS transmission in UpPTS is out of a range of UL system bandwidth configured in a serving cell, a UE does not transmit an SRS.

And, if inter-cell interference affects each other, although an uplink signal of a cell #1 is received in a manner of being matched with a UL subframe in terms of a reception of a base station, an uplink signal of a cell #2, which is a different cell, is received in a manner of being not matched with a UL subframe boundary.

In this case, like the parts of vertical lines depicted in FIG. 44, the uplink signal of the cell #2 operates as interference since it is not able to maintain orthogonality between subcarriers to a precedent (OFDMA or SC-FDMA) symbol(s) in the subframe and the uplink signal of the cell #2 operates as interference since it is not able to maintain orthogonality between subcarriers to a precedent (OFDMA or SC-FDMA) symbol(s) in a next contiguous subframe.

Since uplink transmission timing corresponds to a UE-specific value, a base station cannot flexibly modify uplink subframe boundary on the basis of a reception signal.

In particular, a base station makes each UE control transmission timing with a fixed uplink subframe boundary according to a distance and the transmission timing is aligned with a reception timing of the base station.

Hence, in case that multiple uplink transmission timing is performed, the present invention proposes to perform a rate matching for PUSCH and/or PUCCH transmission to solve the aforementioned multiple uplink transmission timing problem.

In this case, the rate matching is to reduce effective channel coding rate such as a turbo coding and the like or to perform puncturing after a channel coding.

In other word, the rate matching is a common name for all matching schemes to reduce the number of physical RE (resource element) or subcarriers to transmit specific information.

Meanwhile, the present invention is applicable irrespective of an uplink access scheme (e.g., SC-FDMA, OFDMA, and the like). For clarity, the present invention is described in a manner of calling the uplink access scheme as the SC-FDMA.

Embodiment of the present invention can be implemented by 3 types as follows. Yet, embodiment of the present invention described in the following is just an example. It is apparent that the embodiment of the present invention can be implemented in various ways.

(1) A method of performing a rate matching for the N number of SC-FDMA symbol in the front and the N number of SC-FDMA symbol in the rear within a subframe (2) A method of performing a rate matching for the N number of SC-FDMA (or OFDMA) symbol in the rear within a subframe (3) A method of performing a rate matching for the N number of SC-FDMA (or OFDMA) symbol in the front within a subframe In the following description, each of a plurality of embodiments is explained in detail.

First Embodiment

As a first embodiment of the present invention, a method of performing a rate matching for the N number of SC-FDMA symbol in the front and the N number of SC-FDMA symbol in the rear within a subframe can be used.

As mentioned earlier with reference to FIG. 44, if multiple transmission timing is applied to SC-FDMA symbol in the front and SC-FDMA symbol in the rear within a subframe, interference may occur.

Hence, the first embodiment of the present invention proposes that a rate matching is performed at the front and the rear of a subframe, respectively, for the N number of SC-FDMA symbol(s) corresponding to as much as multiple transmission timing capable of being fully supported within an allocated time and/or frequency resource.

For instance, difference of fully supportive of multiple transmission timing may correspond to 30 [us] or 31.3 [us].

In this case, since the difference of fully supportive of multiple transmission timing is smaller than a single SC-FDMA symbol, a rate matching is performed for one (N=1) SC-FDMA symbol in the front and the rear of a subframe, respectively, within an allocated time and frequency resource.

Figure 45:
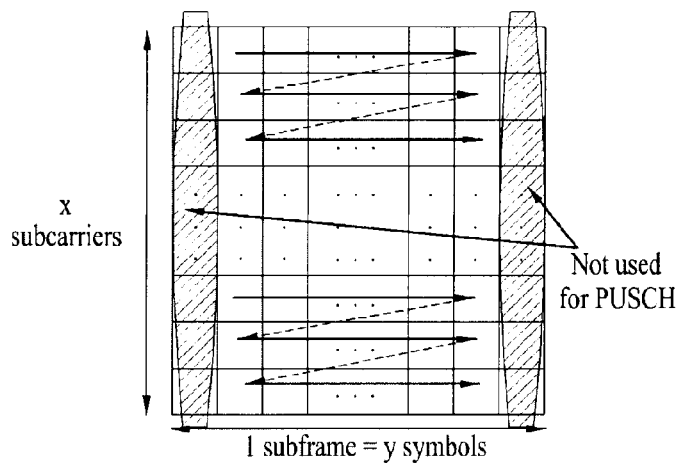
FIG. 45 is a diagram for an example of performing a rate matching for one SC-FDMA symbol in the front and rear within a subframe, respectively in relation to the present invention.

A detail content to which the first embodiment of the present invention is applied is indicated by FIG. 45.

Referring to FIG. 45, although an original physical resource is allocated as much as x*y REs (or subcarriers), the first and the last SC-FDMA symbol in a subframe are not used for transmission due to a rate matching and REs of x*(y−2) are used only.

In this case, for clarity, FIG. 45 is explained in a manner of omitting such an additional overhead as a reference signal or pilot signal, and the like within a resource in the following description.

For clarity, although time-first RE mapping is explained as an example, the present invention may be non-limited to the method/order of mapping to a physical time and/or frequency resource.

Meanwhile, if a transmission subframe corresponds to a sounding subframe (SRS subframe, this may be cell-specific or UE-specific), although a specific UE does not transmit a sounding signal, the last symbol within a subframe should be transmitted in a manner of being rate matched in order to avoid a collision with a sounding signal of a different UE.

As mentioned in the foregoing description, sounding transmission of the last SC-FDMA symbol within a subframe may overlap with such a different signal transmission as PUSCH/PUCCH of a different cell within an identical subframe. Or, the sounding transmission may work as interference to a next contiguous subframe of the different cell.

Hence, when multiple uplink transmission is used (e.g., in case of being configured or in case of inter-band CA), a rate matching is additionally performed for a second to the last SC-FDMA symbol in a subframe within an allocated time and/or frequency resource in case of an SRS subframe.

In case that a UE performs an SRS transmission, an SRS can be transmitted in a second to the last SC-FDMA symbol within a subframe.

In this case, transmission frequency of the SRS can be configured or allocated separately from the allocated data/control channel resource. This sort of example is depicted in FIG. 46 in detail.

Figure 46:
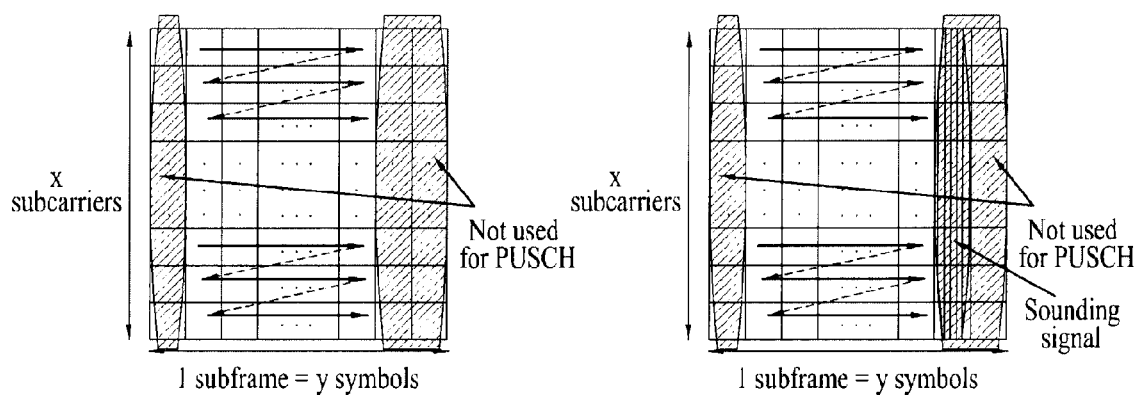
FIG. 46 is a diagram for an example of performing a rate matching for one SC-FDMA symbol in the front and two SC-FDMA symbols in the rear within a subframe in an SRS-subframe in relation to the present invention.

Meanwhile, if a simultaneous transmission signal is permitted between neighboring subframes and simultaneous transmission of signals different from each other in an identical subframe is not permitted only, unlike FIG. 46, it may be configured to perform a rate matching for two SC-FDMA symbols in the rear only without a rate matching for SC-FDMA symbol in the front within a subframe.

Second Embodiment

As a second embodiment of the present invention, a method of performing a rate matching for the N number of SC-FDMA (or OFDMA) symbol in the rear within a subframe can be used.

As mentioned earlier with reference to FIG. 44, if multiple transmission timing is applied to SC-FDMA symbol in the front and SC-FDMA symbol in the rear within a subframe, interference may occur.

The first embodiment has proposed that a rate matching is performed at the front and the rear of a subframe, respectively, for the N number of SC-FDMA symbol(s) corresponding to as much as multiple transmission timing capable of being fully supported within an allocated time and/or frequency resource.

Yet, in the aspect of reception of each cell, there may exist impact different from each other.

In FIG. 44, if we look at a receiving end of a cell #1, it is able to assume that there is no signal of a different cell received before a UL subframe boundary of the cell #1.

In this case, it may assume that a collision with a transmission signal of a different cell occurs in a next contiguous subframe only.

In particular, in terms of a base station, it is able to perform a rate matching for only a resource in the rear in a subframe of a specific cell.

Based on this assumption, the present invention proposes that a rate matching is performed at the rear of a subframe only for the N number of SC-FDMA symbol(s) corresponding to as much as multiple transmission timing capable of being fully supported within an allocated time and/or frequency resource.

For instance, difference of fully supportive of multiple transmission timing may correspond to 30 [us] or 31.3 [us].

In this case, since the difference of fully supportive of multiple transmission timing is smaller than a single SC-FDMA symbol, a rate matching is performed for one (N=1) SC-FDMA symbol in the rear of a subframe within an allocated time and frequency resource.

Figure 47:
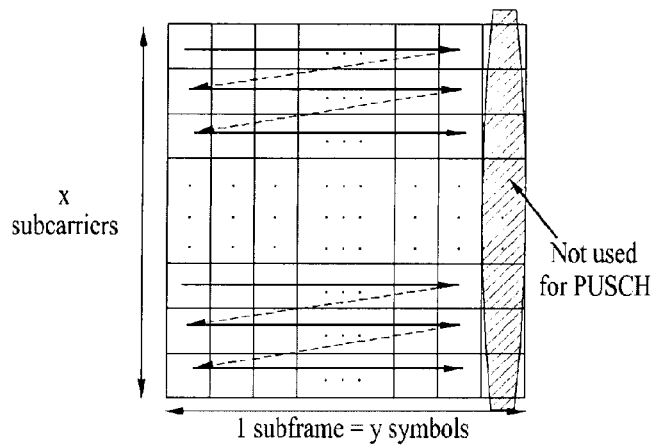
FIG. 47 is a diagram for an example of performing a rate matching for one SC-FDMA symbol in the rear within a subframe in relation to the present invention.

A detail content to which the second embodiment of the present invention is applied is indicated by FIG. 47.

Referring to FIG. 47, although an original physical resource is allocated as much as x*y REs (or subcarriers), the last SC-FDMA symbol in a subframe is not used for transmission due to a rate matching and REs of x*(y−1) are used only.

For clarity, although time-first RE mapping is explained as an example, the present invention may be non-limited to the method/order of mapping to a physical time and/or frequency resource.

Meanwhile, if a transmission subframe corresponds to a sounding subframe (SRS subframe, this may be cell-specific or UE-specific), although a specific UE does not transmit a sounding signal, the last symbol within a subframe should be transmitted in a manner of being rate matched in order to avoid a collision with a sounding signal of a different UE.

In this case, as mentioned in the foregoing description, sounding transmission of the last SC-FDMA symbol within a subframe may overlap with such a different signal transmission as PUSCH/PUCCH of a different cell within an identical subframe.

Or, the sounding transmission may work as interference to a next contiguous subframe of the different cell.

Hence, when multiple uplink transmission is used (e.g., in case of being configured or in case of inter-band CA), a rate matching is additionally performed for a second to the last SC-FDMA symbol in a subframe within an allocated time and/or frequency resource in case of an SRS subframe.

In case that a UE performs an SRS transmission, an SRS can be transmitted in a second to the last SC-FDMA symbol within a subframe.

In this case, transmission frequency of the SRS can be configured or allocated separately from the allocated data/control channel resource. This sort of example is depicted in FIG. 48 in detail.

Figure 48:
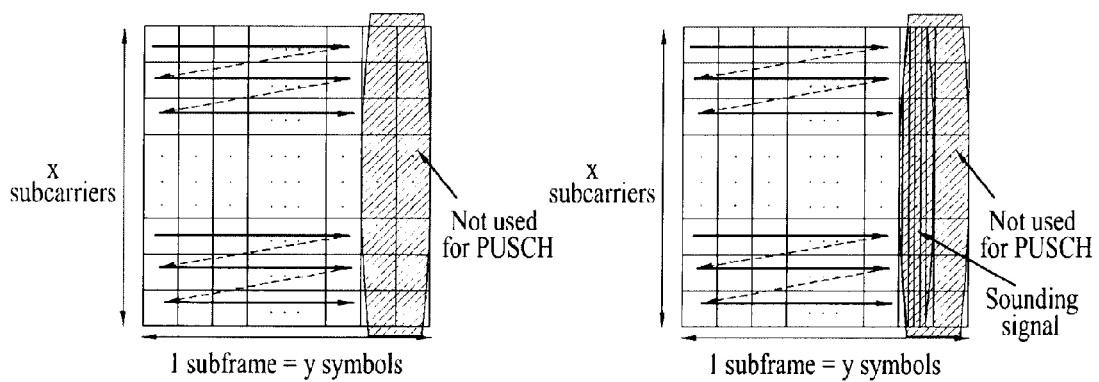
FIG. 48 is a diagram for an example of performing a rate matching for two SC-FDMA symbols in the rear within a subframe in an SRS-subframe in relation to the present invention.

Meanwhile, if a simultaneous transmission signal is permitted between neighboring subframes and simultaneous transmission of signals different from each other in an identical subframe is not permitted only, as depicted in FIG. 48, it may be configured to perform a rate matching for two SC-FDMA symbols in the rear only within a subframe.

Third Embodiment

As a third embodiment of the present invention, a method of performing a rate matching for the N number of SC-FDMA (or OFDMA) symbol in the front within a subframe can be used.

As mentioned earlier with reference to FIG. 44, if multiple transmission timing is applied to SC-FDMA symbol in the front and SC-FDMA symbol in the rear within a subframe, interference may occur.

The first embodiment has proposed that a rate matching is performed at the front and the rear of a subframe, respectively, for the N number of SC-FDMA symbol(s) corresponding to as much as multiple transmission timing capable of being fully supported within an allocated time and/or frequency resource.

Yet, in the aspect of reception of each cell, there may exist impact different from each other.

In FIG. 44, if we look at a receiving end of a cell #2, it is able to assume that there is no signal of a different cell received after a UL subframe boundary of the cell #2.

In this case, it may assume that a collision with a transmission signal of a different cell occurs in a previous contiguous subframe only.

In particular, in terms of a base station, it is able to perform a rate matching for only a resource in the front in a subframe of a specific cell.

Based on this assumption, the present invention proposes that a rate matching is performed at the front of a subframe only for the N number of SC-FDMA symbol(s) corresponding to as much as multiple transmission timing capable of being fully supported within an allocated time and/or frequency resource.

For instance, difference of fully supportive of multiple transmission timing may correspond to 30 [us] or 31.3 [us].

In this case, since the difference of fully supportive of multiple transmission timing is smaller than a single SC-FDMA symbol, a rate matching is performed for one (N=1) SC-FDMA symbol in the front of a subframe within an allocated time and frequency resource.

Figure 49:
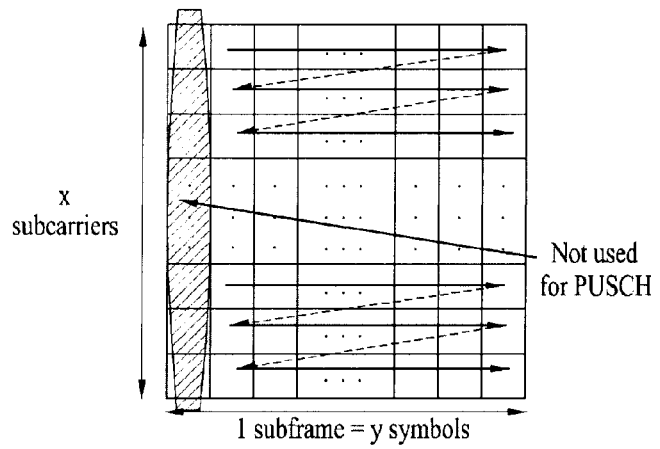
FIG. 49 is a diagram for an example of performing a rate matching for one SC-FDMA symbol in the front within a subframe in relation to the present invention.

A detail content to which the third embodiment of the present invention is applied is indicated by FIG. 49.

Referring to FIG. 49, although an original physical resource is allocated as much as x*y REs (or subcarriers), the first SC-FDMA symbol in a subframe is not used for transmission due to a rate matching and REs of x*(y−1) are used only.

In this case, for clarity, FIG. 49 is explained in a manner of omitting such an additional overhead as a reference signal or pilot signal, and the like within a resource in the following description.

For clarity, although time-first RE mapping is explained as an example, the present invention may be non-limited to the method/order of mapping to a physical time and/or frequency resource.

Meanwhile, if a transmission subframe corresponds to a sounding subframe (SRS subframe, this may be cell-specific or UE-specific), although a specific UE does not transmit a sounding signal, the last symbol within a subframe should be transmitted in a manner of being rate matched in order to avoid a collision with a sounding signal of a different UE.

In this case, as mentioned in the foregoing description, sounding transmission of the last SC-FDMA symbol within a subframe may overlap with such a different signal transmission as PUSCH/PUCCH of a different cell within an identical subframe.

Or, the sounding transmission may work as interference to a next contiguous subframe of the different cell.

Hence, when multiple uplink transmission is used (e.g., in case of being configured or in case of inter-band CA), a rate matching is additionally performed for the last SC-FDMA symbol in a subframe within an allocated time and/or frequency resource in case of an SRS subframe.

Yet, since the first SC-FDMA symbol of a next subframe is already rate matched, in case that a UE performs an SRS transmission, an SRS can be transmitted in the last SC-FDMA symbol within a subframe.

In this case, transmission frequency of the SRS can be configured or allocated separately from the allocated data/control channel resource. This sort of example is depicted in FIG. 50 in detail.

Figure 50:
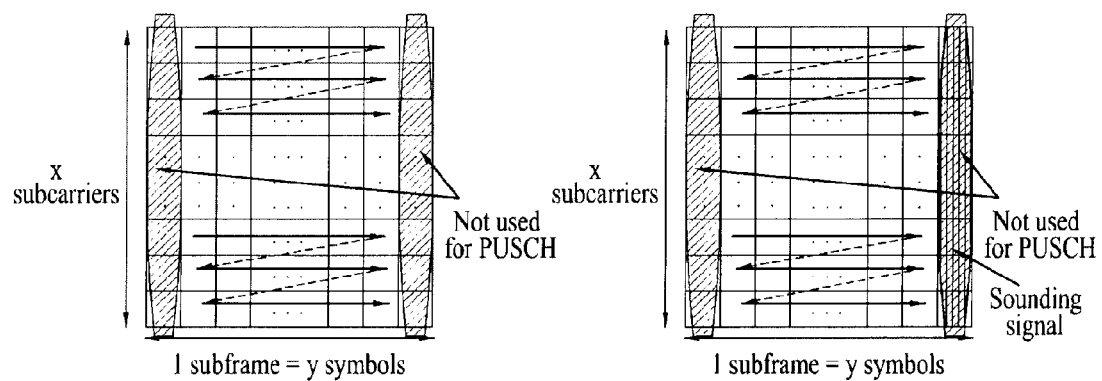
FIG. 50 is a diagram for an example of performing a rate matching for one SC-FDMA symbol in the front within a subframe in an SRS subframe in relation to the present invention.

Meanwhile, if a simultaneous transmission signal is permitted between neighboring subframes and simultaneous transmission of signals (e.g., PUSCH and SRS, PUCCH and SRS) different from each other in an identical subframe is not permitted only, unlike FIG. 50, it may be configured to perform a rate matching for SC-FDMA symbol in the rear only without a rate matching for SC-FDMA symbol in the front within a subframe.

Meanwhile, the PUSCH stated in the description and drawings in the present invention can be replaced by PUCCH.

When the PUCCH is applied in a manner of being replaced, rate matching or a shortened format (a format including less number of SC-FDMA and OFDMA symbols compared to an original format) different from the original format may be applied.

And, the present invention may be non-limited to a structure of the shortened format.

And, the present invention can be used when inter-band CA is used. The present invention can be used when multiple uplink transmission timing is used.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are mainly explained centering on a signal transmission and reception relation between a user equipment and a base station. The signal transmission and reception relation can be identically/similarly extended to a signal transmission and reception between a user equipment and a relay or between a base station and a relay. A specific operation explained as performed by a base station may be performed by an upper node of the base station in some cases. In particular, in a network constructed with a plurality of network nodes including a base station, it is apparent that various operations performed for communication with a user equipment can be performed by the base station or other networks except the base station. 'Base station (BS)' may be substituted with such a terminology as a fixed station, a Node B, an eNode B (eNB), an access point (AP) and the like. And, a terminal may be substituted with such a terminology as a user equipment (UE), a mobile station (MS), a mobile station subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting control information in a wireless access system and apparatus therefor are described with reference to examples applied to 3GPP LTE system, it may be applicable to various kinds of wireless communication systems except the 3GPP LTE system.

What is claimed is:

1. A method for transmitting an uplink signal to a base station by a user equipment in a wireless communication system, the user equipment being configured with a plurality of serving cells, the method comprising:
performing a rate matching for the uplink signal without two single carrier frequency division multiple access (SC-FDMA) symbols within a subframe transmitting the uplink signal, when timing advance values for the plurality of serving cells are different and the subframe transmitting the uplink signal is configured as a subframe for sounding reference signal (SRS) transmission;
mapping the rate-matched uplink signal to at least one SC-FDMA symbol except for last two SC-FDMA symbols within the subframe;
mapping an SRS to a second to last SC-FDMA symbol within the subframe, when the user equipment is configured to transmit the SRS in the subframe; and
transmitting the mapped uplink signal and SRS to the base station in the subframe.

2. The method of claim 1, wherein the rate matching for the uplink signal is performed without three SC-FDMA symbols and the uplink signal is further mapped except for a starting SC-FDMA symbol within the subframe.

3. The method of claim 1, wherein the uplink signal is transmitted via a physical uplink control channel (PUCCH) of a primary cell of the plurality of serving cells.

4. A user equipment configured to transmit an uplink signal to a base station in a wireless communication system, the user equipment being configured for a plurality of serving cells, the user equipment comprising:
a processor configured to:
perform a rate matching for the uplink signal without two single carrier frequency division multiple access (SC-FDMA) symbols in a subframe transmitting the uplink signal, when timing advance values for the plurality of serving cells are different and the subframe transmitting the uplink signal is configured as a subframe for sounding reference signal (SRS) transmission,
map the rate-matched uplink signal to at least one SC-FDMA symbol except in the last two SC-FDMA symbols in the subframe, and
map an SRS to a second to last SC-FDMA symbol in the subframe, when the user equipment is configured to transmit the SRS in the subframe; and
a transmission module configured to transmit the mapped uplink signal and SRS to the base station in the subframe.

5. The user equipment of claim 4, wherein the rate matching for the uplink signal is performed without three SC-FDMA symbols and the uplink signal is further mapped except in a starting SC-FDMA symbol in the subframe.

6. The user equipment of claim 4, wherein the first information is transmitted via a physical uplink control channel (PUCCH) of a primary cell of the plurality of serving cells.

7. The user equipment of claim 4, wherein the uplink signal is transmitted via a physical uplink shared channel (PUSCH).

8. The user equipment of claim 4, wherein each of the timing advance values is used for determining an uplink transmission timing for a corresponding cell.

9. The user equipment of claim 4, wherein the rate matching includes reducing a channel coding rate or performing a puncturing after a channel coding.

10. The method of claim 1, wherein the uplink signal is transmitted via a physical uplink shared channel (PUSCH).

11. The method of claim 1, wherein each of the timing advance values is used for determining an uplink transmission timing for a corresponding cell.

12. The method of claim 1, wherein the rate matching includes reducing a channel coding rate or performing a puncturing after a channel coding.

* * * * *